US011838336B2

(12) United States Patent
Young

(10) Patent No.: US 11,838,336 B2
(45) Date of Patent: Dec. 5, 2023

(54) VIRTUAL EVENTS-BASED SOCIAL NETWORK

(71) Applicant: Varty Inc., Greenwich, CT (US)

(72) Inventor: Adam Young, Greewich, CT (US)

(73) Assignee: VARTY INC., Greenwich, CT (US)

( * ) Notice: Subject to any disclaimer, the term of this patent is extended or adjusted under 35 U.S.C. 154(b) by 0 days.

(21) Appl. No.: 17/458,531

(22) Filed: Aug. 26, 2021

(65) Prior Publication Data

US 2022/0070232 A1 Mar. 3, 2022

Related U.S. Application Data

(60) Provisional application No. 63/071,039, filed on Aug. 27, 2020.

(51) Int. Cl.

| | |
|---|---|
| ***H04L 65/403*** | (2022.01) |
| ***H04L 65/1083*** | (2022.01) |
| ***G06T 19/00*** | (2011.01) |
| *H04L 65/4038* | (2022.01) |

(52) U.S. Cl.
CPC .......... *H04L 65/403* (2013.01); *G06T 19/003* (2013.01); *H04L 65/1086* (2013.01)

(58) Field of Classification Search
CPC .. H04L 65/403; H04L 65/1086; G06T 19/003
See application file for complete search history.

(56) References Cited

U.S. PATENT DOCUMENTS 5,689,669 A * 11/1997 Lynch .................. G06F 3/0481 715/848
5,880,731 A * 3/1999 Liles .................... G06F 3/0481 345/473
6,002,853 A * 12/1999 de Hond .............. G06F 16/954 709/219
6,243,091 B1 * 6/2001 Berstis ................ G06F 3/04815 715/205
6,271,843 B1 * 8/2001 Lection .................. G06T 15/00 715/848
6,362,817 B1 * 3/2002 Powers .................. G06T 17/00 345/428
6,414,679 B1 * 7/2002 Miodonski ............. G06T 13/00 707/999.005
6,570,563 B1 * 5/2003 Honda ................. A63F 13/352 345/473
6,573,903 B2 * 6/2003 Gantt ..................... G06F 30/00 345/619
6,590,593 B1 * 7/2003 Robertson ........... G06F 3/04815 715/848

(Continued)

*Primary Examiner* — Nicholas Augustine
(74) *Attorney, Agent, or Firm* — Dave Law Group LLC; Raj S. Dave

(57) ABSTRACT

Networking is one of the key aspects of events, but virtual events pose a huge limitation, as attendees don't really get an opportunity to have one on one discussions with each another. The users of current video calling solutions unsuccessfully trying to extend the use of these products to casual social get together and the current video calling solutions that have no dimension of space and are not tailored to emulate the dynamics of real-life social settings. The current invention belongs broadly to natural communication flow in video call solutions, highly interactive, aiming to create as similar an experience as possible to their physical counterparts.

20 Claims, 93 Drawing Sheets

(56) References Cited

U.S. PATENT DOCUMENTS

| | | | | | |
|---|---|---|---|---|---|
| 6,621,508 | B1 * | 9/2003 | Shiraishi | G06F 3/0481 | 715/764 |
| 6,690,393 | B2 * | 2/2004 | Heron | G06T 19/00 | 715/848 |
| 6,961,055 | B2 * | 11/2005 | Doak | A63F 13/63 | 345/677 |
| 7,382,288 | B1 * | 6/2008 | Wilson | G08G 5/0021 | 340/972 |
| 7,414,629 | B2 * | 8/2008 | Santodomingo | G06T 17/05 | 345/582 |
| 7,467,356 | B2 * | 12/2008 | Gettman | G06Q 30/02 | 715/850 |
| 7,653,877 | B2 * | 1/2010 | Matsuda | G06F 16/957 | 463/32 |
| 7,746,343 | B1 * | 6/2010 | Charaniya | G06T 17/05 | 345/428 |
| 2001/0018667 | A1 * | 8/2001 | Kim | G06Q 30/0277 | 705/14.73 |
| 2002/0095463 | A1 * | 7/2002 | Matsuda | G06F 16/957 | 709/204 |
| 2005/0093719 | A1 * | 5/2005 | Okamoto | G01C 21/3697 | 705/14.62 |
| 2005/0128212 | A1 * | 6/2005 | Edecker | G06T 17/05 | 345/581 |
| 2007/0168359 | A1 * | 7/2007 | Jacob | A63F 13/30 | |
| 2008/0235570 | A1 * | 9/2008 | Sawada | G06Q 10/10 | 356/3 |
| 2009/0113066 | A1 * | 4/2009 | Van Wie | H04L 12/1827 | 709/231 |
| 2009/0240359 | A1 * | 9/2009 | Hyndman | H04M 3/42221 | 715/757 |
| 2010/0023877 | A1 * | 1/2010 | Alkov | A63F 13/35 | 715/753 |
| 2010/0070859 | A1 * | 3/2010 | Shuster | G06T 15/08 | 715/706 |
| 2011/0047267 | A1 * | 2/2011 | Syvain | A63F 13/215 | 709/224 |
| 2018/0095635 | A1 * | 4/2018 | Valdivia | G06F 3/0482 | |
| 2018/0095636 | A1 * | 4/2018 | Valdivia | G06F 3/0482 | |
| 2019/0344185 | A1 * | 11/2019 | Fargo | G06T 19/20 | |
| 2020/0104522 | A1 * | 4/2020 | Collart | G06T 19/20 | |

* cited by examiner

FIG. 5A
Snap a photo
Make your first impression

FIG. 9A
Choose broadcasting
YouTube Video
Upload Video
Your webcam video
Your screen
Choose broadcasting
YouTube Video
Upload Video
Your webcam video
Your screen
Choose broadcasting
YouTube Video
Upload Video
Your webcam video
Your screen
Choose broadcasting
YouTube Video
Upload Video
Your webcam video
Your screen

FIG. 13C
Broadcasting
Volume from conversation X 50%
to user Y
Conversation X
User Y

FIG. 13D
Broadcasting
Volume from conversation X 100% to user Y
Conversation X
User Y

Search
Name
Name
Name
Name
Name
Name

SECTION 1 - FIRST ARE ALL THE PEOPLE WHO ARE IN THE SAME

ROOM AS YOU. THEIR IN-ROOM LOCATION WILL BE SHOWN IN THE MINI MAP OF THE ROOM ABOVE THE FRIENDS LIST. IN THE MINI MAP, EVERY TEAL COLORED DOT CORRESPONDS TO A FRIEND IN THE ROOM

SECTION 2 - THE SECOND SECTION SHOWS ALL FRIENDS WHO ARE ACTIVE ON VARTY BUT NOT IN THE SAME ROOM AS YOU

SECTION 3 - IS ALL THE FRIENDS WHO ARE NOT ACTIVE AT THE MOMENT. THEY WILL BE SHOWN AT THE BOTTOM FADED OUT

FIG. 23A

1. SEEING YOUR FRIENDS' LOCATIONS
    - THE MINI MAP SHOWS WHERE YOUR FRIENDS ARE IN THE ROOM
2. INVITING FRIENDS TO YOUR CURRENT ROOM LOCATION. TWO WAYS TO DO THIS:
    - CLICKING ON THE ICON WITH THE PERSON AND THE ENVELOPE. BUTTON IS INACTIVE FOR USERS ALREADY IN YOUR ROOM SINCE THEY CANNOT BE INVITED TO THE LOCATION THEY ARE ALREADY AT
    - SENDING THE LINK OF THE CURRENT ROOM VIA TEXT MESSAGE, EMAIL ETC.
3. REMOVING FRIENDS – CLICKING ON THE THREE DOTS WILL ALLOW YOU TO REMOVE A FRIENDS
4. ONLY AS THE HOST YOU ARE ALSO ABLE TO KICK OUT PEOPLE FROM THE EVENT

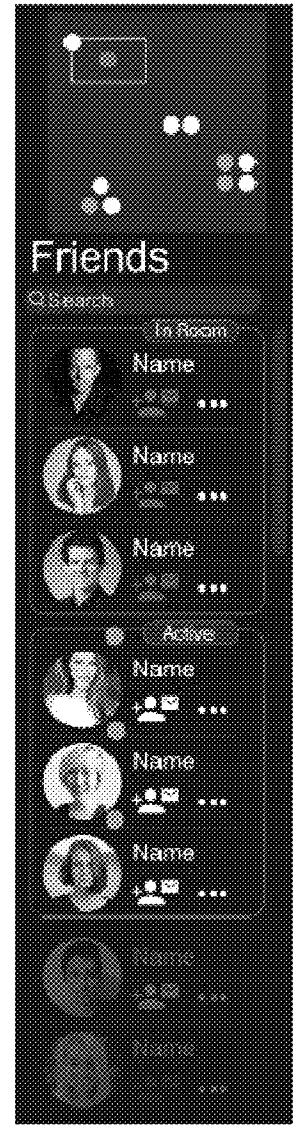

FIG. 23B

1 $$y = \{x < 5: 1 \cdot 10\}$$

2 $$y = \left\{5 \le x < 15: 59(x - 2.5)^{-2} + .5\right\}$$

3 $$y = \{15 \le x < 20: -0.1x + 2.2\}$$

4 $$y = \{20 \le x < 25: 0.02 \cdot 10\}$$

VIRTUAL EVENTS-BASED SOCIAL NETWORK

CROSS-REFERENCE TO RELATED APPLICATIONS

This application claims benefit of U.S. provisional Patent Application No. 63/071,039 filed on Aug. 27, 2020, titled as VIRTUAL EVENTS-BASED SOCIAL NETWORK, which is hereby incorporated by reference in its entirety.

TECHNICAL FIELD

The current invention belongs broadly to natural communication flow in video call solutions.

BACKGROUND

A virtual event is an online event that involves people interacting in a virtual environment on the web, rather than meeting in a physical location. Virtual events are typically multi-session online events that often feature webinars and webcasts. They are highly interactive, often aiming to create as similar an experience as possible to their physical counterparts.

One of the key differences between virtual worlds and virtual events is that a virtual world is available as a persistent (perpetual) environment, even after the live part of the event is over.

A virtual community is a social network of individuals who connect through specific social media, potentially crossing geographical and political boundaries in order to pursue mutual interests or goals. Virtual communities all encourage interaction, sometimes focusing around a particular interest or just to communicate. Some virtual communities do both. Community members are allowed to interact over a shared passion through various means: message boards, chat rooms, social networking World Wide Web sites, or virtual worlds Virtual worlds are the most interactive of all virtual community forms. In this type of virtual community, people are connected by living as an avatar in a computer-based world. Users create their own avatar character (from choosing the avatar's outfits to designing the avatar's house) and control their character's life and interactions with other characters in the 3-D virtual world. It is similar to a computer game, however there is no objective for the players. A virtual world simply gives users the opportunity to build and operate a fantasy life in the virtual realm. Characters within the world can talk to one another and have almost the same interactions people would have in reality. For example, characters can socialize with one another and hold intimate relationships online.

This type of virtual community allows for people to not only hold conversations with others in real time, but also to engage and interact with others. The avatars that users create are like humans. Users can choose to make avatars like themselves, or take on an entirely different personality than them. When characters interact with other characters, they can get to know one another not only through text based talking, but also by virtual experience (such as having avatars go on a date in the virtual world). A chat room form of a virtual community may give real time conversations, but people can only talk to one another. In a virtual world, characters can do activities together, just like friends could do in reality. Communities in virtual worlds are most similar to real life communities because the characters are physically in the same place, even if the users who are operating the characters are not. It is close to reality, except that the characters are digital.

A virtual world is a computer-simulated environment which may be populated by many users who can create a personal avatar, and simultaneously and independently explore the virtual world, participate in its activities and communicate with others. These avatars can be textual, 2D or 3D graphical representations, or live video avatars with auditory and touch sensations. In general, virtual worlds allow for multiple users but single player computer games, can also be considered a type of virtual world.

The user accesses a computer-simulated world which presents perceptual stimuli to the user, who in turn can manipulate elements of the modeled world and thus experience a degree of presence. Such modeled worlds and their rules may draw from reality or fantasy worlds. Example rules are gravity, topography, locomotion, real-time actions, and communication. Communication between users can range from text, graphical icons, visual gesture, sound, and rarely, forms using touch, voice command, and balance senses.

Networking is one of the key aspects of events, but virtual events pose a huge limitation, as attendees don't really get an opportunity to have one on one discussions with each another. The users of current video calling solutions unsuccessfully trying to extend the use of these products to casual social get together and the current video calling solutions that have no dimension of space and are not tailored to emulate the dynamics of real life social settings.

Accordingly, a need therefore exists for systems and methods that overcomes the limitations of online video chat applications and enables an enhanced virtual events-based social network experience.

BRIEF DISCUSSION OF THE DRAWINGS

In the present disclosure, reference is made to the accompanying drawings, which form a part hereof. In the drawings, similar symbols typically identify similar components, unless context dictates otherwise. Various embodiments described in the detailed description, and drawings, are illustrative and not meant to be limiting. Other embodiments may be used, and other changes may be made, without departing from the spirit or scope of the subject matter presented herein. It will be understood that the aspects of the present disclosure, as generally described herein, and illustrated in the Figures, can be arranged, substituted, combined, separated, and designed in a wide variety of different configurations, all of which are contemplated herein. The embodiments are illustrated by way of example and not limitation in the figures of the accompanying drawings, in which like references indicate similar elements and in which:

Virtual Proximity Based Call Mechanics—Starting a call

FIG. 1A-1E illustrate the mechanics of starting a virtual proximity-based call in accordance with an invention embodiment.

Virtual Proximity Based Call Mechanics—Ending a call

FIG. 2A-2C illustrate the mechanics of ending a virtual proximity-based call in accordance with an invention embodiment.

Virtual Proximity Based Call Mechanics—Joining a call

FIG. 3A-3D illustrate the mechanics of joining an existing virtual proximity- based call in accordance with an invention embodiment.

Virtual Proximity Based Call Mechanics—Leaving a call

FIG. 4A-4E illustrate the mechanics of leaving an existing virtual proximity- based call in accordance with an invention embodiment.

Avatar Photo

FIG. 5A-5C illustrate the mechanics of avatar photographs in accordance with an invention embodiment.

Room Selection—Public Rooms

FIG. 6A-6D illustrate the mechanics of public room selection in accordance with an invention embodiment.

Room Selection—Offering more Tailored Rooms

FIG. 7Aa-7B illustrate the mechanics of offering tailored rooms for room selection in accordance with an invention embodiment.

Private Room

FIG. 8A-8F illustrate the mechanics of private rooms in accordance with an invention embodiment.

Broadcasting

FIG. 9A-9G illustrate the mechanics of broadcasting audio / video in accordance with an invention embodiment.

Private Room—In a call

FIG. 10A-10C illustrate the mechanics of private mode in a call-in accordance with an invention embodiment.

Private Mode—With your own avatar

FIG. 11 illustrates the mechanics of private mode in a call with your own avatar in accordance with an invention embodiment.

Profile Card

FIG. 12 illustrates the mechanics of profile cards in accordance with an invention embodiment.

Volume Scaling

FIG. 13A-13D illustrate the mechanics of volume scaling in accordance with an invention embodiment.

Eye Contact

FIG. 14A-14C illustrate the mechanics of eye contact in accordance with an invention embodiment.

Room Hierarchies (Like Slack® Channel With Doors)

FIG. 15 illustrates the mechanics of room hierarchies (like Slack® channel with doors) in accordance with an invention embodiment.

Sharing Hosting Privileges

FIG. 16A-16C illustrate the mechanics of sharing hosting privileges in accordance with an invention embodiment.

Room Presets (set of rooms a host can choose to curate an event)—Room Size Selection FIG. 17 illustrates the mechanics of room size selection in room presets (set of rooms a host can choose to curate an event) in accordance with an invention embodiment.

Room Presets (set of rooms a host can choose to curate an event)—Houses

FIG. 18 illustrates the mechanics of house creation in room presets (set of rooms a host can choose to curate an event) in accordance with an invention embodiment.

Room Presets (set of rooms a host can choose to curate an event)—Event Specific

FIG. 19 illustrates the mechanics of event specific room creation in room presets (set of rooms a host can choose to curate an event) in accordance with an invention embodiment.

Overflow for Global Rooms

FIG. 20 illustrates the mechanics of overflow for global rooms in accordance with an invention embodiment.

Video Editing Filters

FIG. 21 illustrates the mechanics of video editing filters in accordance with an invention embodiment.

File Sharing Mechanism

FIG. 22A-22D illustrate the mechanics of file sharing in accordance with an invention embodiment.

Friending

FIG. 23A-23G illustrate the mechanics of friending in accordance with an invention embodiment.

Filtering Users at an Event

24A-24D illustrate the mechanics of filtering users at an event in accordance with an invention embodiment.

Public Room Posting

REFERENCES

Figure 1A:
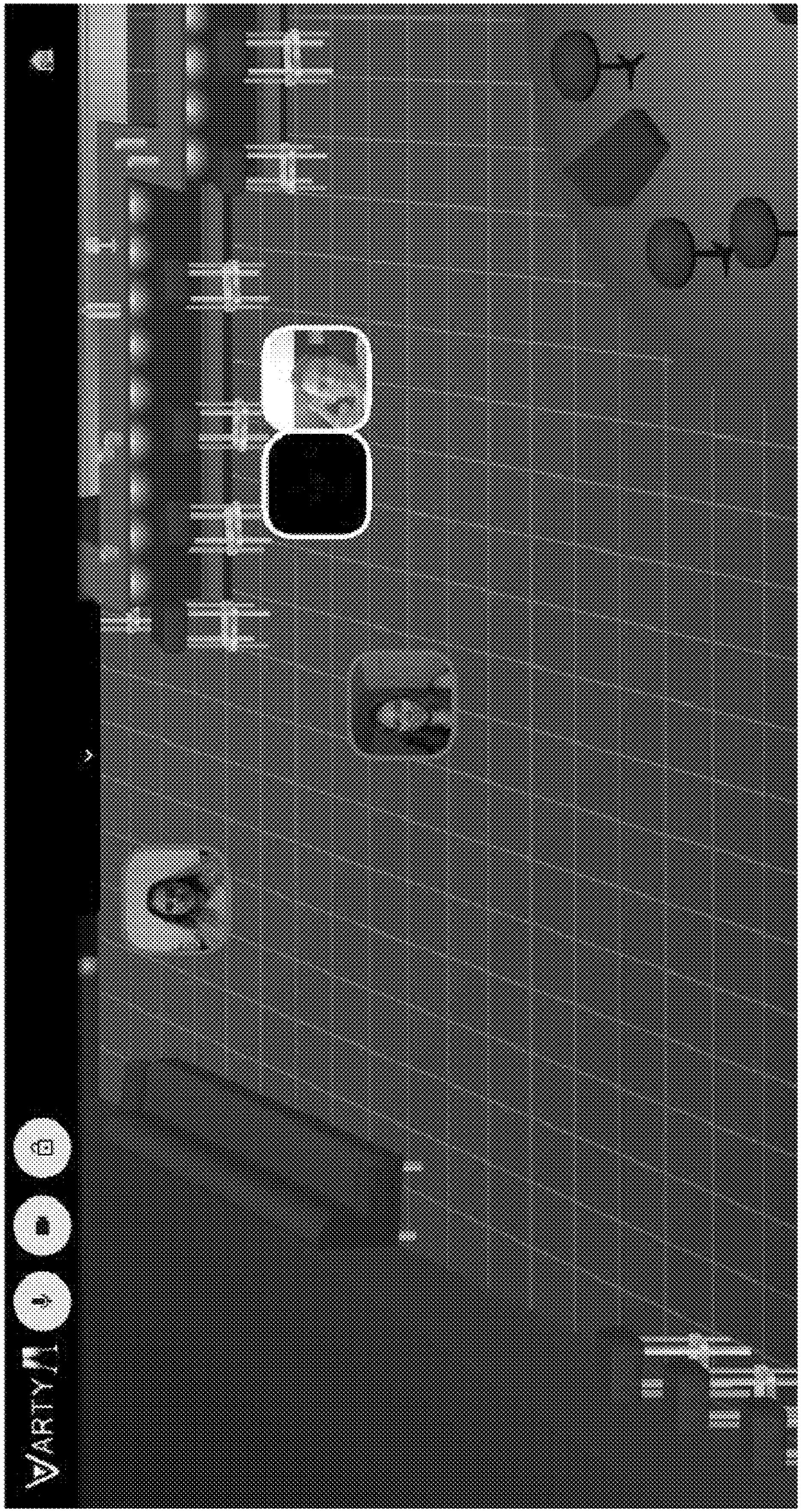

All patents, patent application publications, and non-patent literature mentioned in the application are incorporated by reference in their entirety.

DETAILED DESCRIPTION

Although the following detailed description contains many specifics for the purpose of illustration, a person of ordinary skill in the art will appreciate that many variations and alterations to the following details can be made and are considered to be included herein.

Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this written description, the singular forms "a," "an" and "the" include express support for plural referents unless the context clearly dictates otherwise. Thus, for example, reference to "a sensor" includes a plurality of such sensors.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open-ended term in this written description, like "comprising" or "including," it is understood that direct support should also be afforded to "consisting essentially of" language as well as "consisting of" language as if stated explicitly and vice versa.

The terms "left," "right," "front," "back," "top," "bottom," "over," "under," and the like in the description, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. Occurrences of the phrase "in one embodiment," or "in one aspect," herein do not necessarily all refer to the same embodiment or aspect.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, for example without limitation, a PLC (Programmable Logic Controller), an FPGA (field programmable gate array), an ASIC (application specific integrated circuit), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Embodiments of the present invention may comprise or utilize a special purpose or general-purpose computer including computer hardware. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network, such as a 5G network, or another communications connection (either hardwired, wireless, or a combination of hardwired or wireless) to a computer, the computer properly views the connection as a transmission medium. Transmissions media can include a network and/or data links which can be used to carry data or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject is not necessarily limited to the described features or acts described above. Rather, the described features and acts are disclosed as example forms of implementing subject matter.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Even though particular combinations of features are disclosed in the specification, these combinations are not intended to limit the disclosure of possible implementations.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

An initial overview of technology embodiments is provided below and specific technology embodiments are then described in further detail. This initial summary is intended to aid readers in understanding the technology more quickly but is not intended to identify key or essential technological features, nor is it intended to limit the scope of the claimed subject matter.

The embodiments herein and the various features and advantageous details thereof are explained more fully with reference to the non-limiting embodiments that are illustrated in the accompanying drawings and detailed in the following description.

As used herein, "Application" or "Environment" means Varty.io

As used herein, "space" is a virtual environment of a networked application that allows a user to interact with other users.

As used herein, "user" is a person who is using the application and enters the shared space. The term "user" as used herein refers to one or more persons using the application.

As used herein, "shared space" is also referred to as "public space" or "global public room" or "global lobby" is a space shared by all the users upon entering.

As used herein, "private room" is a room shared by the host and can have set of filters to determine who can enter the room.

As used herein, "public room" is a room shared by the host and can have set of filters to determine who can enter the room.

As used herein, "public lobby" is a shared space by the host with no filters and anyone can enter the lobby.

As used herein, "host" is a person who creates a room and has hosting privileges such as control of broadcasting, background of the room, choice to provide other with hosting ability etc.

As used herein, "hosting ability" is the ability of the person to have control as the host does upon choice given or shared by the host.

As used herein, "public event" is an event open to public.

As used herein, "targeted rooms" are private or public rooms which have set of criteria that a user needs to satisfy to enter.

As used herein, "private hub" is a private room.

As used herein, "inventory" means uploaded files to the application that can be shared with other people in the private or public rooms.

As used herein, "convo" refers to an interaction between up to 4 people of both voice and video call. Convo's store a list of users involved in the call. Users can freely enter and leave convos. and can start convos with other users unless one of them is in private mode.

As used herein, "invite" refers to an item in database used to facilitate handshake between two users who are overlapping and may begin a convo.

As used herein, "call" refers to a connection between two or more users that sends some form of data between them.

As used herein, "UI" refers to a user interface of the system.

The Application address the gap of lack of natural subdivision capabilities in current video calling solutions. The application also addresses a solution for those who are unable to go to bars when they have to stay home.

The Application or environment developed has the features of Virtual Space (Room/Event/Party)/Metaverse video/audio; Virtual space Avatar; Virtual Proximity; Virtual Proximity based Video Calls; Virtual Presence indication; Volume adjustment based on proximity; Private conversation in virtual room; Virtual auditorium for live events; Map of virtual rooms and navigation; Broadcasting which are explained further in the specification.

Virtual proximity-based video calls: A virtual environment that allows for subdivision of video calls based on virtual proximity. Users enter a call upon their avatars overlapping.

Avatar photo: Taking a photo upon entrance and having that be the avatar that moves around the virtual space.

Room selection: Some virtual spaces will have entrance requirements that are based on profile inputs, only have access to places where you check boxes.

Private room: Access to a hub (as in a private virtual room allocated to each user) to invite people to your room, allowing for users to naturally curate their own private events, selecting the total set of people that can access their given room-merely by inviting friends to it. They can also upload a background image. They are given the ability to remove people at whim from the room.

Broadcasting: Within your hub, you can "broadcast" a video of your choosing for everyone in the virtual room to see, or just play music or make announcements.

Private Mode: An ability to have private conversations by blocking others from entering your video call via clicking a lock icon. Also enables the user to put themselves in private mode to move around the room without getting drawn into calls.

Profile card: Clicking on an avatar to open up profile.

Volume scaling: volume decreases as a function of distance and users only see the live video of users they overlap with.

Friending: When a user walks around a public space, they can add others in the space as a friend.

Public v Private rooms and events: Users can create public rooms and/or private rooms, and create events. They can also make their private space into a public space at any point.

Virtual proximity-based call mechanics: A virtual environment that allows for subdivision of video calls based on virtual proximity. Users enter a call upon their avatars overlapping.

A maximum group size of 4 people for video calls.

Upon two unengaged avatars overlapping, a countdown to call the call starting begins. The avatars must be static for the duration of the countdown.

A user leaves the call upon movement in any direction.

Virtual Proximity Based Call Mechanics—Starting a call

FIG. 1A—Two users approach each other.

Figure 1B:
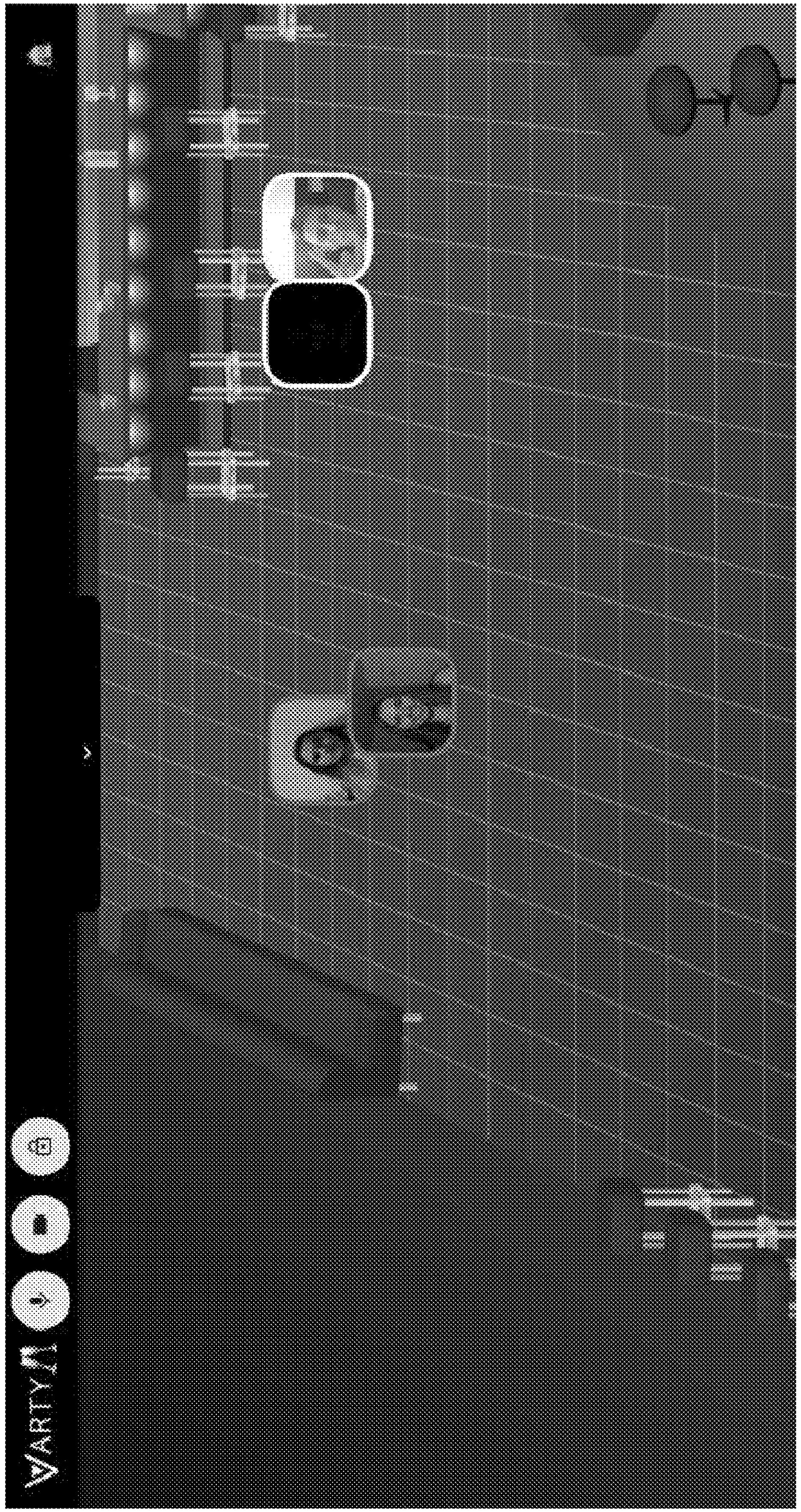

FIG. 1B—Two users overlap.

Figure 1C:
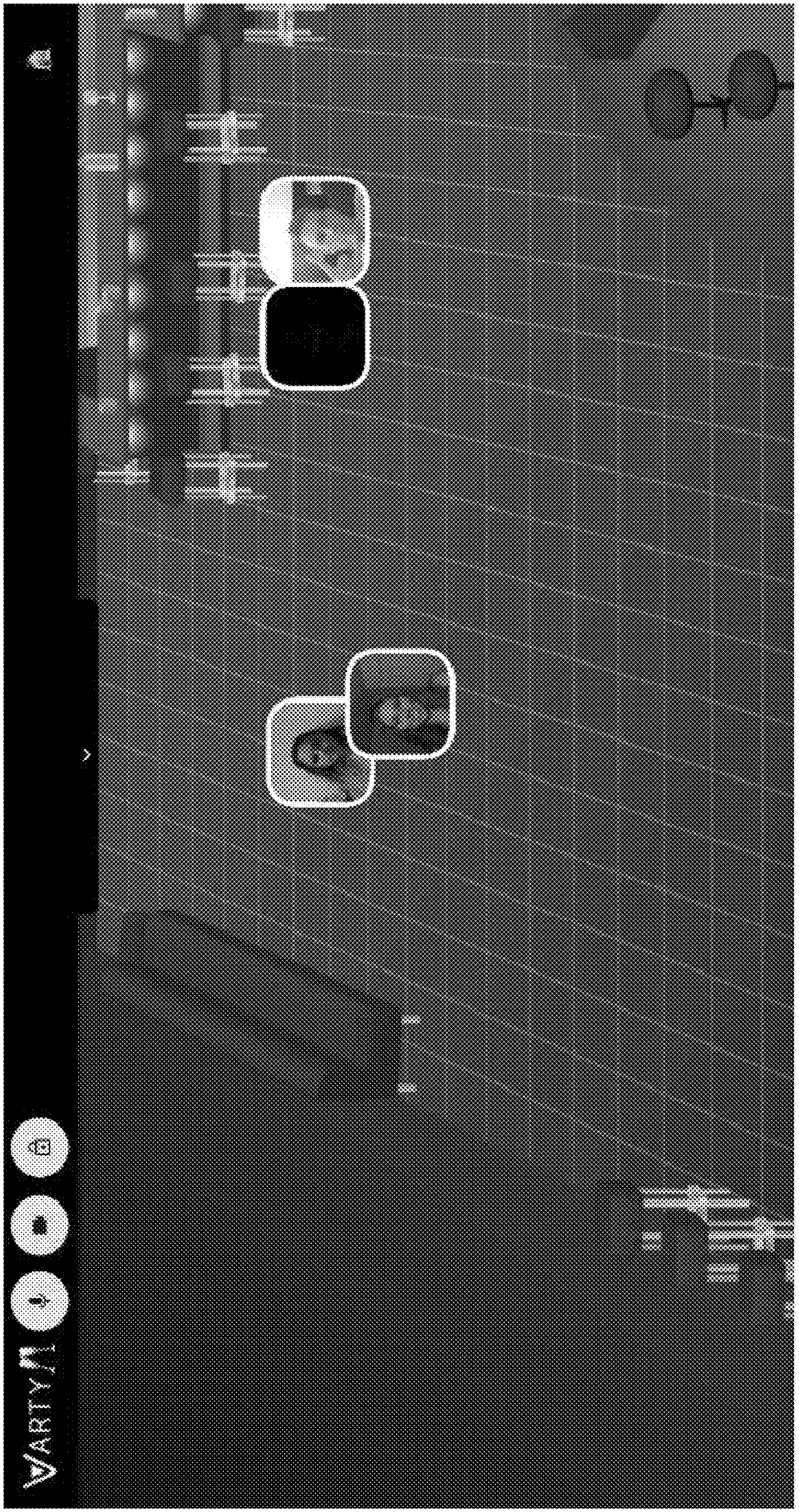

FIG. 1C—Countdown to call starts, signaled by photo frame color change.

Figure 1D:
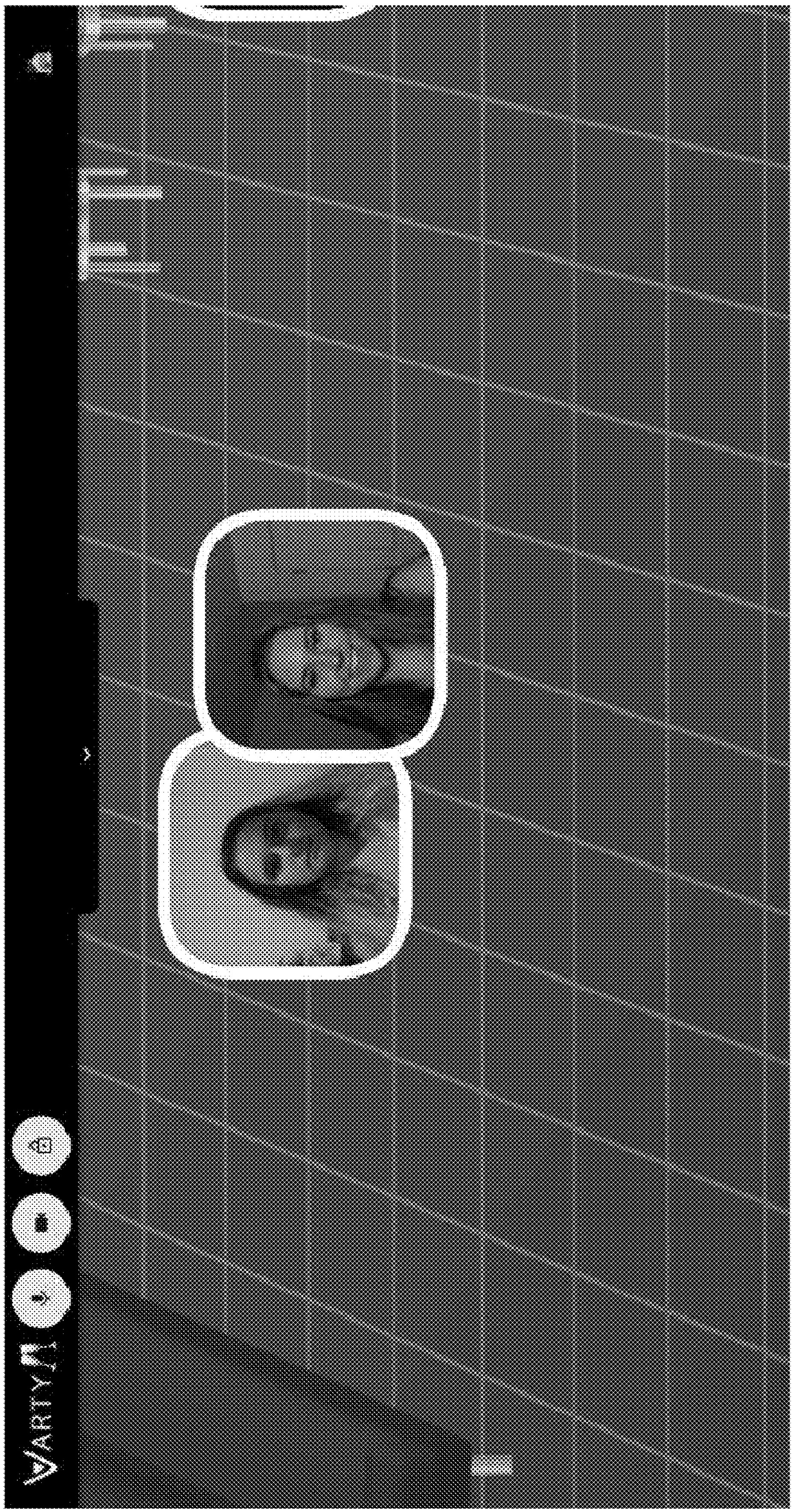

FIG. 1D—The virtual cameras starts to zoom in and forced placement begins.

Figure 1E:
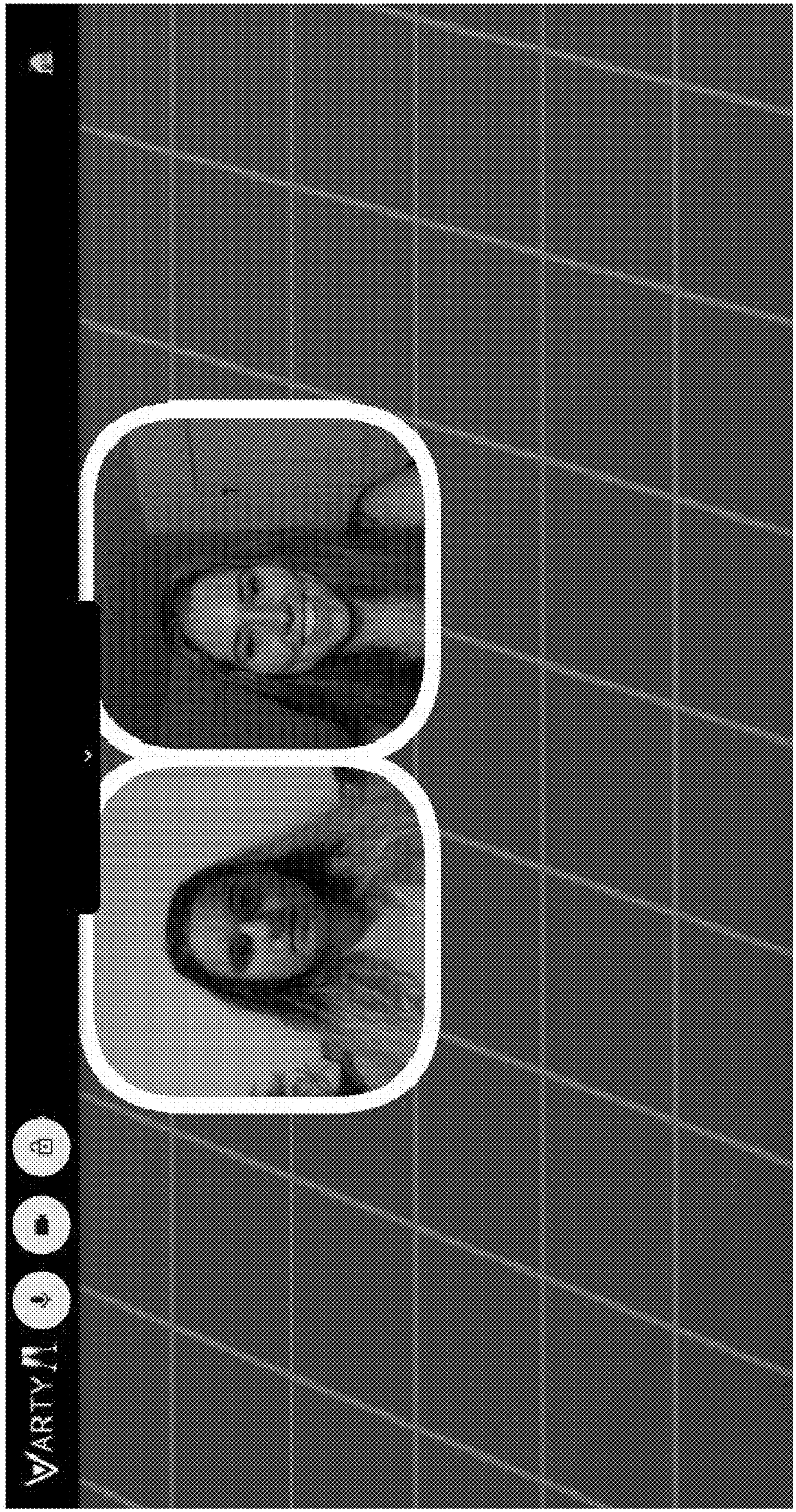

FIG. 1E—Virtual camera fully zoomed in, forced placement finished, video call starts.

Virtual Proximity Based Call Mechanics—Ending a call

Figure 2A:

FIG. 2A—Two users in a video call.

Figure 2B:
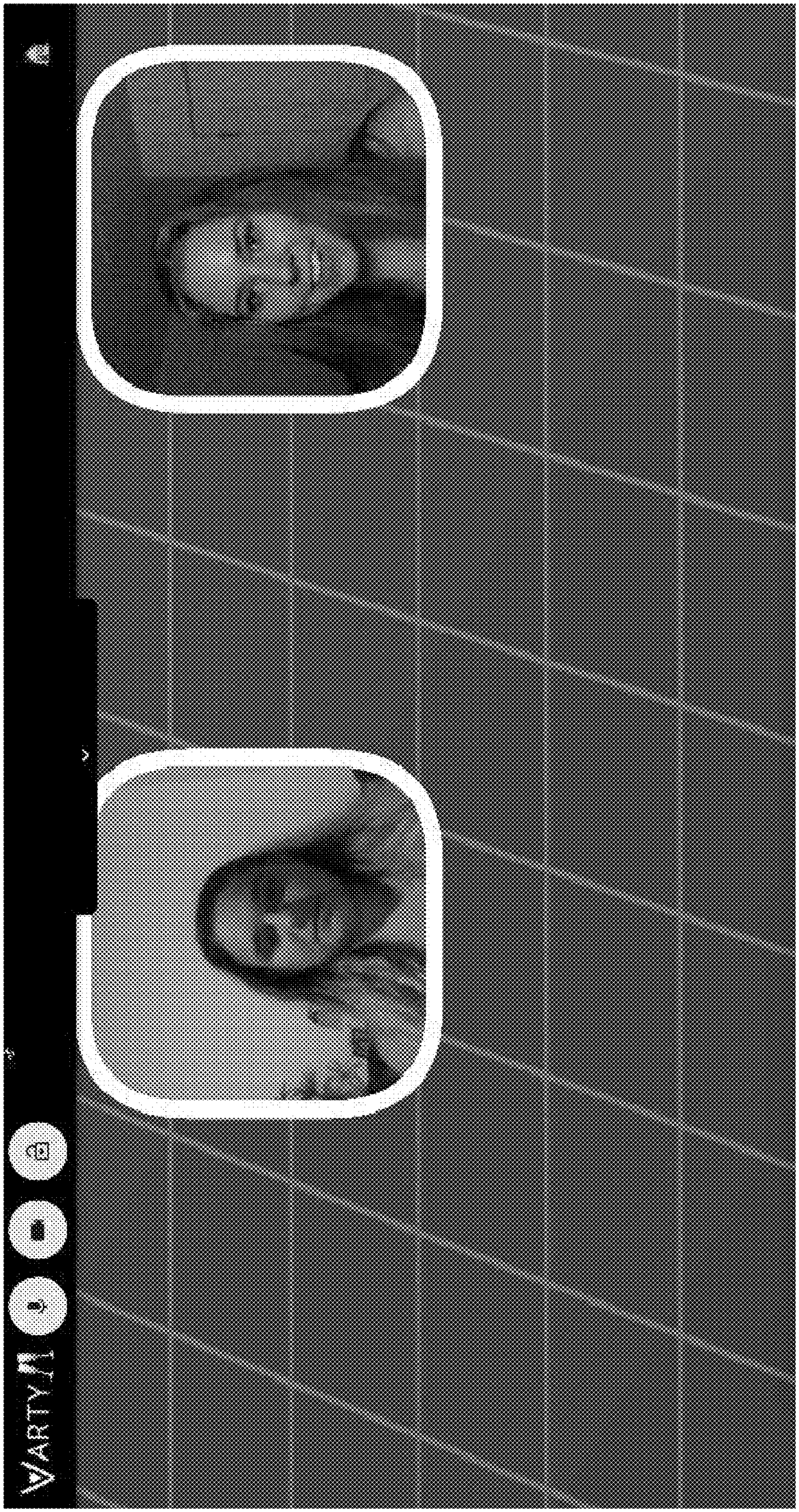

FIG. 2B—The users move apart ending the call.

Figure 2C:
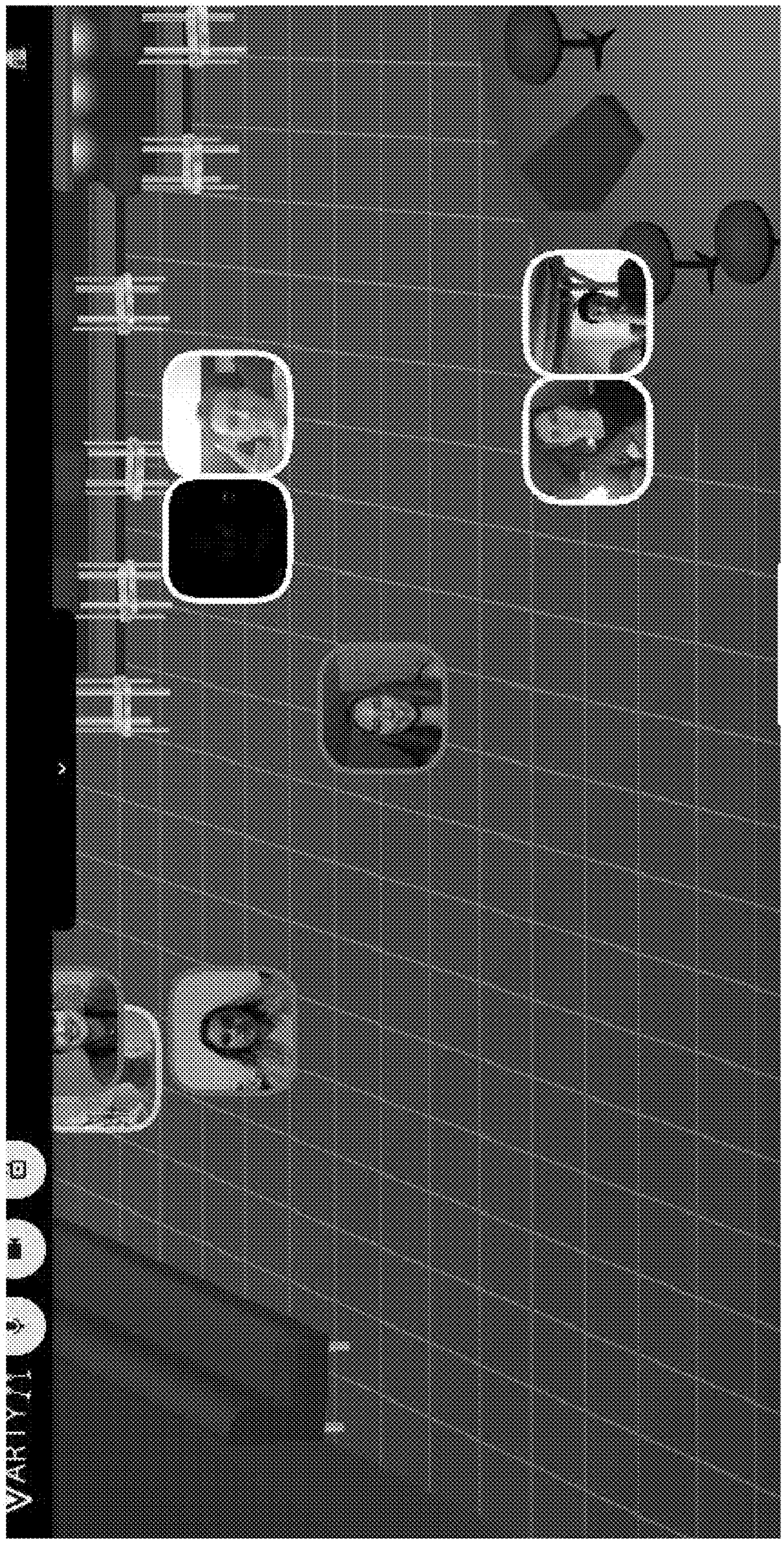

FIG. 2C—Virtual camera zooms back out and both users' frames change back to gray.

Virtual Proximity Based Call Mechanics—Joining a call

Figure 3A:
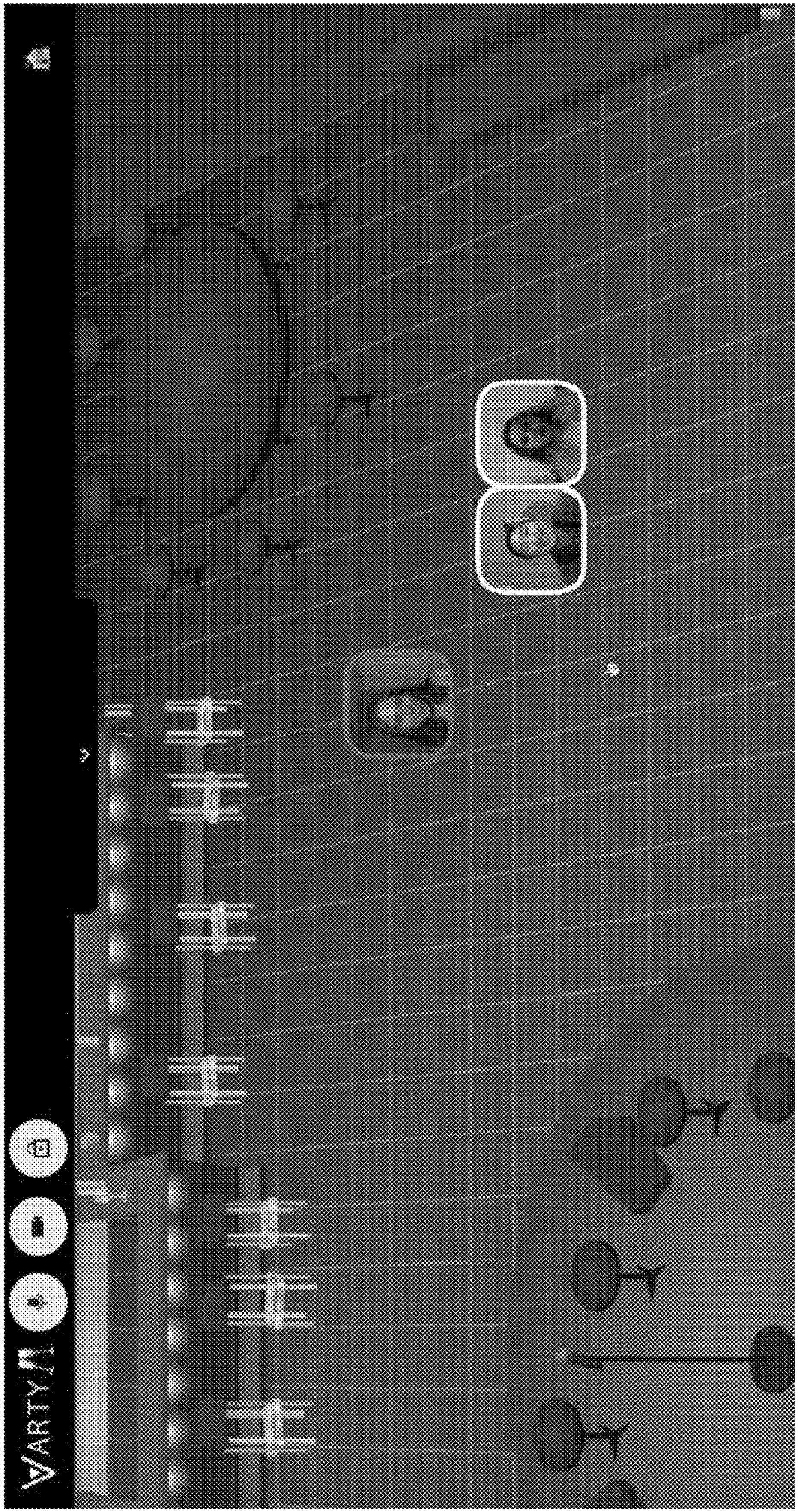

FIG. 3A—One user approaches an existing video call between two other users.

Figure 3B:
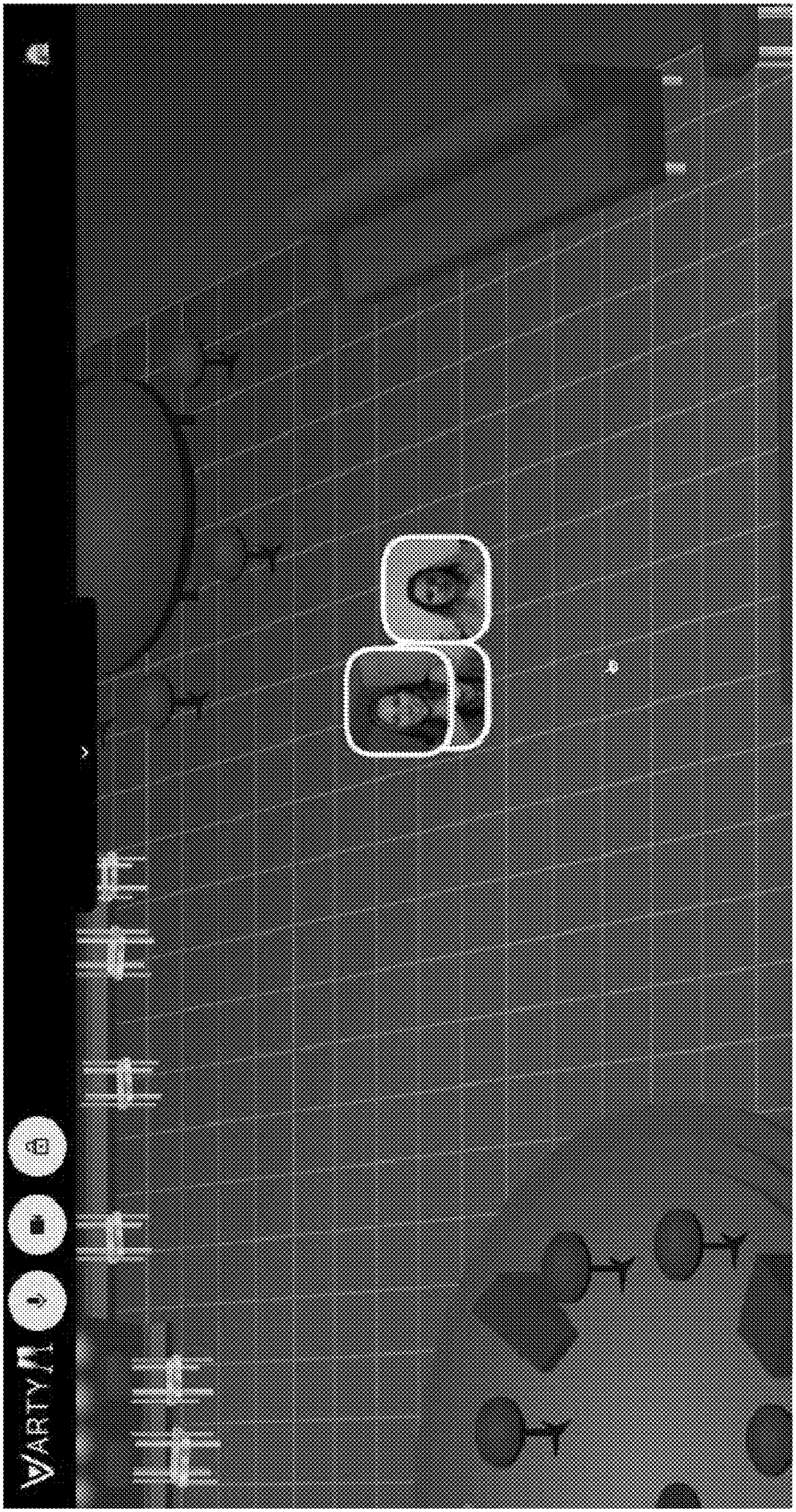

FIG. 3B—User overlaps with the call, the frame changes color to signal she is about to join the call.

Figure 3C:
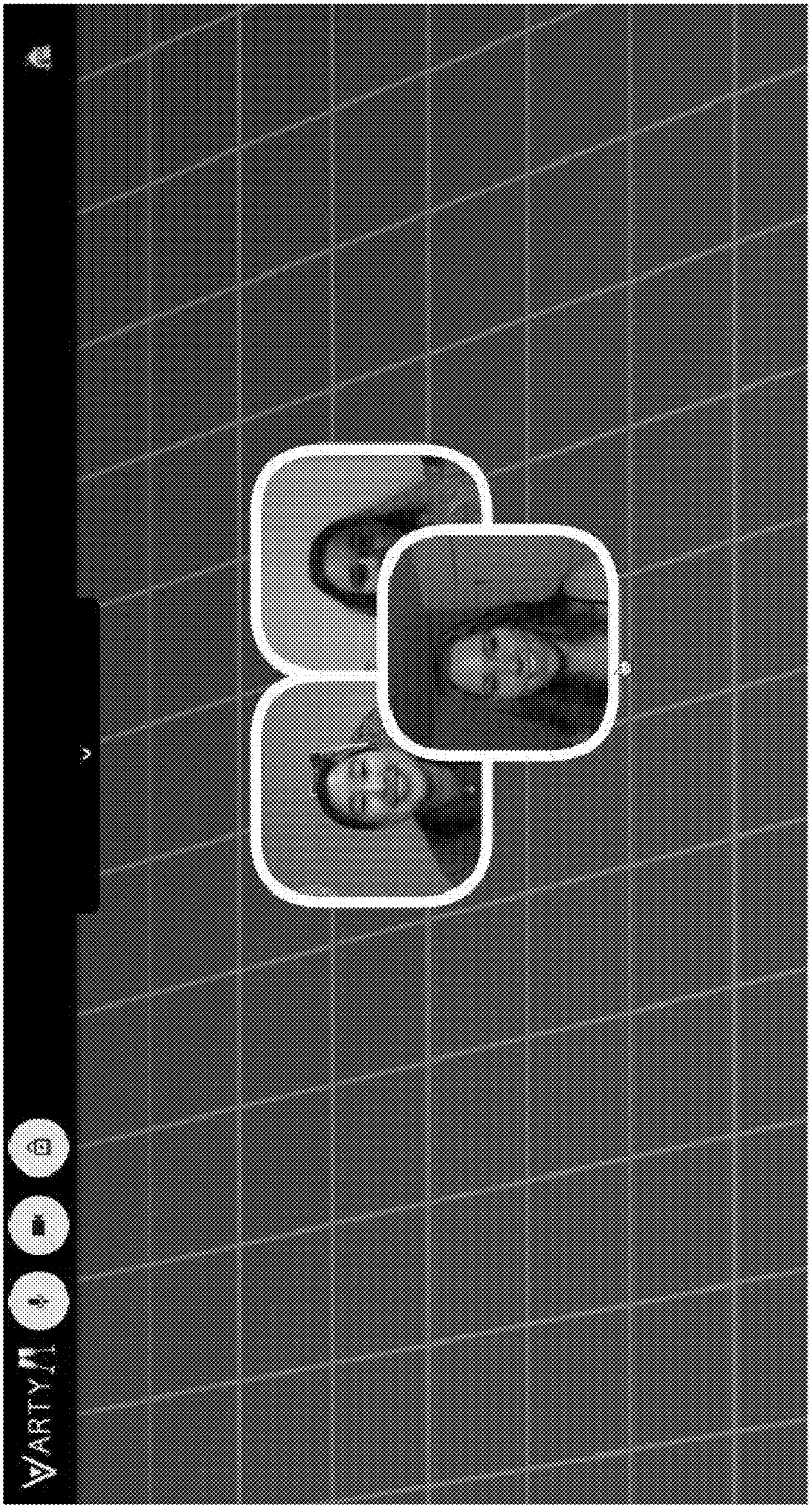

FIG. 3C—The virtual camera starts to zoom in and forced placement starts to take place.

Figure 3D:
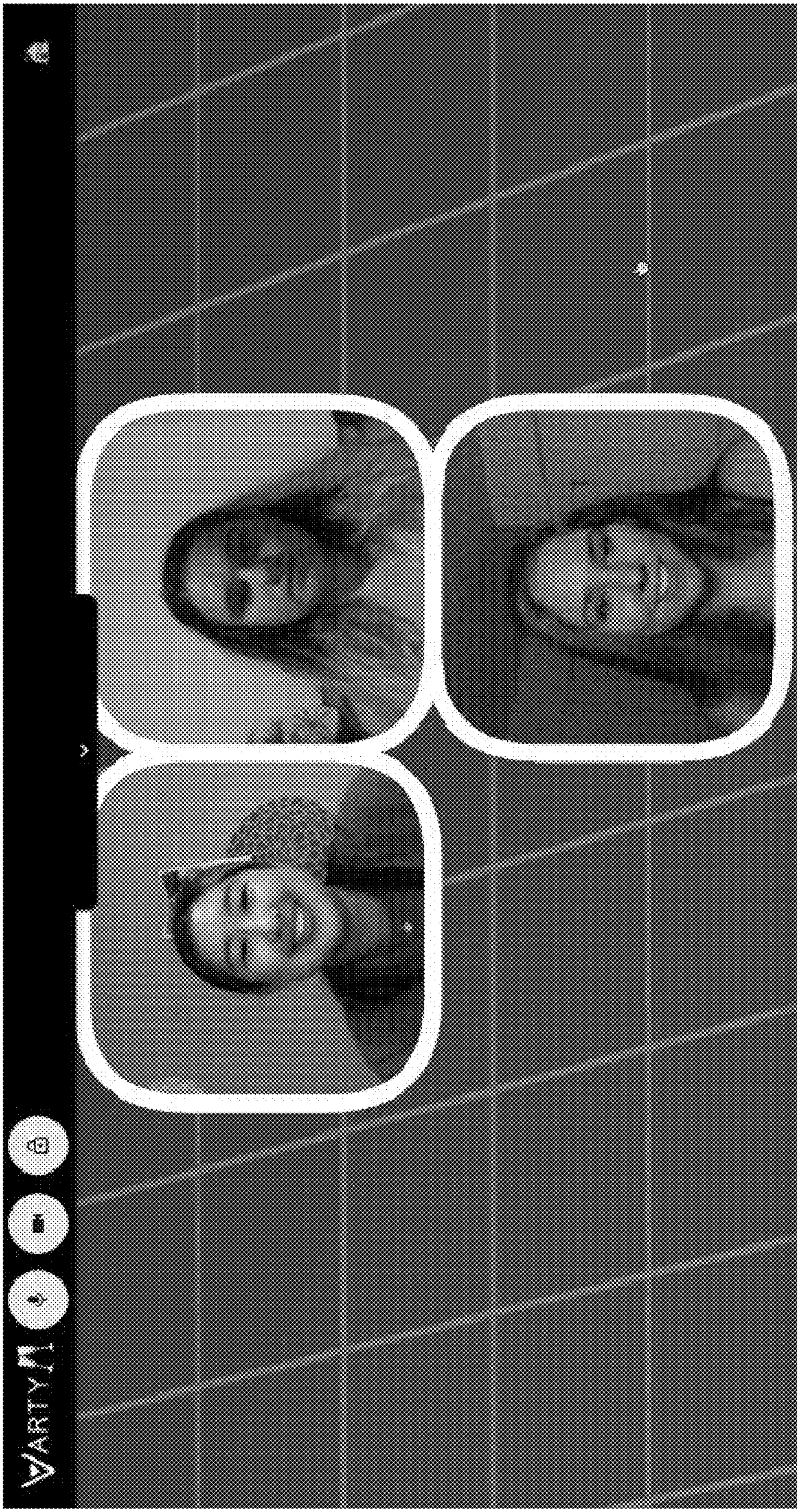

FIG. 3D—The virtual camera is fully zoomed in and the user is now a part of the call.

Virtual Proximity Based Call Mechanics — Leaving a call

Figure 4A:

FIG. 4A—Three users in a video call.

Figure 4B:
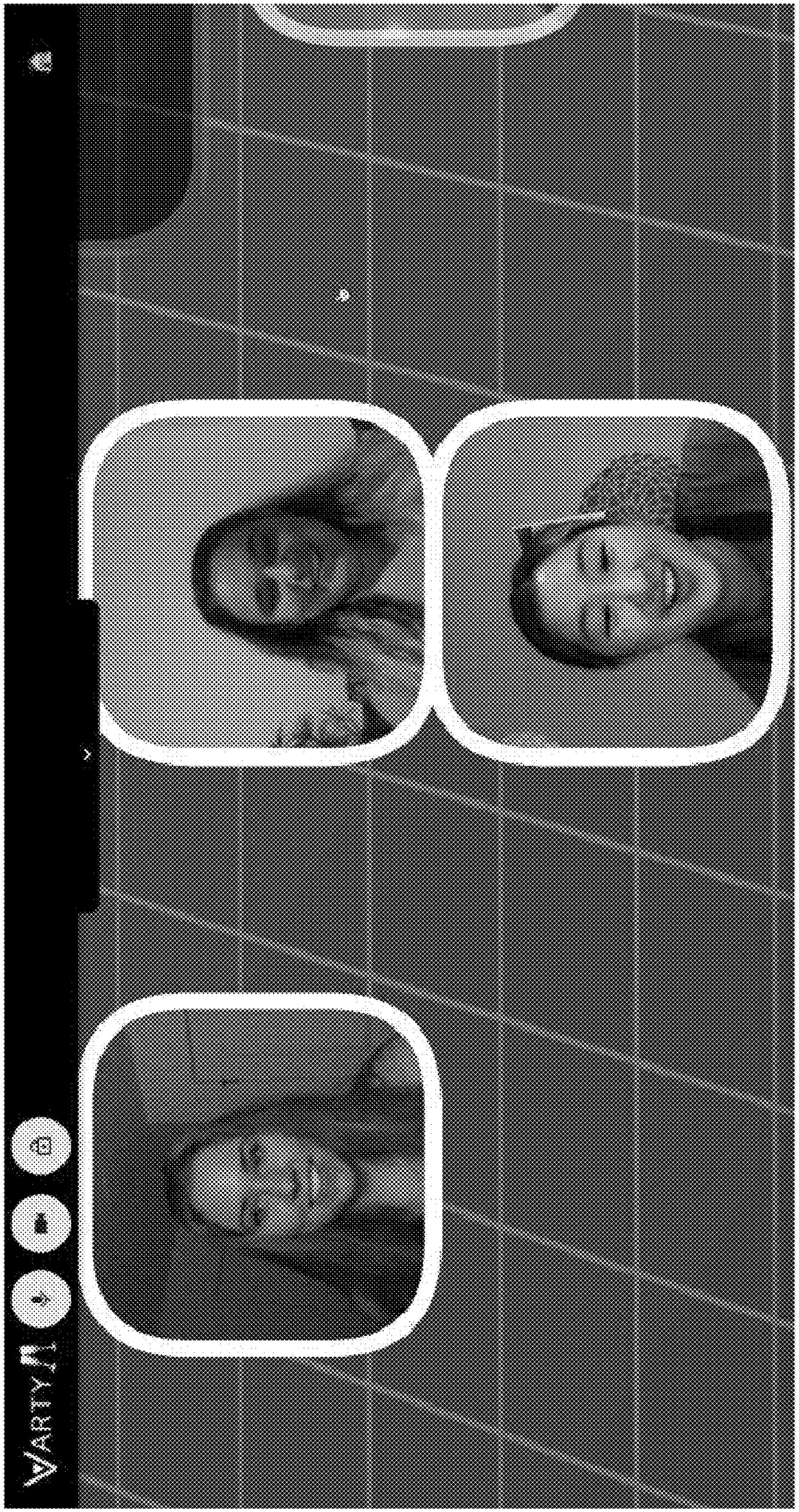

FIG. 4B—One user leaves the call by moving away.

Figure 4C:
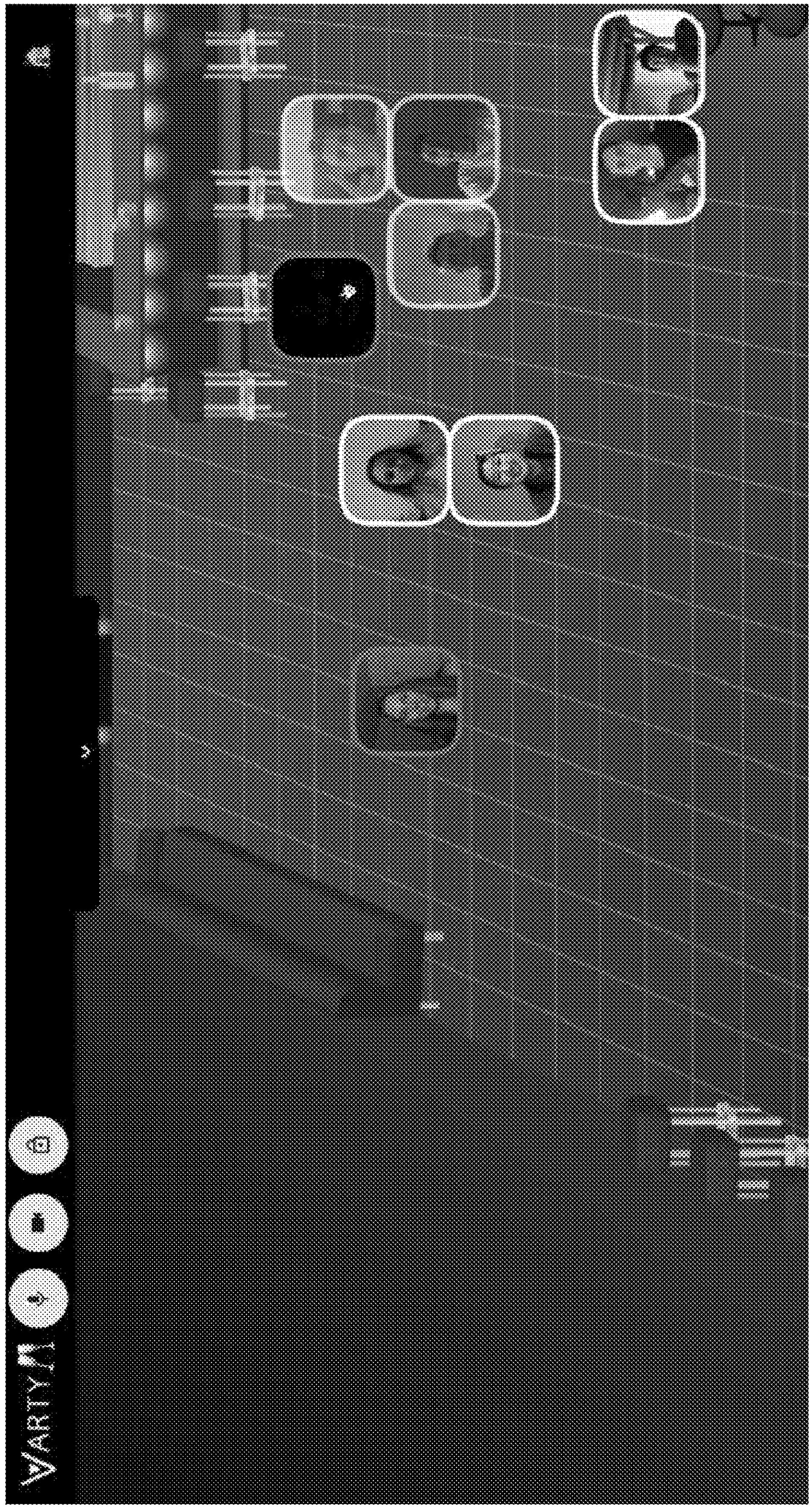

FIG. 4C—Her virtual camera zooms out and her frame goes back to gray.

Figure 4D:
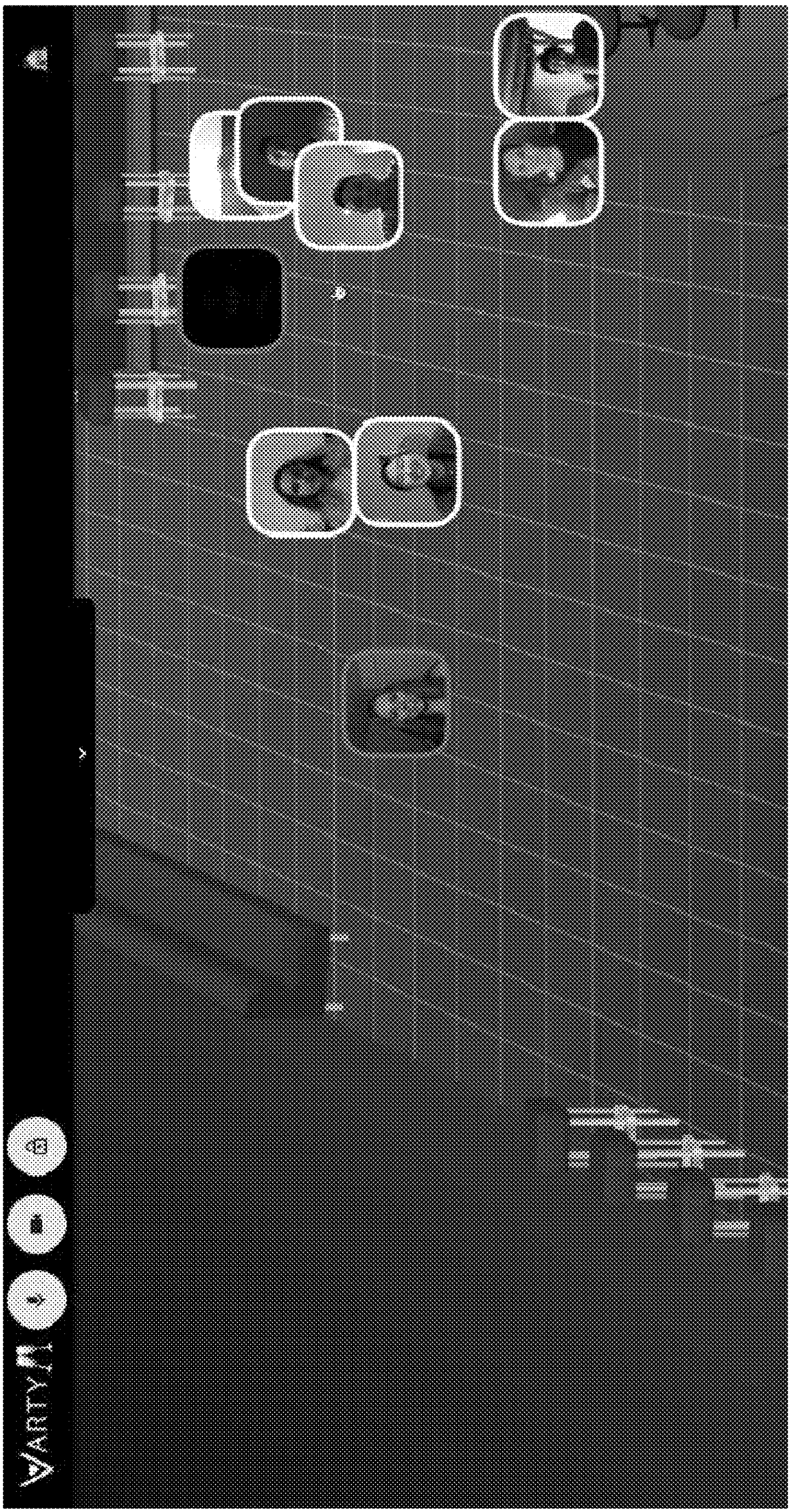

FIG. 4D—The remaining users in the call begin to rearrange automatically.

Figure 4E:
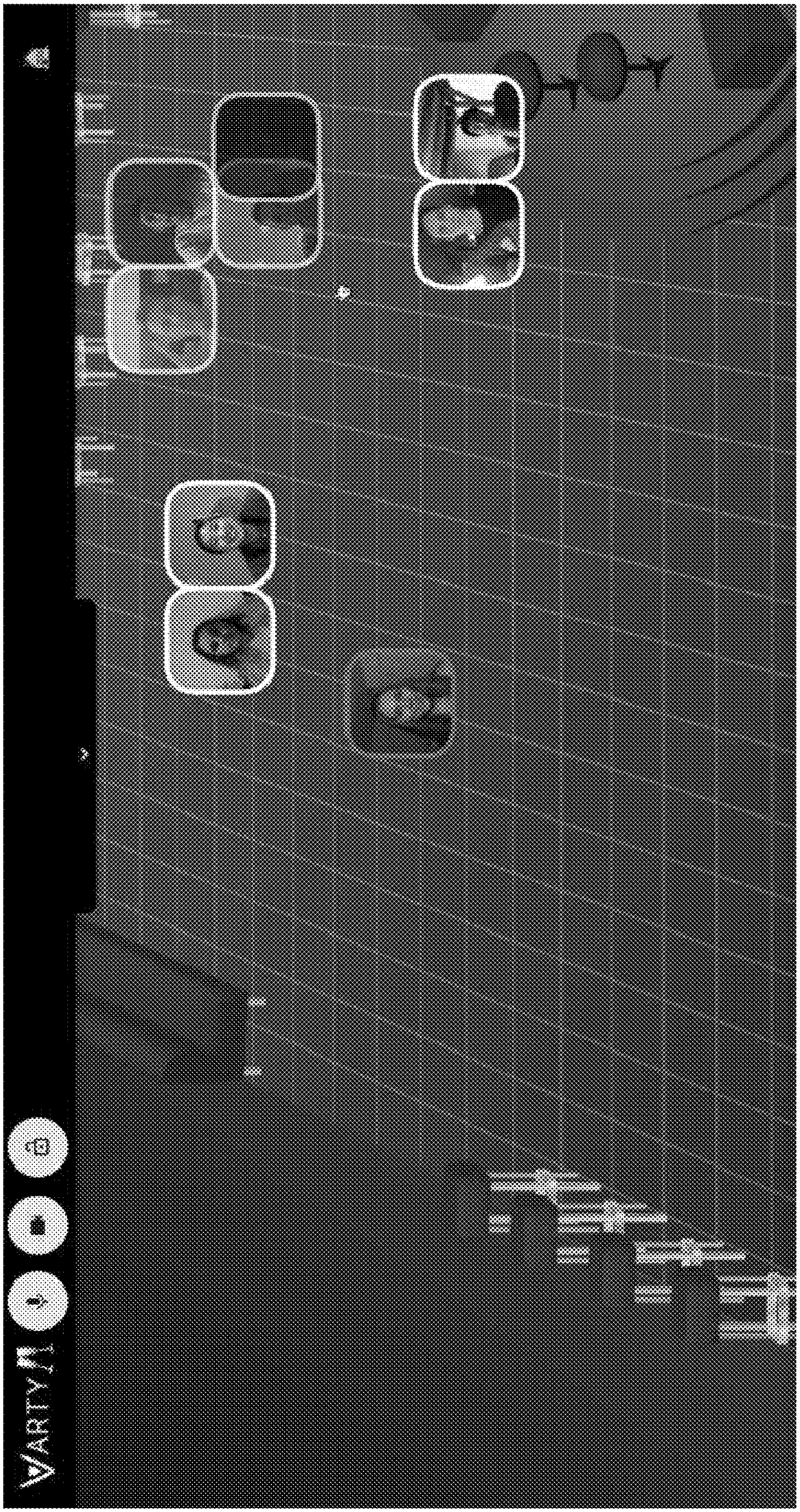

FIG. 4E—The remaining users in call are fully rearranged.

Avatar photo: Taking a photo upon entrance and having that photo be the avatar that moves around the virtual space

- A photo of the user will be taken every single time they enter a virtual space to capture how the user will look upon engagement in a video call.

Avatar Photo

Figure 5A:

FIG. 5A—User takes a photo before entering a room.

Figure 5B:
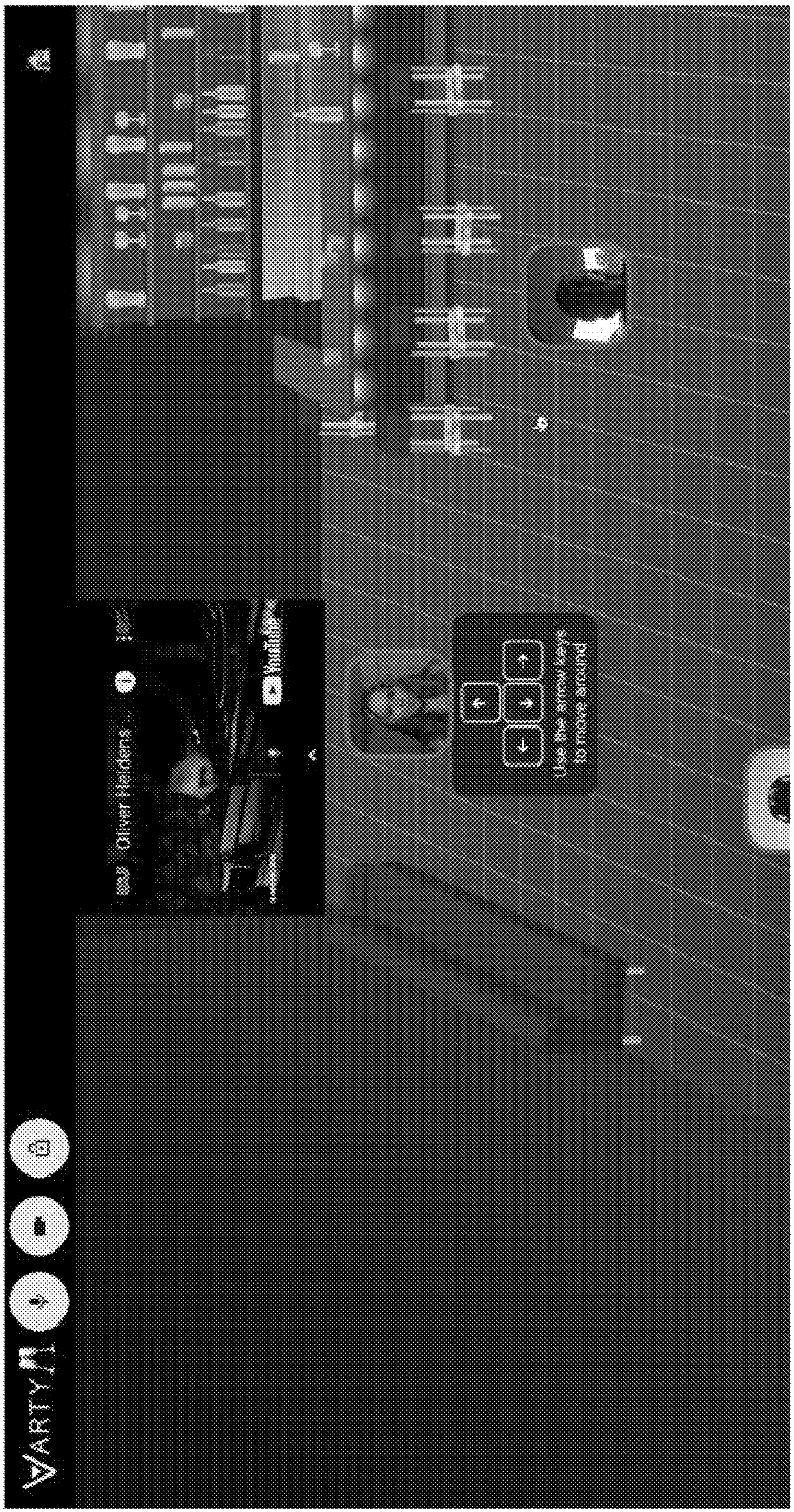

FIG. 5B—That photo is now her avatar photo. All other users see that photo as she moves around.

Figure 5C:
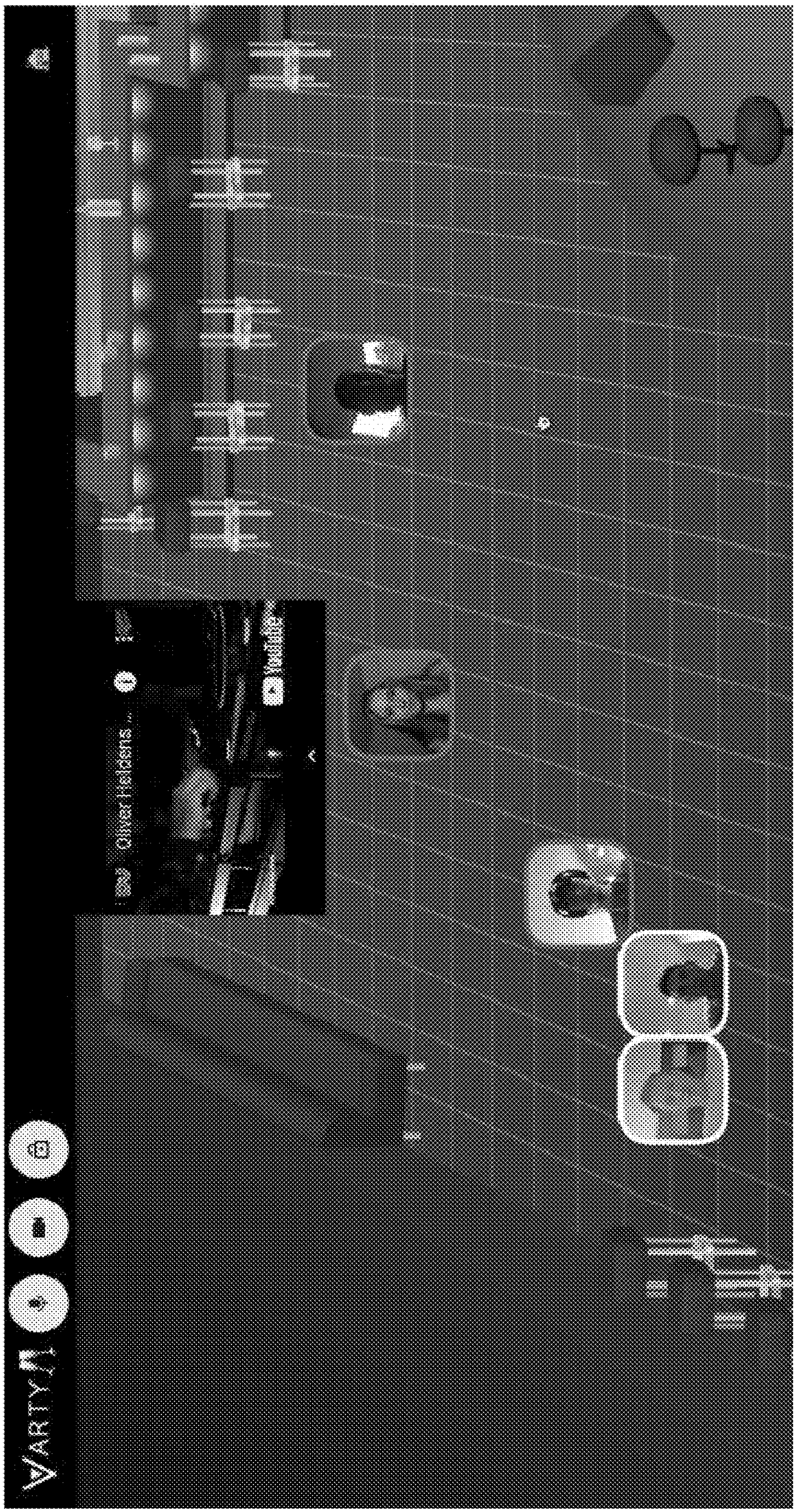

FIG. 5C—She can now move around with the given avatar. She will see her avatar with a live video, but it is a picture to everyone else.

Room selection: Some virtual spaces will have entrance requirements that are based on profile inputs, only have access to places where you check boxes.

- Users will be shown room suggestions based on rooms they meet the requirements to enter for and rooms for which their profile data indicates they would be interested in.
- For instance, only users ages 20-30 have access to the virtual spaces for 20-30 year olds.
- For instance, only users with a verified @berkeley.edu email have access to the Berkeley room.

Geographically based rooms:

Users can enter rooms only within a particular location.

Friends-based rooms:

Can enter rooms only that a friend is in.

Private room: Access to a hub (as in a private virtual room allocated to each user) to invite people to your room, allowing for users to naturally curate their own private events, selecting the total set of people that can access their given room—merely by inviting friends to it. They can also upload a background image. They are given the ability to remove people at whim from the room.

Figure 6A:
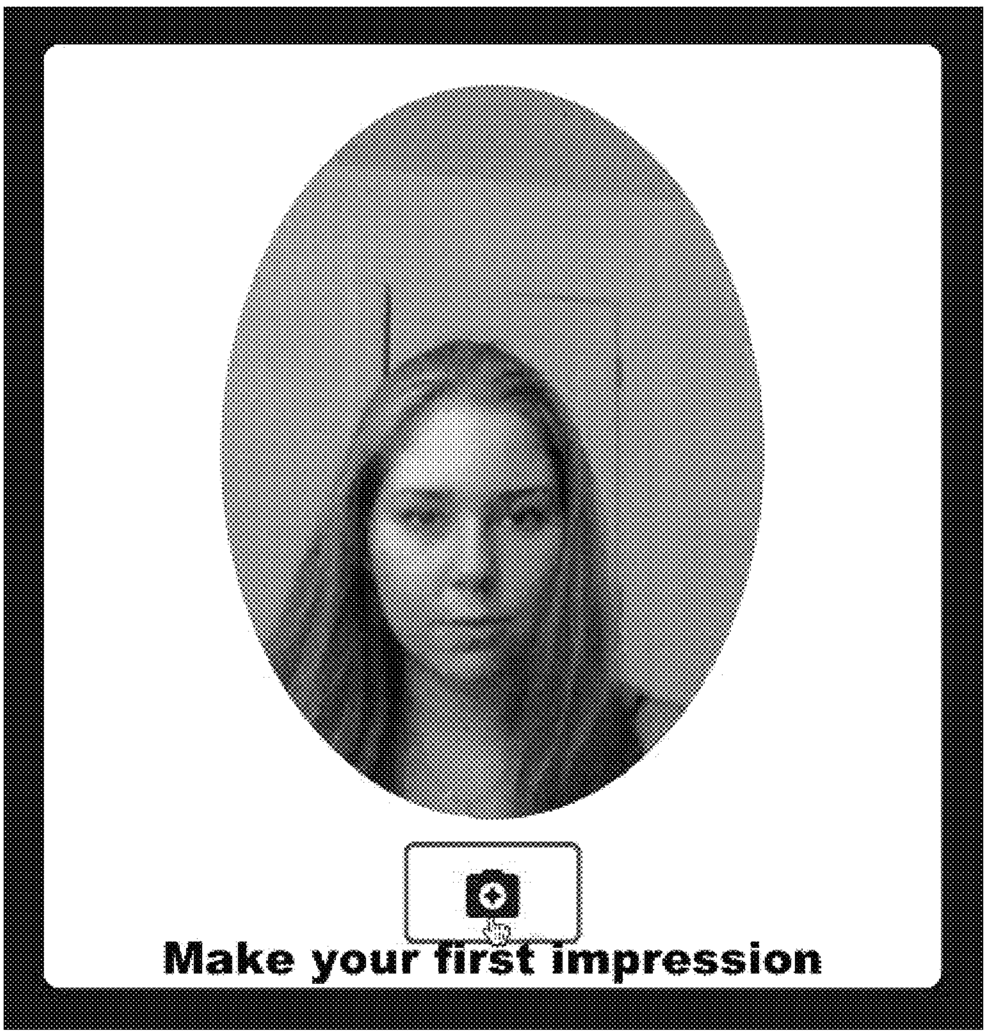

- A user can enter their own hub and send room invitations to a selection of friends to create an event inaccessible to the public. The hub owner will be the host of the event and have full control over its attendees Room Selection—Public Rooms FIG. 6A—Before entering any room, user takes a photo.

Figure 6B:
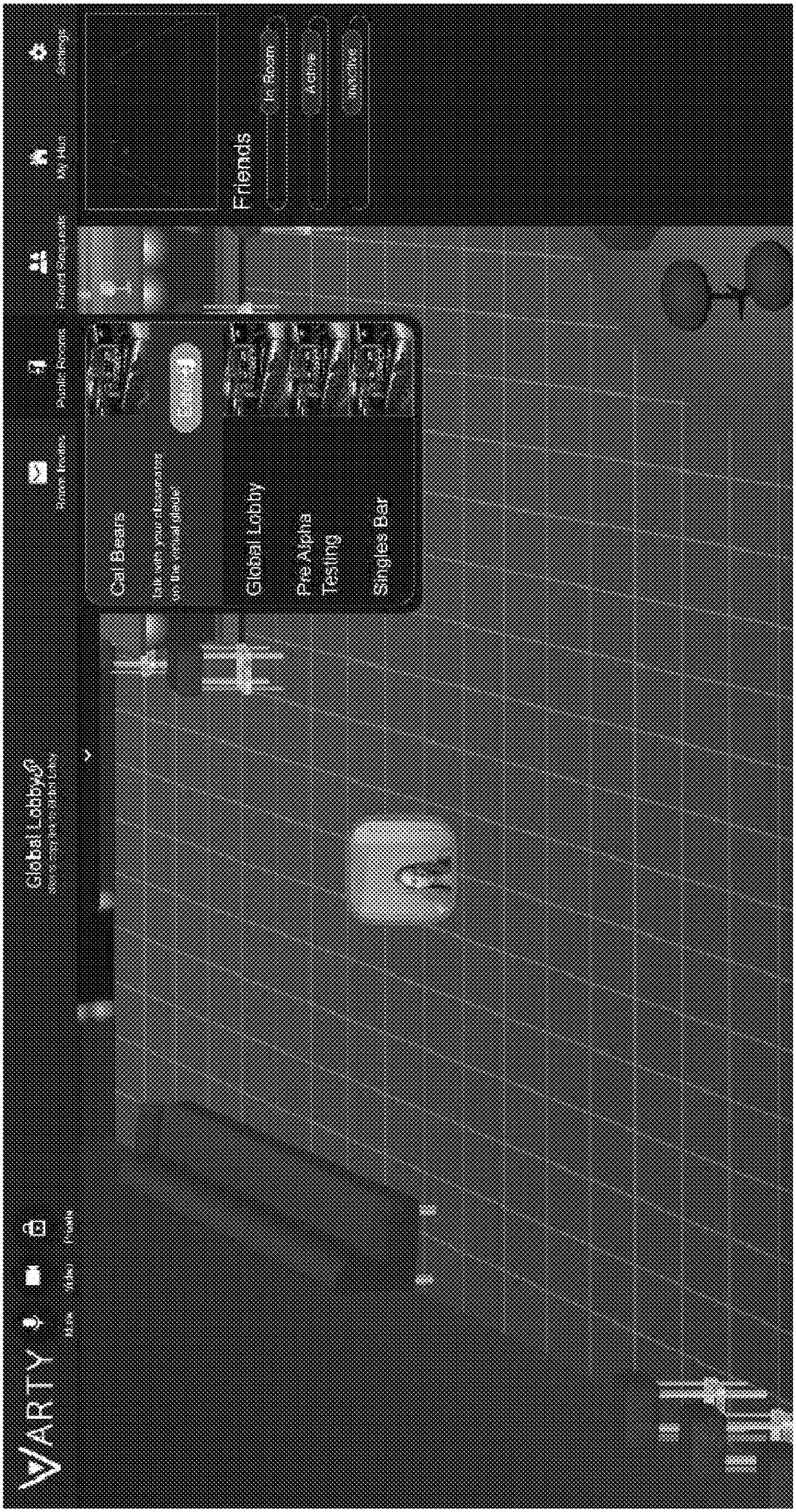

FIG. 6B—All users first land in the global lobby. They can then move to other rooms from there by clicking enter on the event.

Figure 6C:
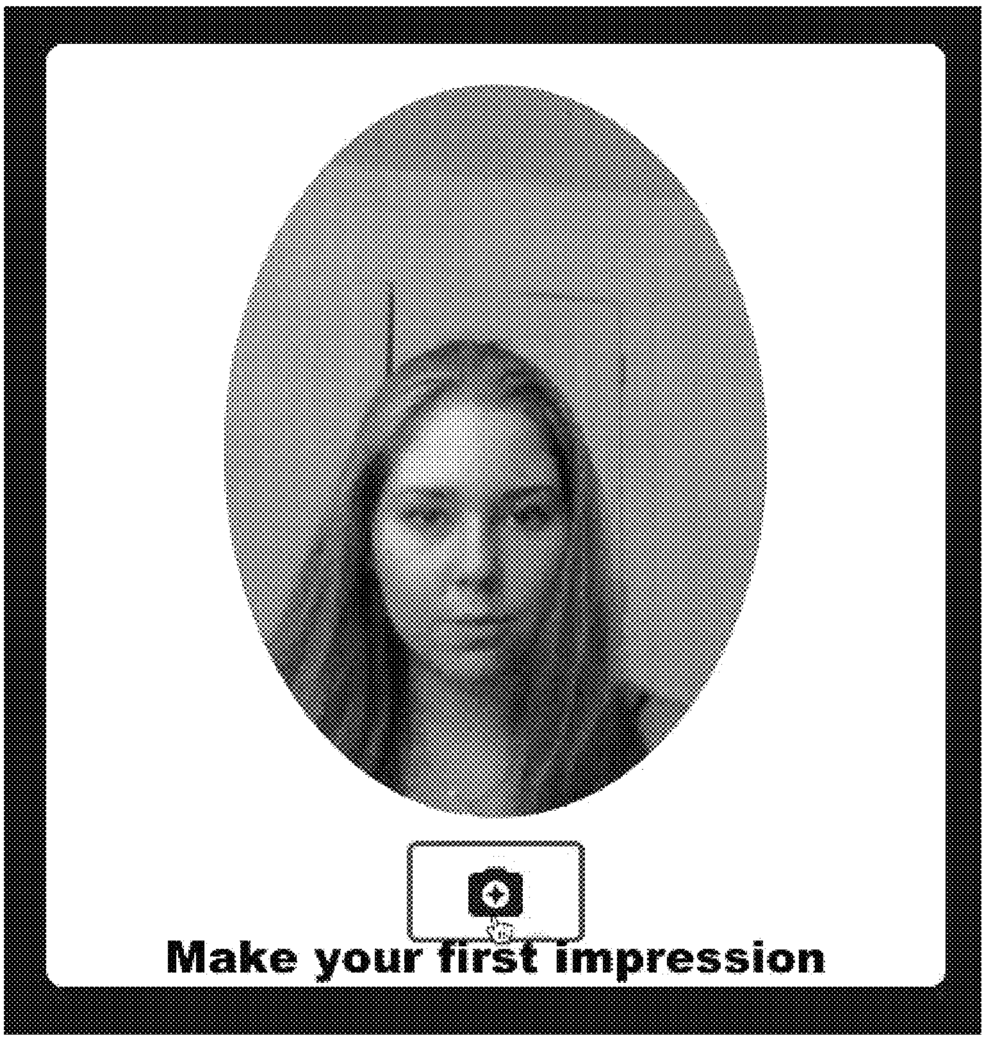

FIG. 6C—User retakes the photo before entering the Cal Bears room.

Figure 6D:
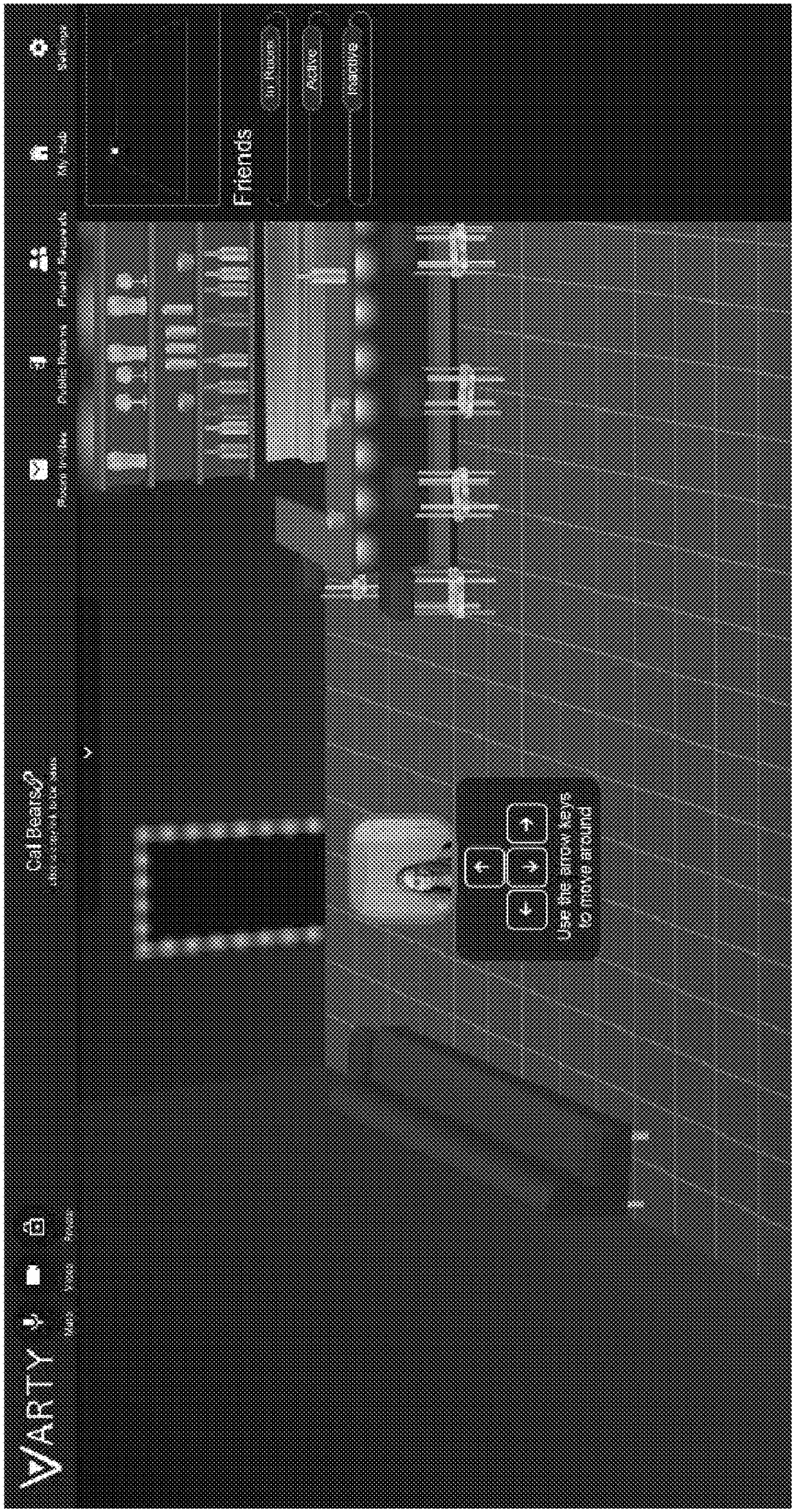

FIG. 6D—User is now in the new room.

Room Selection—Offering more Tailored Rooms

Figure 7A:
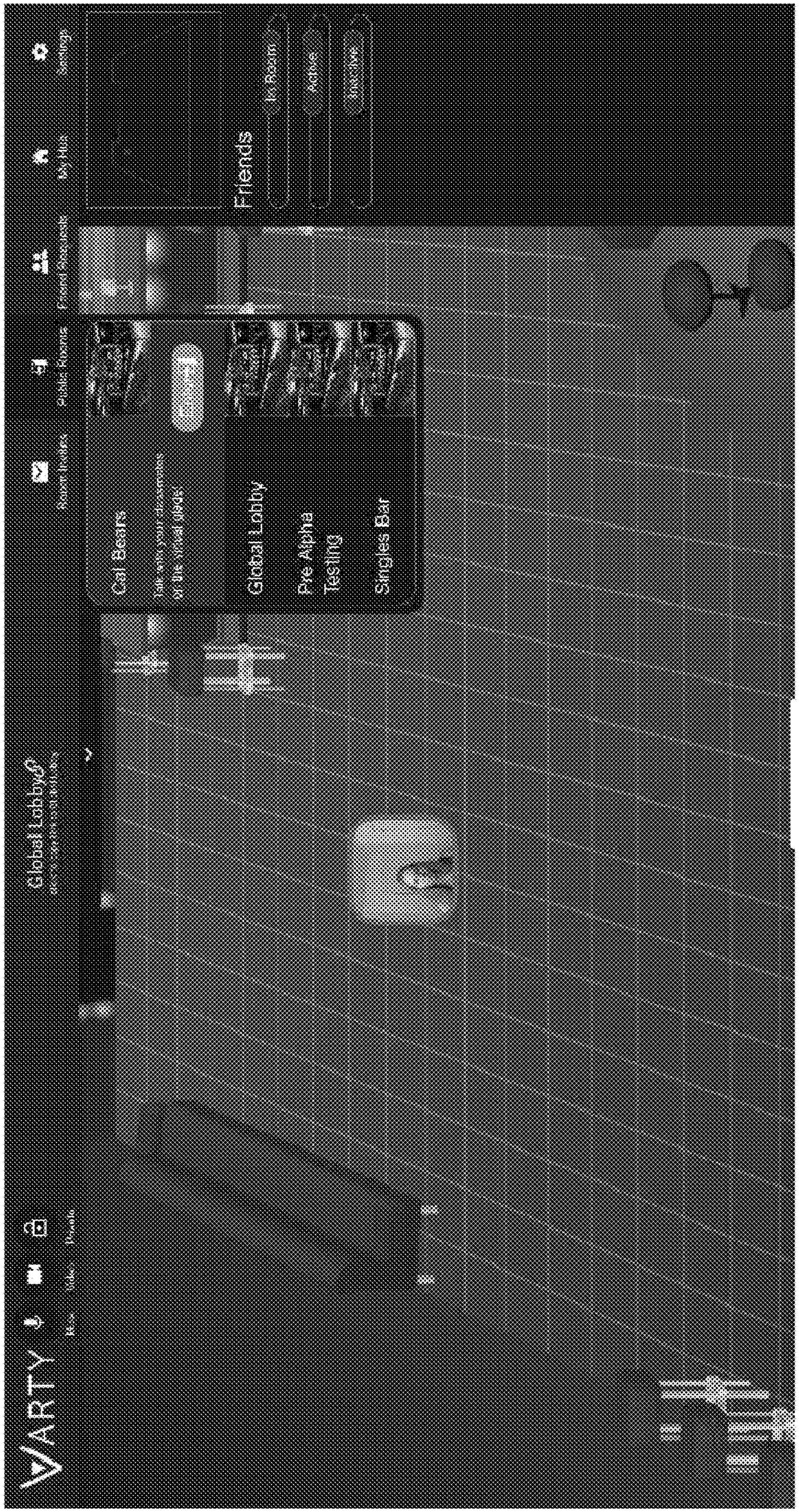

FIG. 7A—Users will have a variety of rooms to choose from, some based on their geographic location, some based on their friends locations, some based on rooms we believe they would find interesting.

Figure 7B:
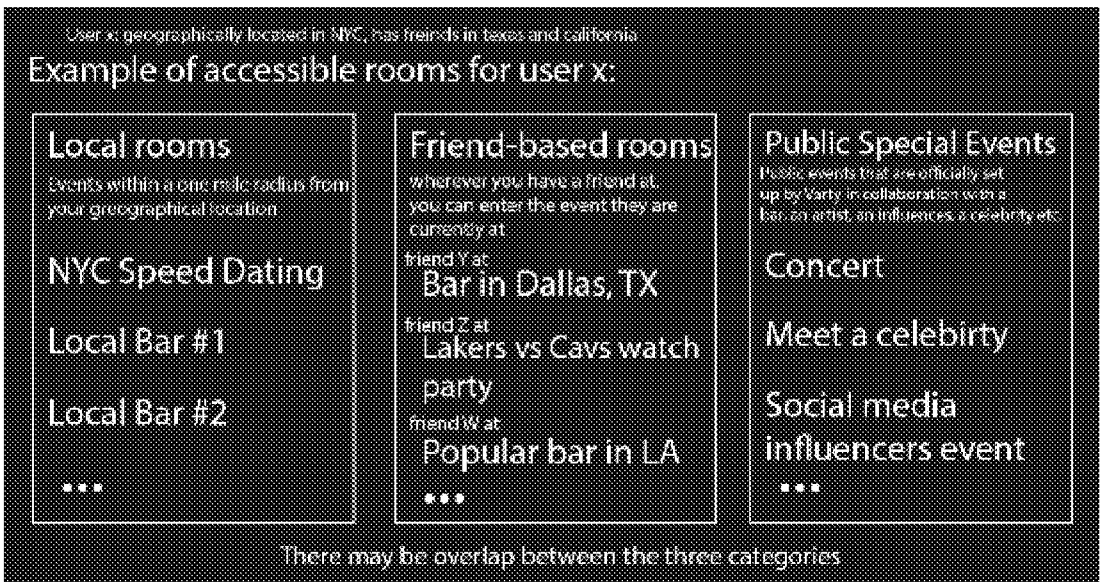

FIG. 7B—An example of more rooms.

Private Room

Figure 8A:
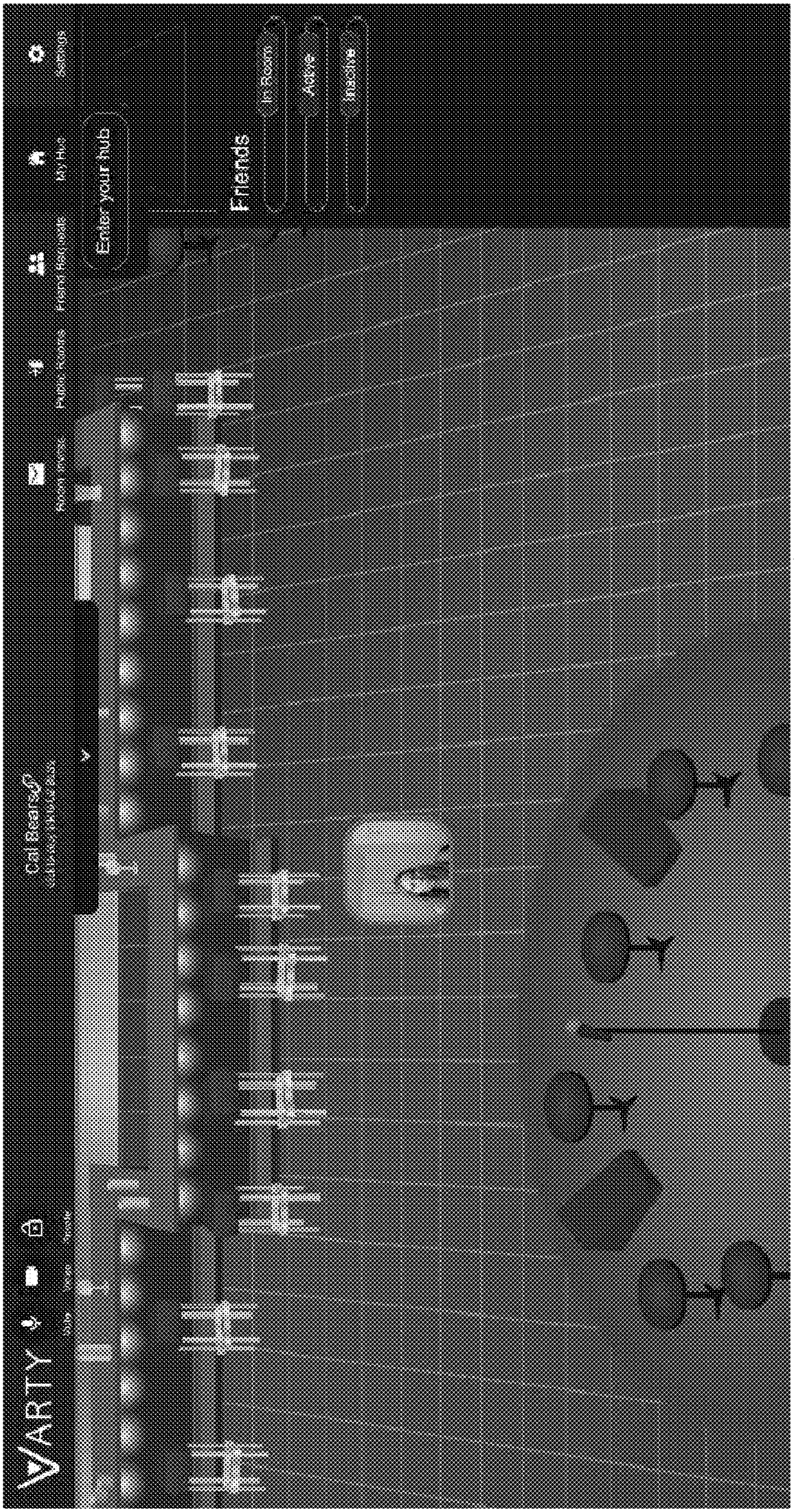

FIG. 8A—Every user has their own private room called the "hub".

Figure 8B:
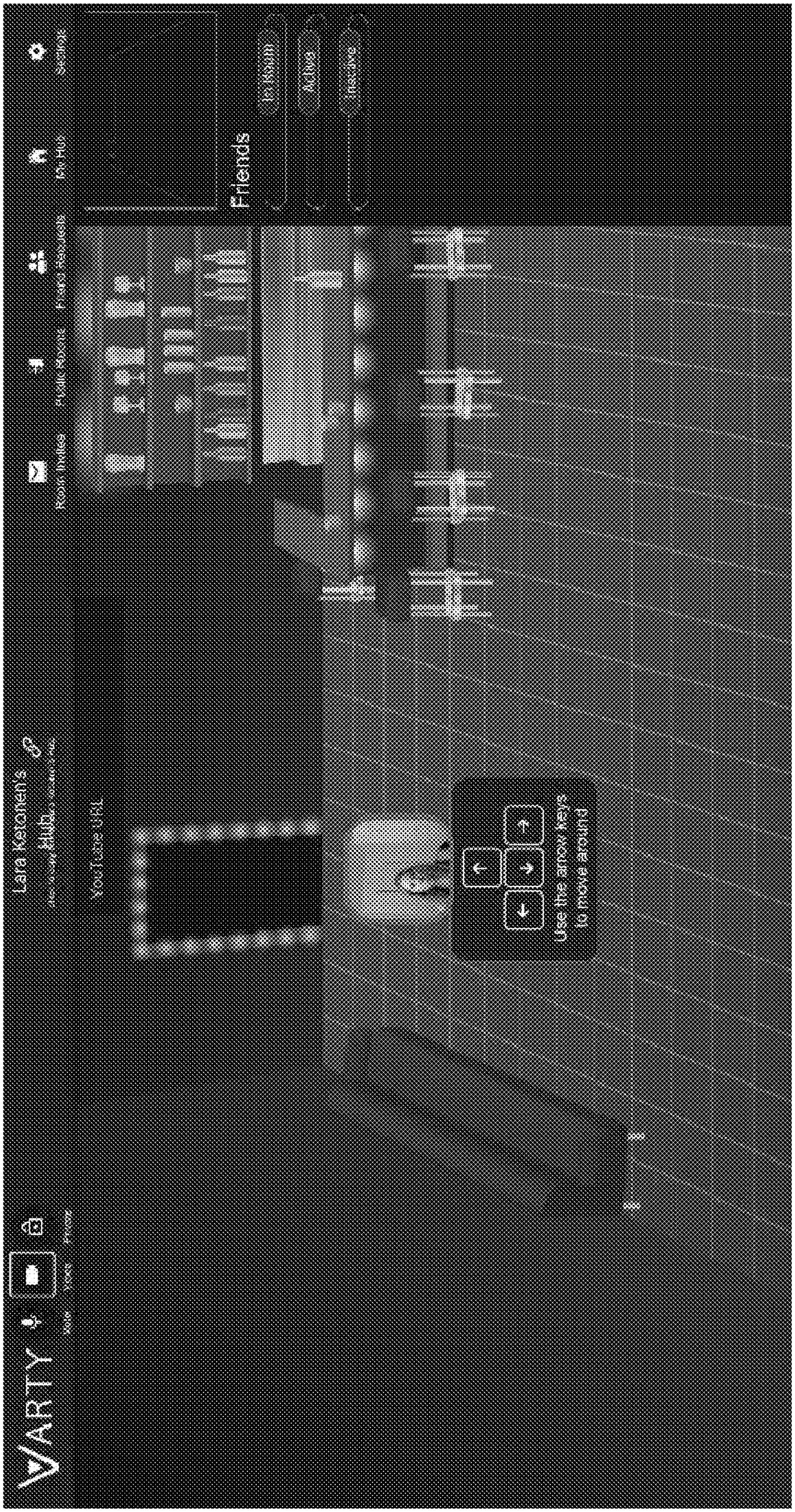

FIG. 8B—They can enter the hub from any room and invite friends to it

Figure 8C:
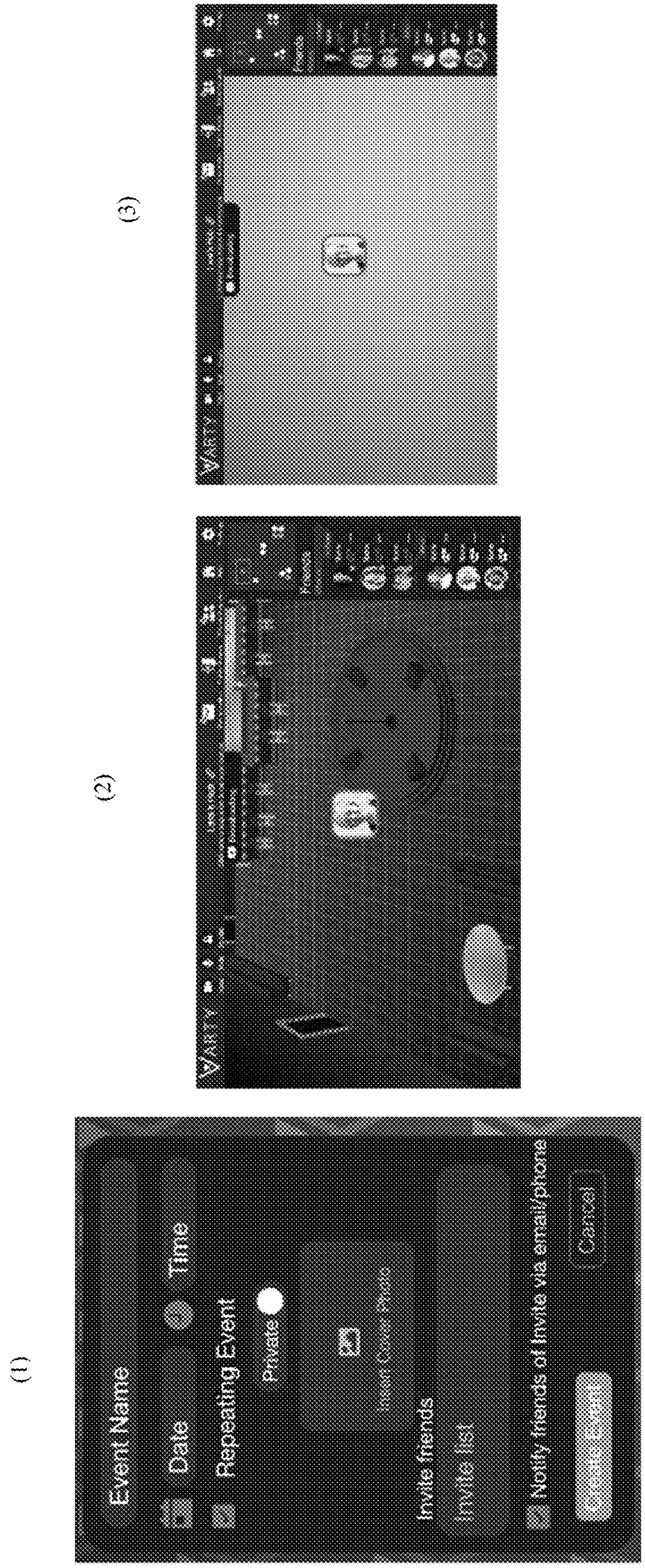

FIG. 8C—In their hub, the host is able to: (1) Schedule a future event that will take place in their hub and send invites out to a selection of friends (2) broadcast (3) remove friends from hub (4) change the background of the hub.

Figure 8D:
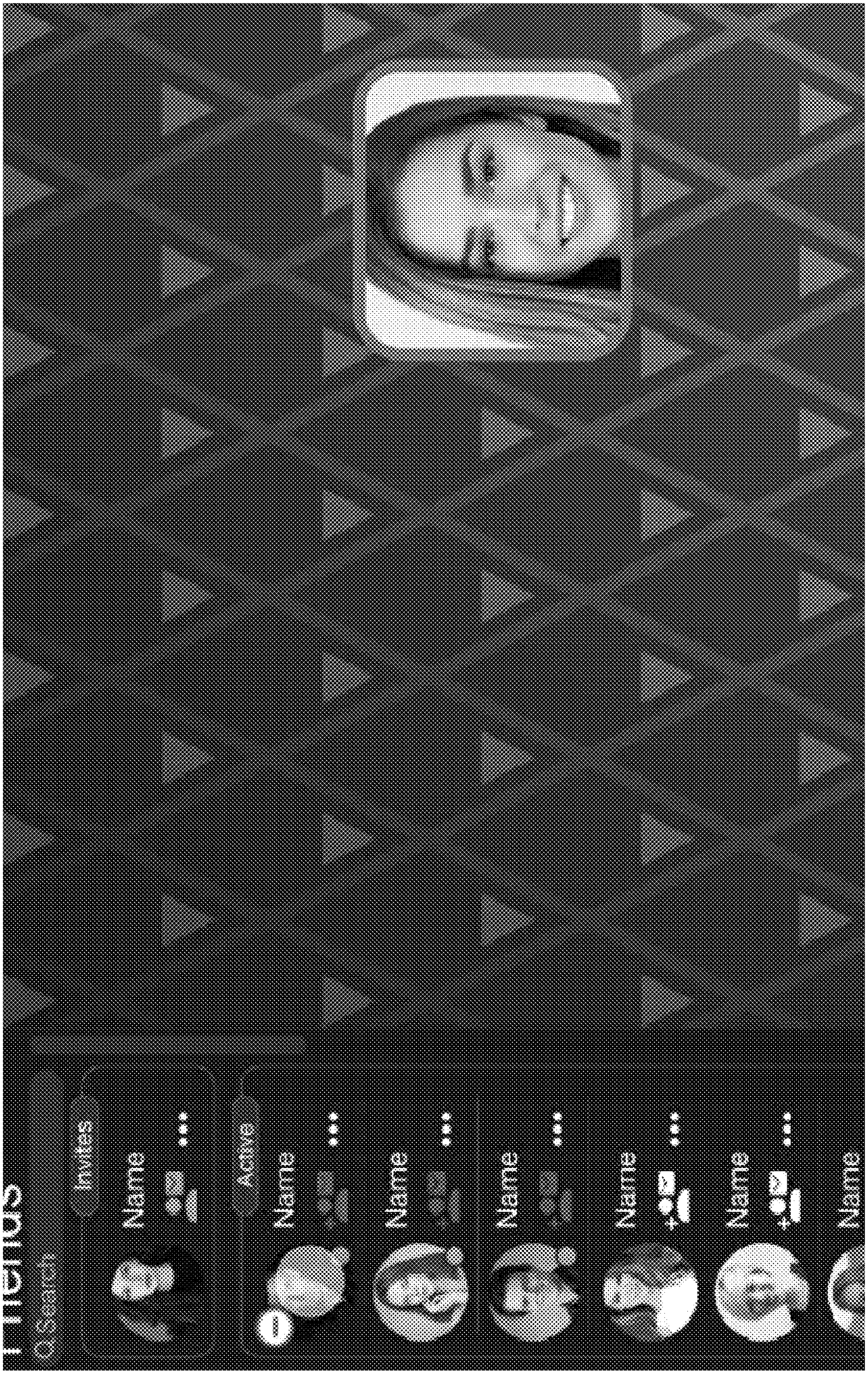

FIG. 8D—In their hub, the host is able to remove people from their hub. Hovering over a friend while in your hub makes a minus sign appear.

Figure 8E:
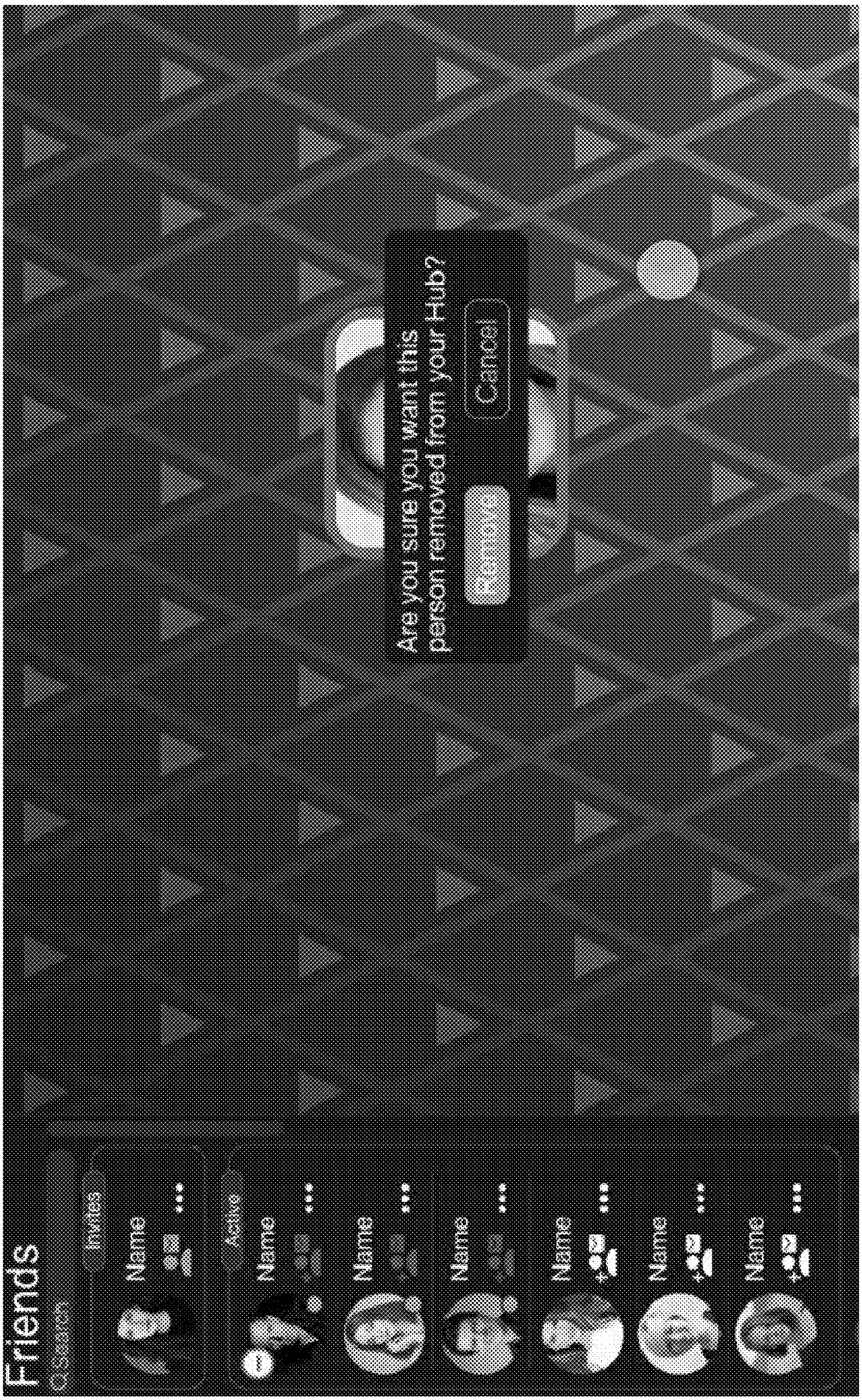

FIG. 8E—Clicking on the minus sign gives a pop up that allows you to remove your friend from your hub.

Figure 8F:
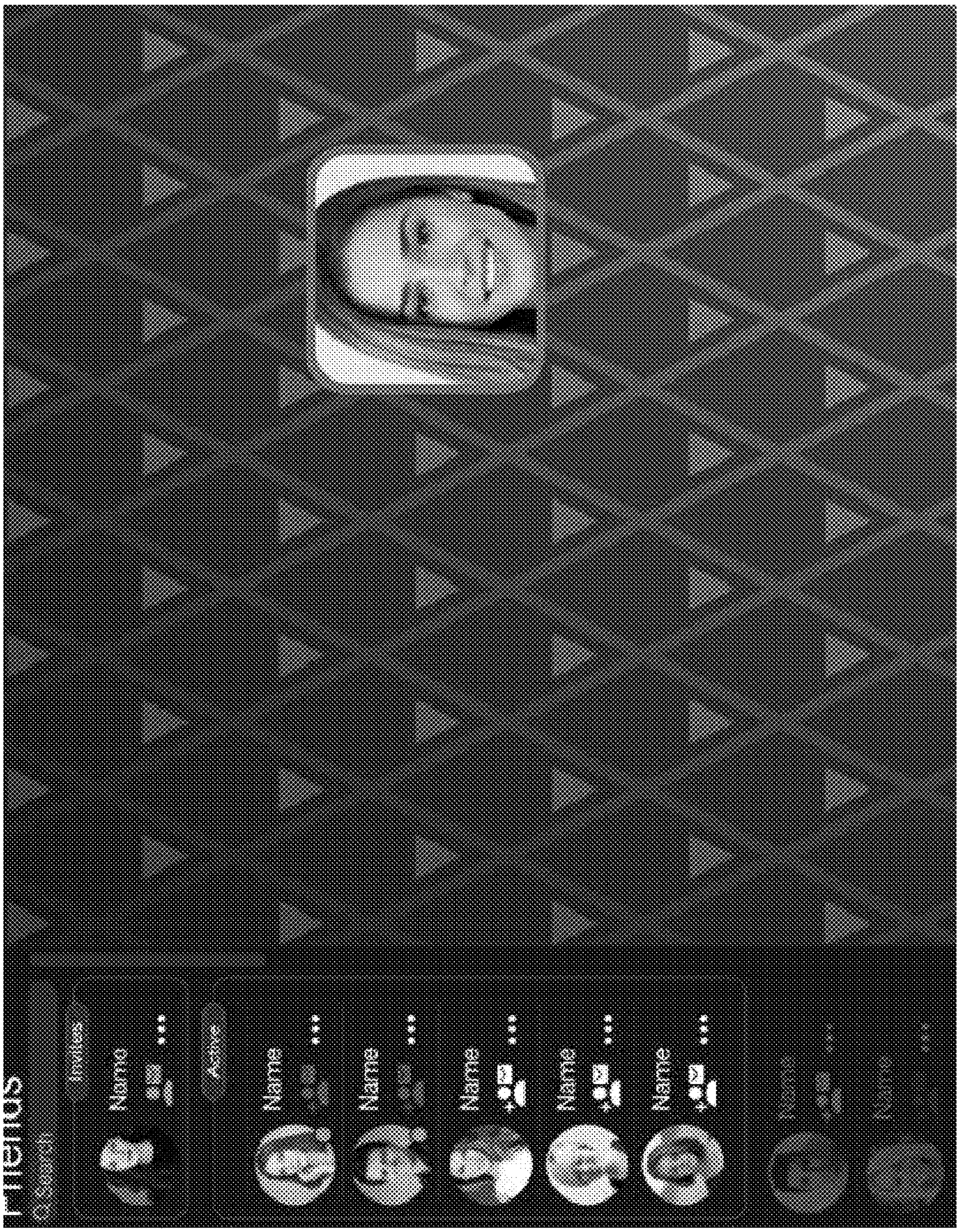

FIG. 8F—The friend is then removed from the list of people "in room".

Broadcasting: Within a personal hub, the host (owner of the hub) can "broadcast" a video of their choosing for everyone in the virtual room to see.

- As the event host, they can choose to show their own live video output to make an announcement to all room attendees. Alternatively, they can choose to upload a video from the internet (via a YouTube® link for example) to broadcast to the entire room.
- For instance, the host can play music by uploading music videos from YouTube®.
- Event attendees have control over their personal output volume for the broadcasted video.

Broadcasting

Figure 9A:

FIG. 9A—Host can choose to broadcast a YouTube video, their own uploaded video, their live webcam video, or their own screen.

Figure 9B:
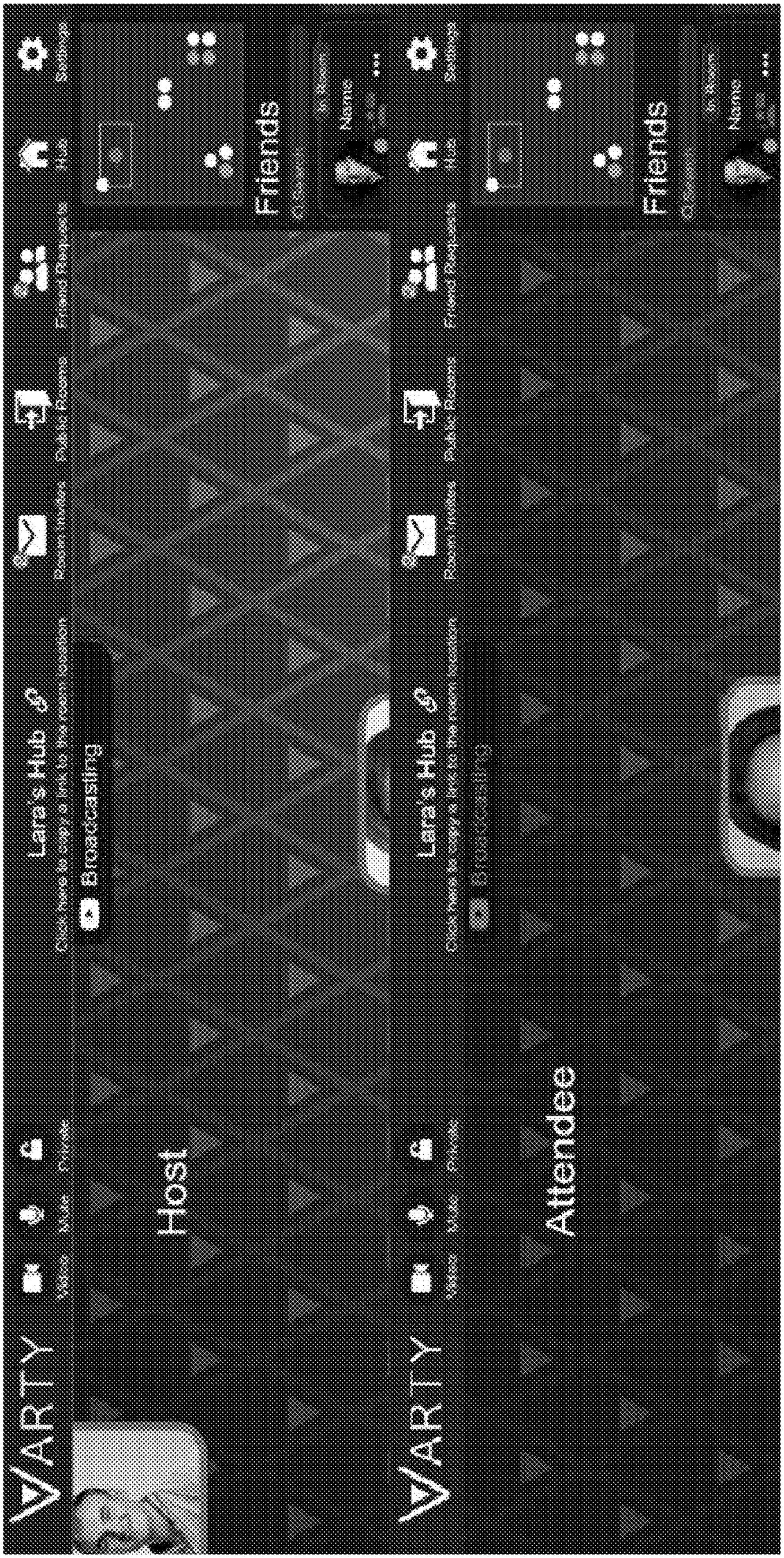

FIG. 9B—In a hub, only the host has the ability to start the broadcast.

Figure 9C:
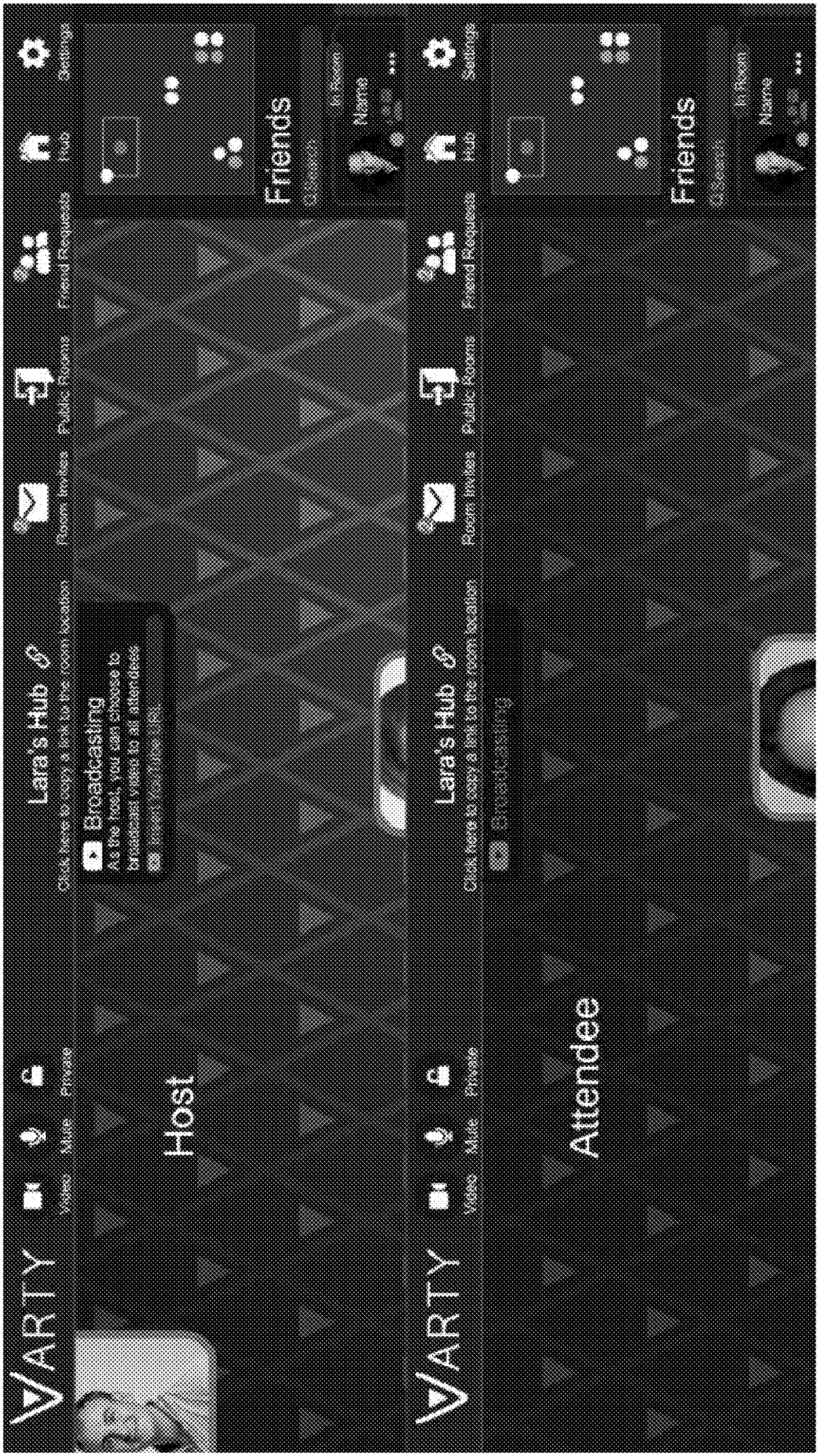

FIG. 9C—They can look up a YouTube video to play (or one of the other things listed earlier).

Figure 9D:
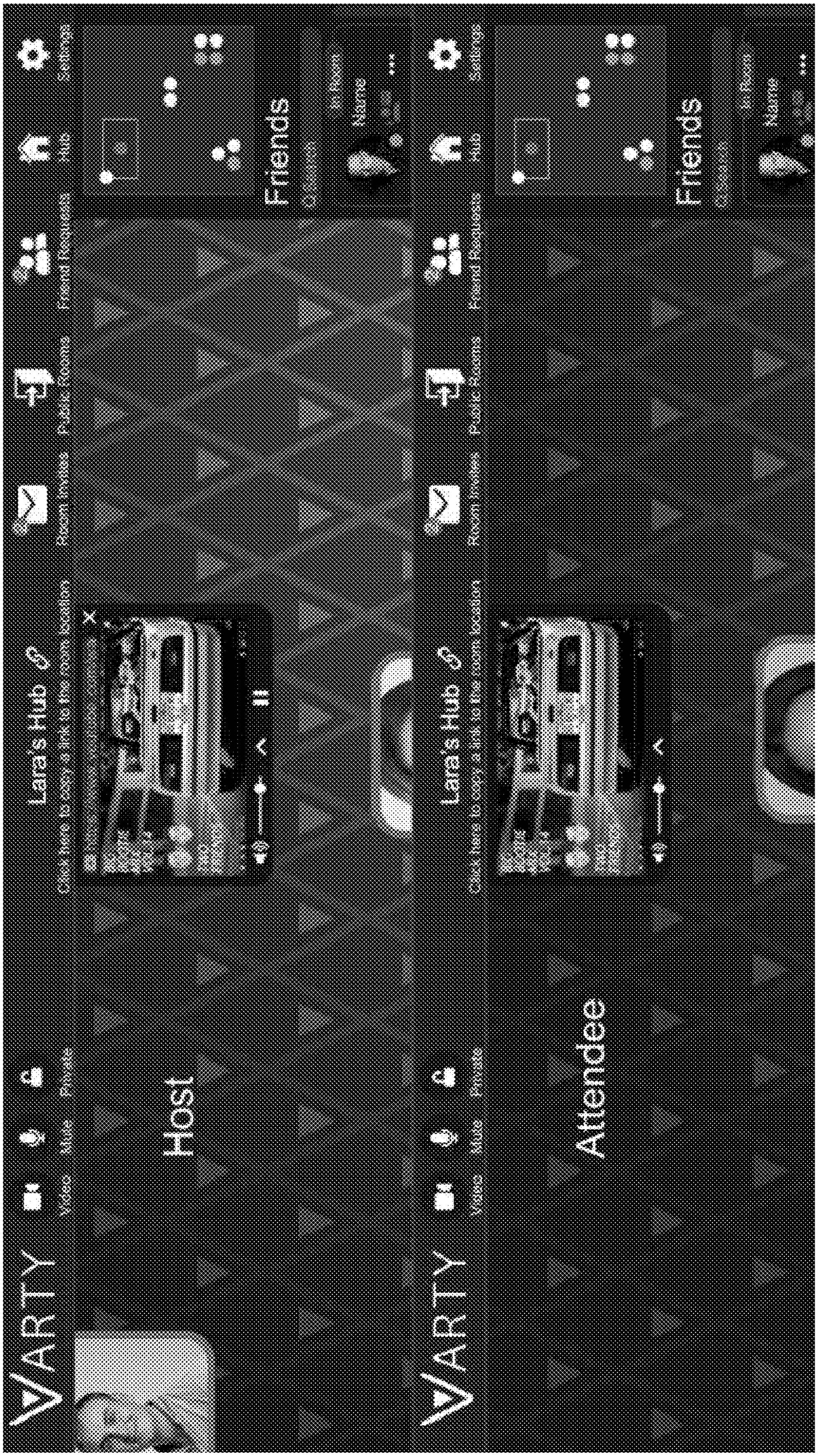

FIG. 9D—Once a video is started, the broadcasting tab will pup up for every attendee and they will listen / watch the video in sync.

Figure 9E:
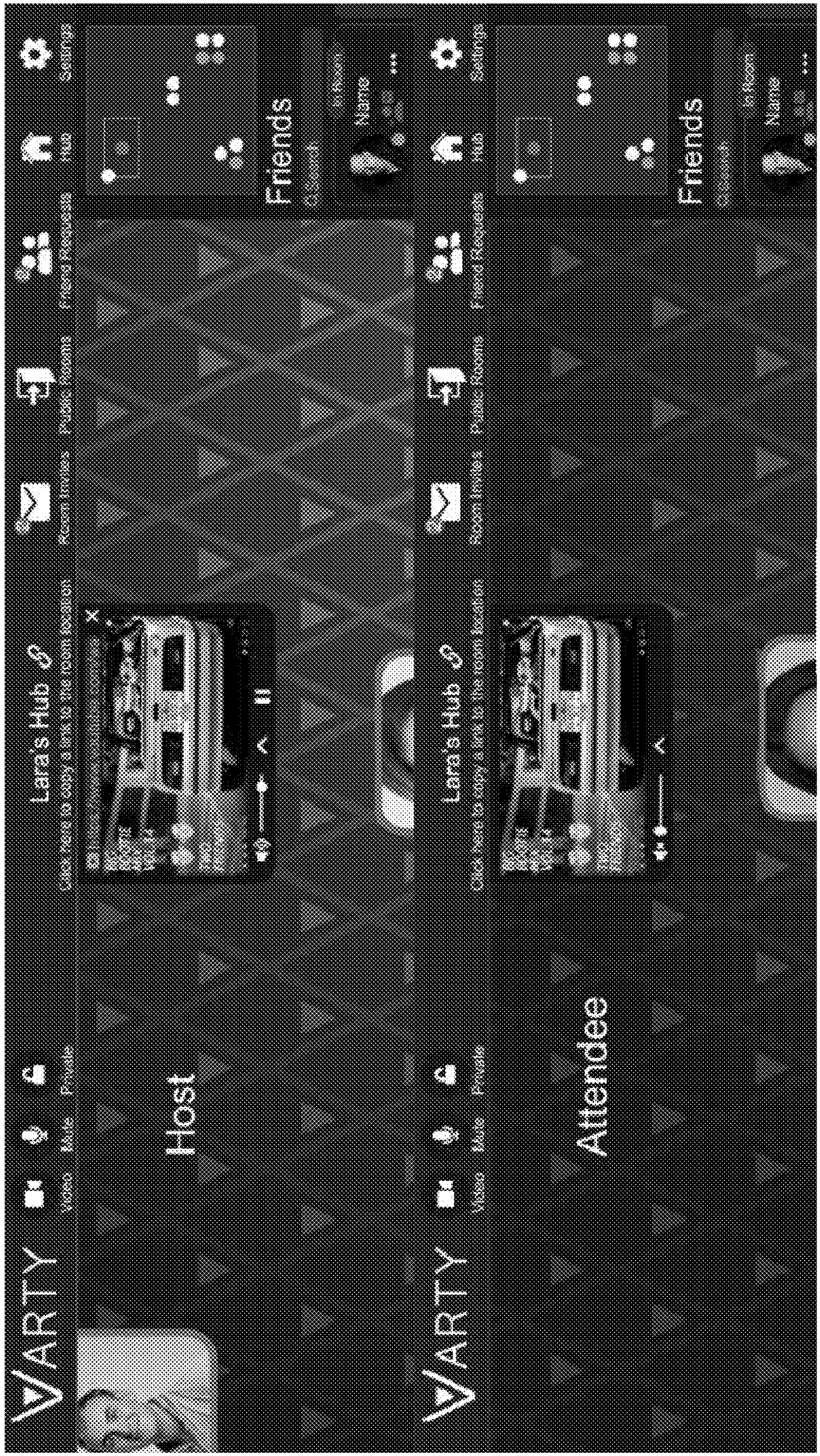

FIG. 9E—Users can independently choose the volume they want the broadcasted video played at.

Figure 9F:
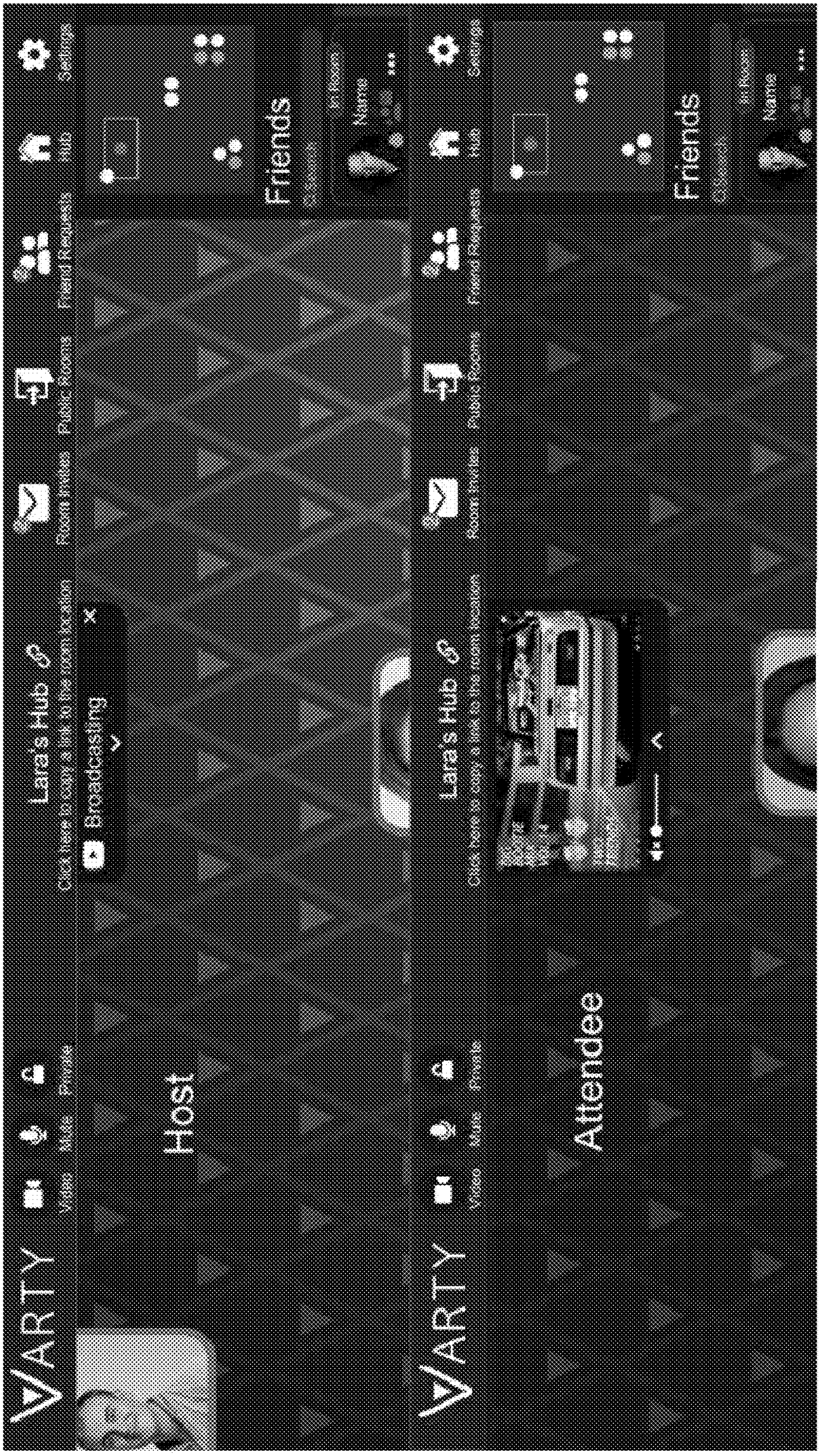

FIG. 9F—Users can independently choose to minimize the video so that they only hear the audio (to listen to music for example).

Figure 9G:
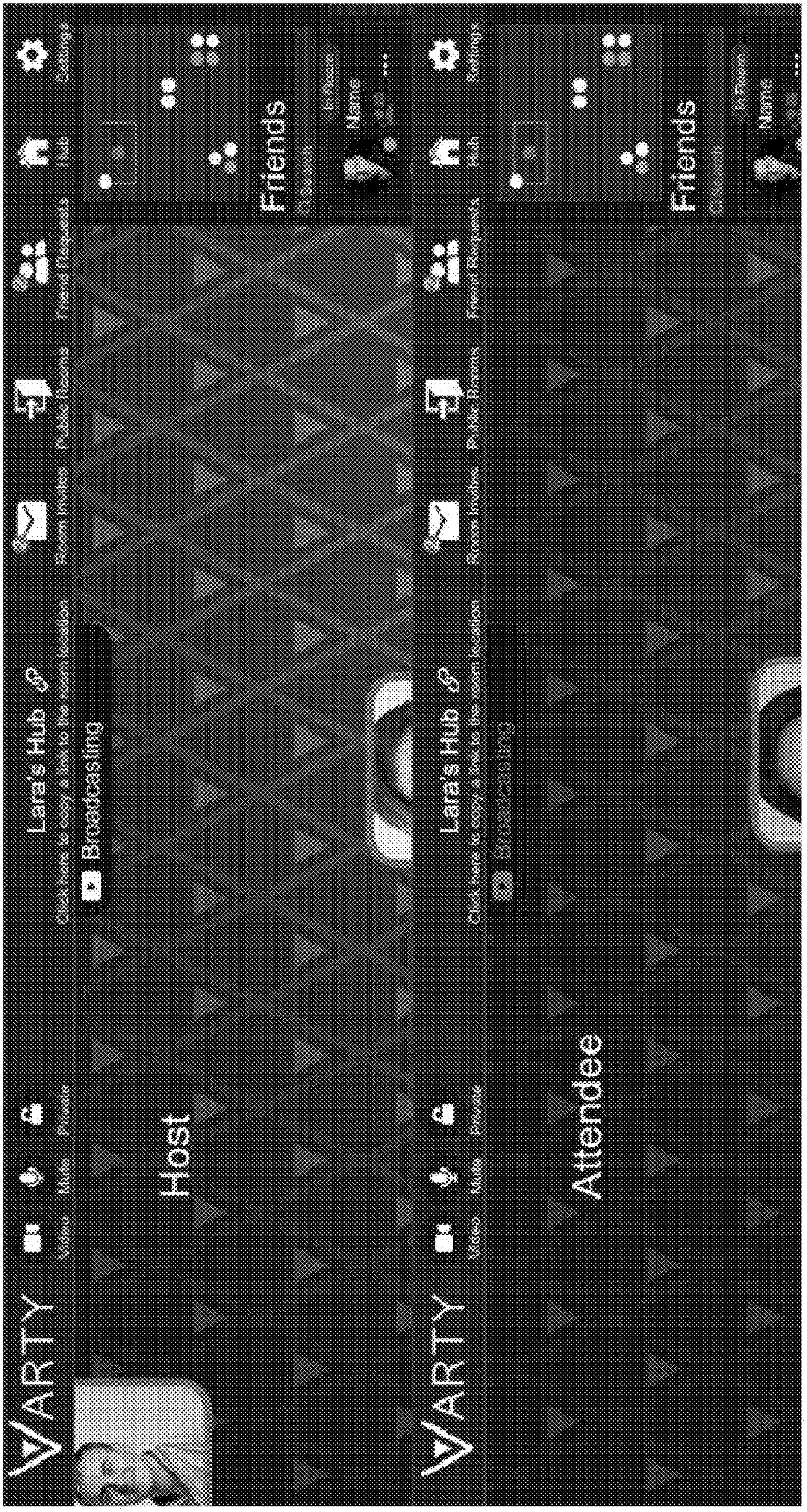

FIG. 9G—Only the host has full control over the what video is playing and when. If they close the video, it will disappear for all attendees.

Private Mode: An ability to have private conversations by blocking others from entering your video call via clicking a lock icon. Also enables the user to put themselves in private mode to move around the room without getting drawn into calls.

- Everyone in a group video call has the ability to turn private mode on or off for the entire call.
- The avatars of users or group calls in private mode will be more faded out to visually signal inability to engage in a call.

Private Room—In a call

Figure 10A:
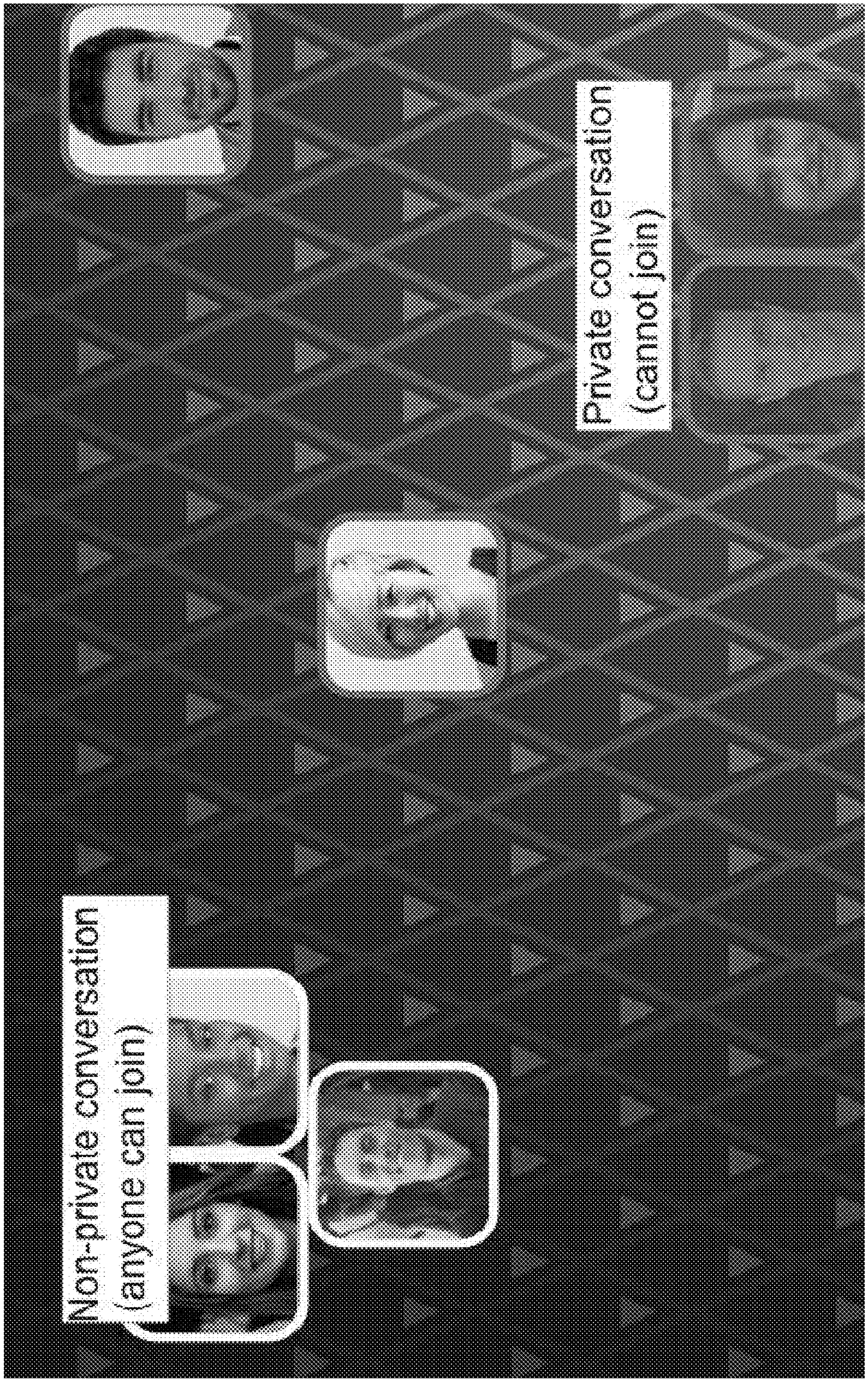

FIG. 10A—Private conversations cannot be joined.

Figure 10B:
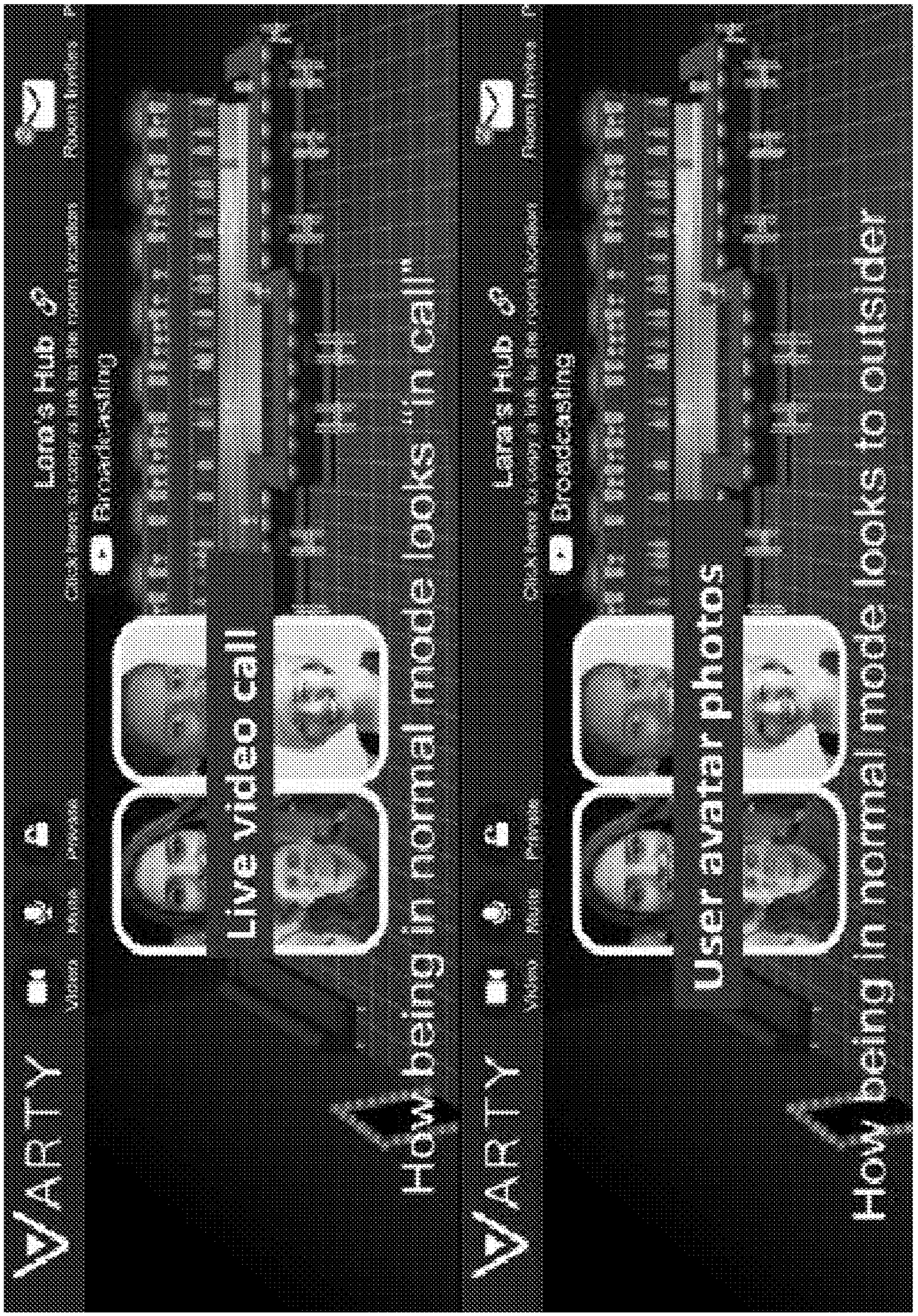

FIG. 10B—To an outsider, a private conversations will appear as faded out and with a red frame. For the users in a private call, their call will still look normal to them.

Figure 10C:
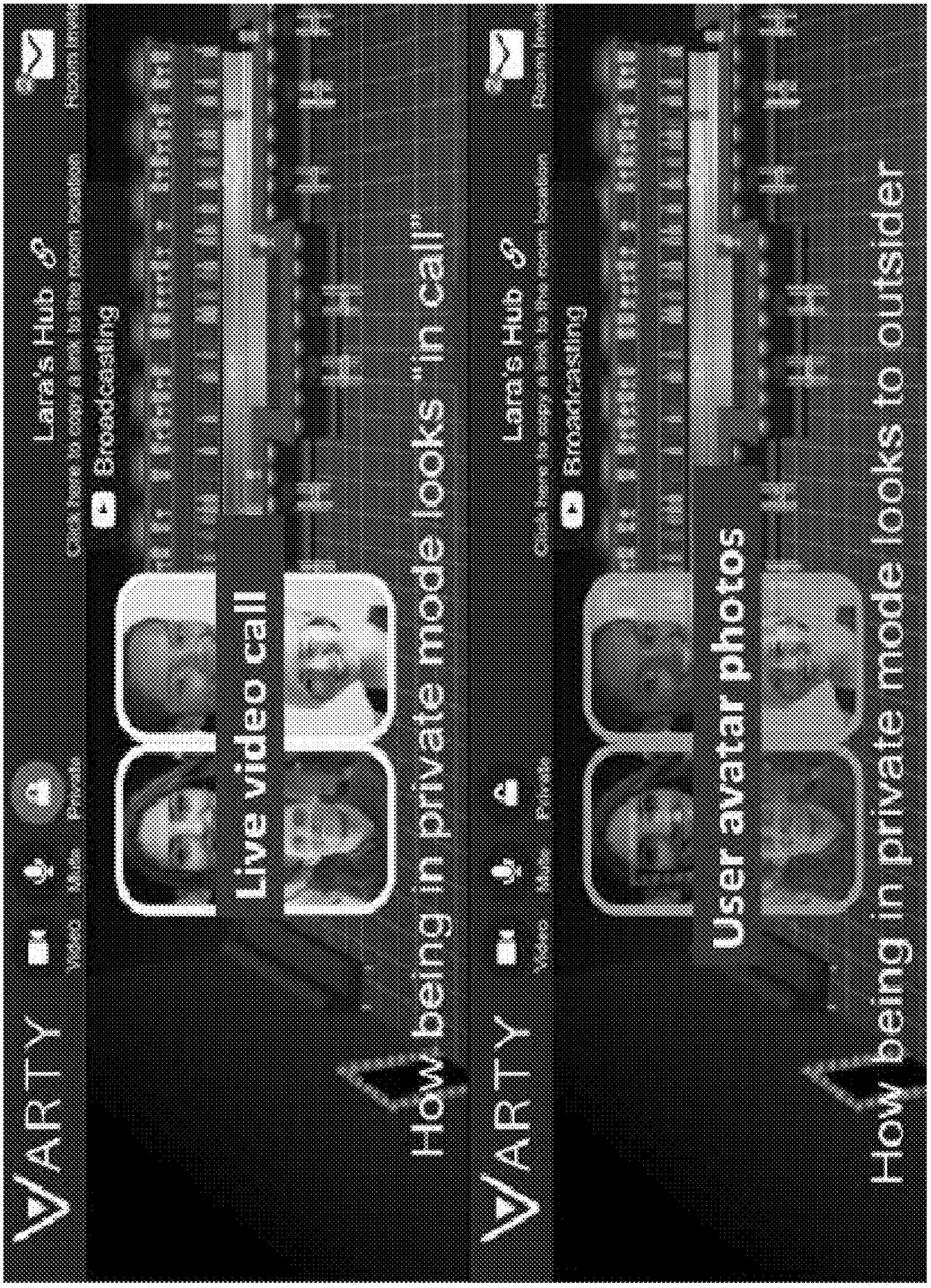

FIG. 10C—To an outsider, a private conversations will appear as faded out and with a red frame. For the users in a private call, their call will still look normal to them.

Private Mode—With your own avatar

Figure 11:
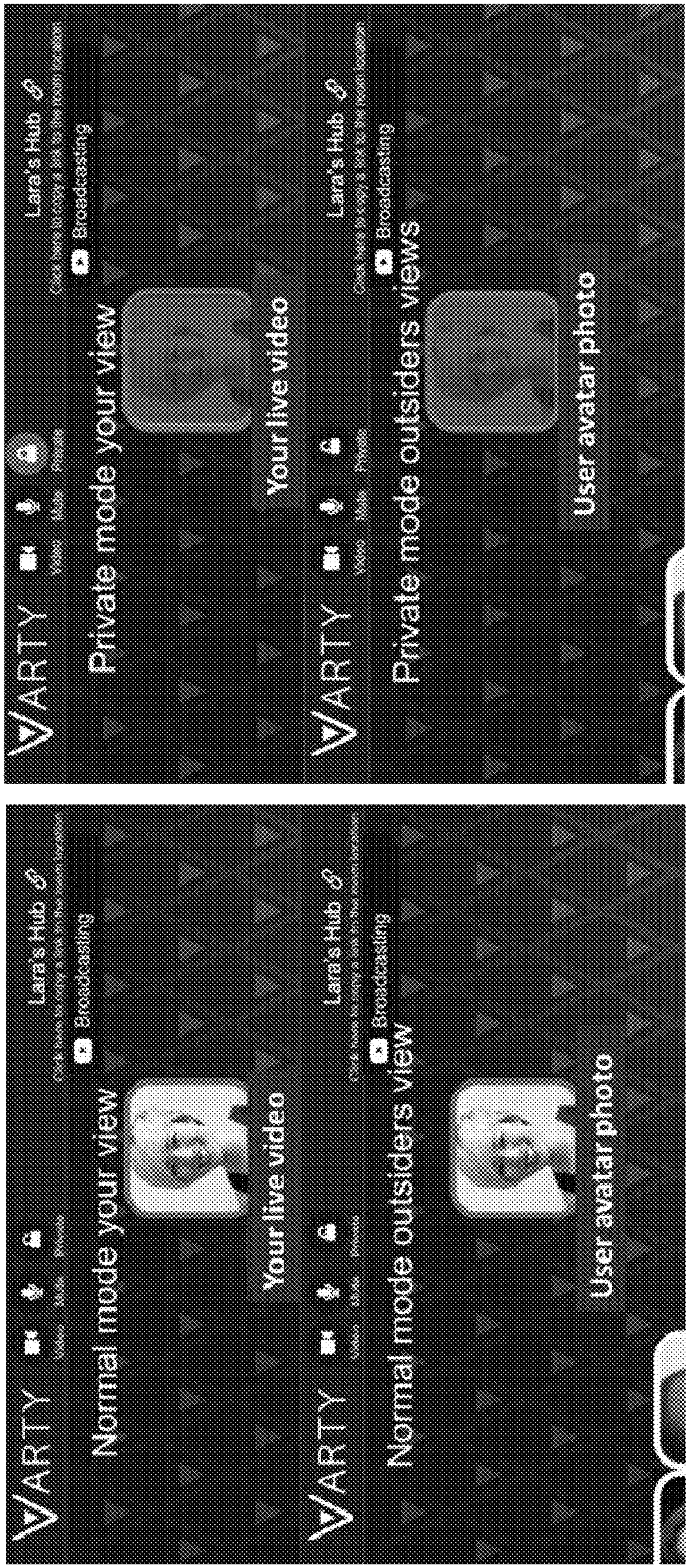

FIG. 11 Putting yourself in private mode allows you to move through other avatars and calls without starting a call. The avatar will appear red and faded out to both the user and the outsiders.

Profile card: Clicking on an avatar to open up profile.

Profile Card

Figure 12:
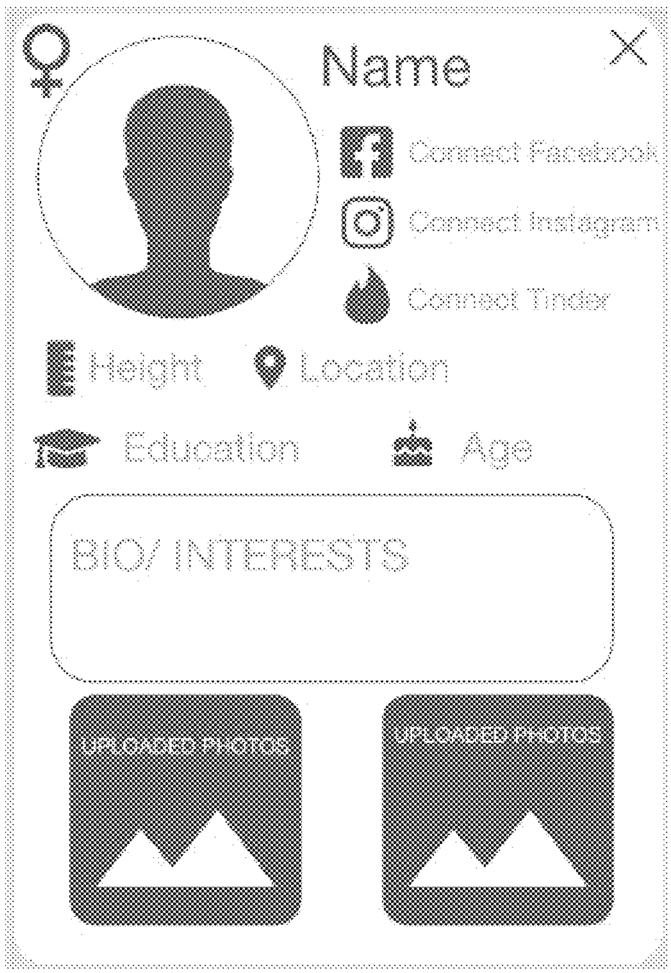

FIG. 12—(1) Different rooms will show different profile components on the profile card. For example, in a speed dating room, a connected tinder profile would show on your profile, but in a normal public room that would not show up on your profile. (2) You can access the profile of a person by clicking on them.

Volume scaling: Volume decreases as a function of distance and users only see the live video of users they overlap with.

- When engaged in a call, the relative volume is at a 100%
- When a user is within the peeking radius of a call, the user will hear the sound output of the given call at somewhere between 10% and 50% relative volume output without seeing the video of the call.
- Users can only contribute to the sound output of the call when engaged in it.

Volume scaling reflective of users' positions: Volume scaling is done reflective of users' positions relative to your own avatar. In practice this means that if someone is virtually to your left, their volume occurs on the left speaker or earphone and vice versa.

Volume Scaling

Figure 13A:
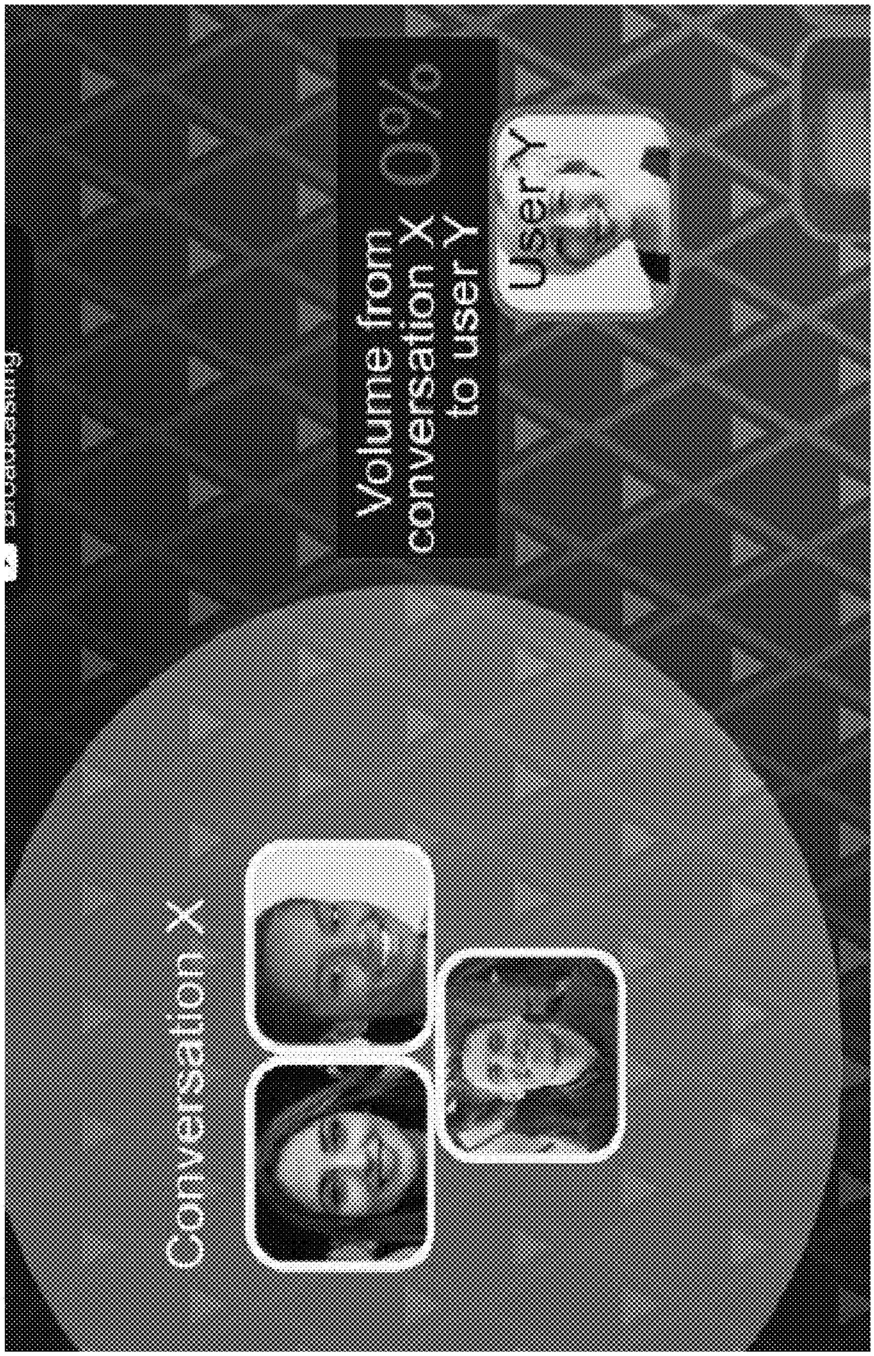

FIG. 13A—User X is outside of the "peeking" radius of conversation Y, so they cannot hear the sound output from that conversation at all.

Figure 13B:
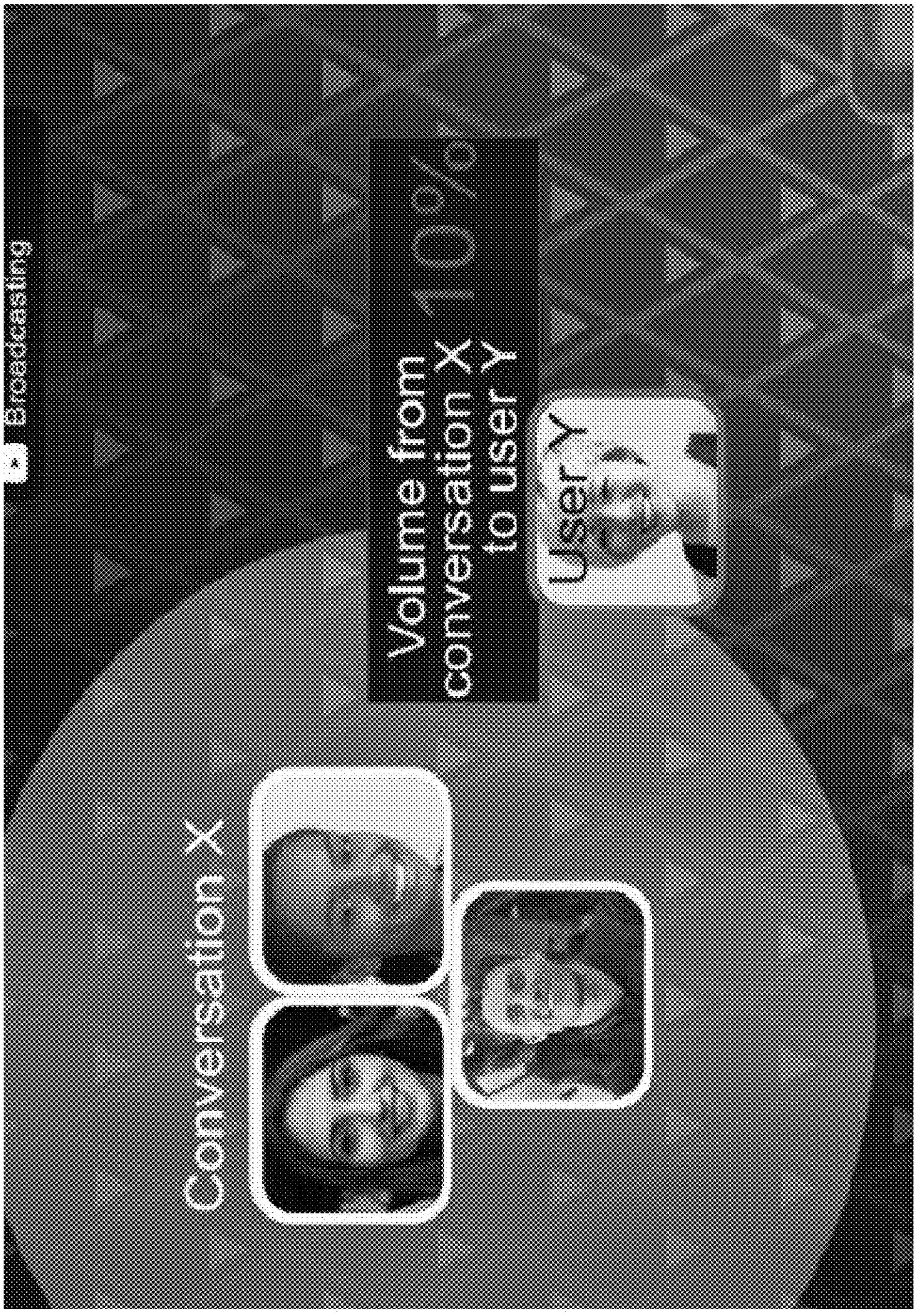

FIG. 13B.—(1) User X is at the edge of the peeking radius, so they can start to hear the sound output of conversation Y at 10% relative volume (2) Inside of the peeking radius, user X cannot see the video outputs of the conversation, and the users in conversation Y are not able to hear or see the audio or video outputs of user X.

Figure 13C:

FIG. 13C—(1) As user X moves further inside the peeking radius, the relative volume of the conversation increases as a function of her distance from the conversation, up to 50% relative volume (2) Inside of the peeking radius, user X cannot see the video outputs of the conversation, and the users in conversation Y are not able to hear or see the audio or video outputs of user X.

Figure 13D:

FIG. 13D—When the user overlaps with the conversation, they will enter it, and once in it, they will hear at 100% relative volume, contribute to the conversation, and see the video outputs of everyone.

Eye contact:

- Pupil movement of one user is repositioned per each user in a call according to their position in the call. E.g. if you're in top right of 4-person call, down person has their eyes adjusted so that it's clear when they are looking up at you.

Eye Contact

Figure 14A:
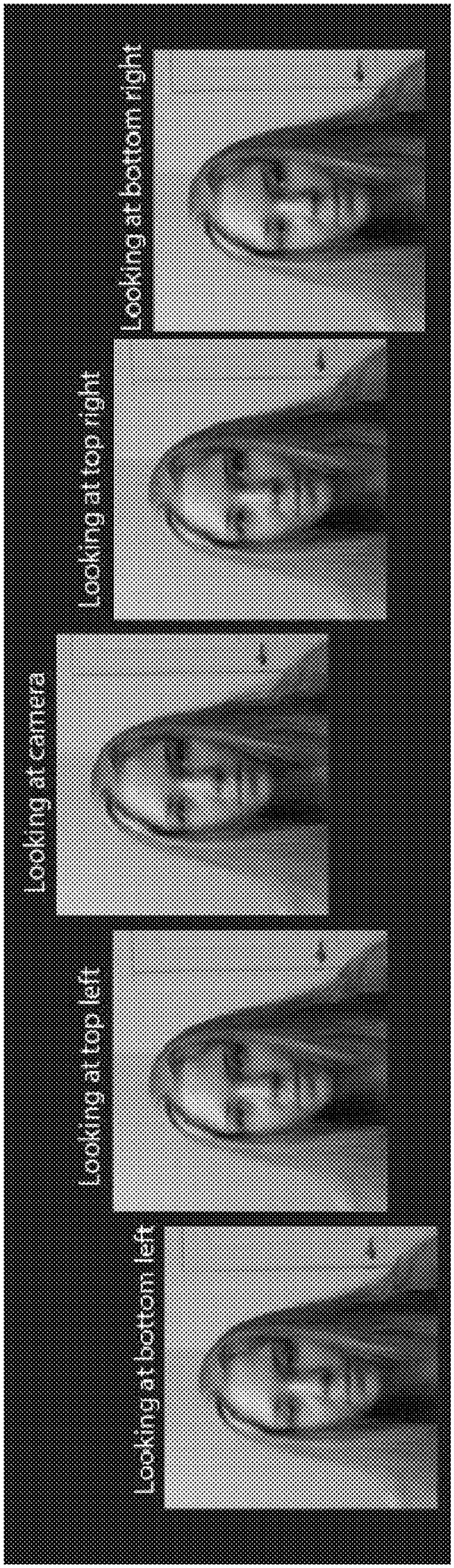
Figure 14B:
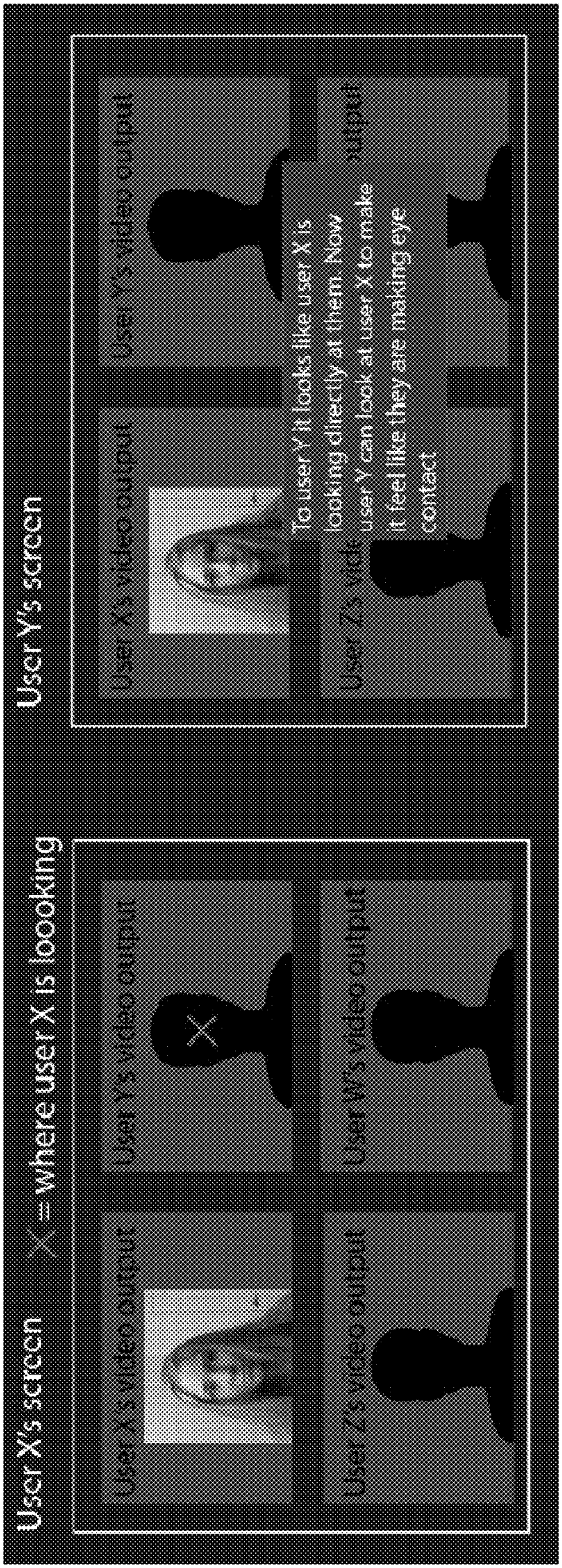

FIG. 14A—The eyes of a user will look different depending on where in their screen they are looking at.

FUG. 14B—The video output will be tailored for each user so that when a user Xis looking at user Y's video, the video that user Y will see will be altered so it looks like User X is looking directly at them.

Figure 14C:
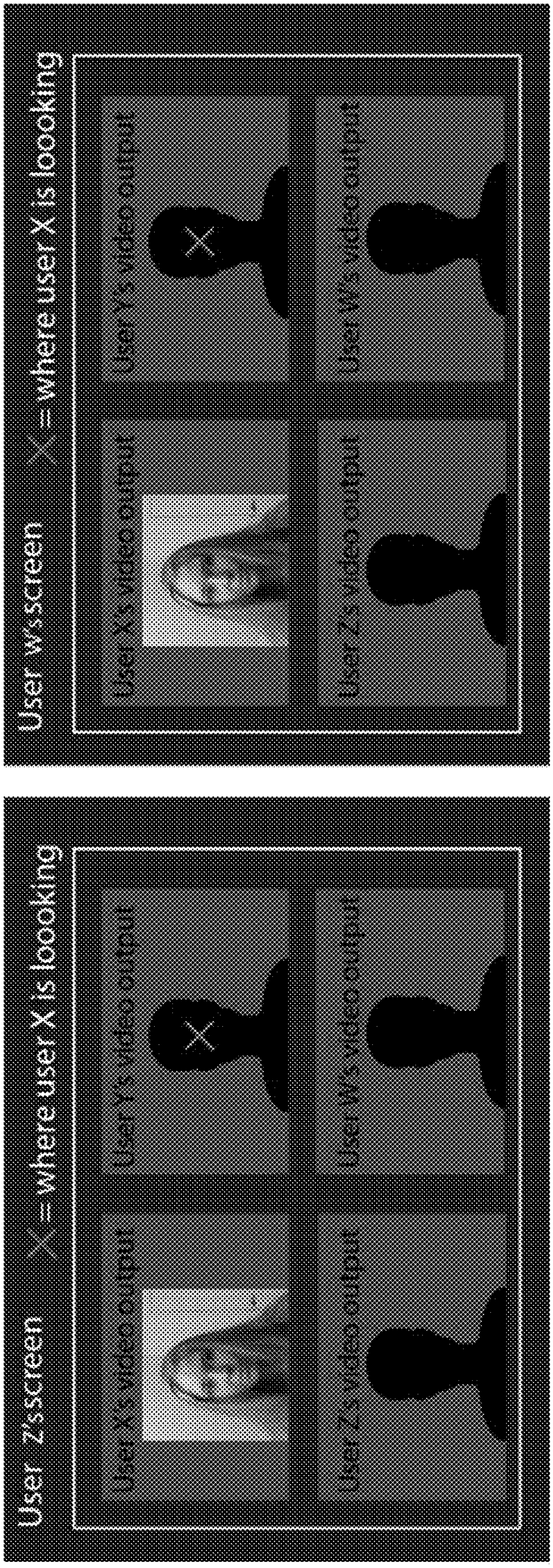

FIG. 14C—Only the person the user is looking at will see an altered video output.

Room hierarchies channel:

Doors

- Within a particular "channel" the user has different channels that each have different constraints (get more and more filtered as you go down).
- Doors are only visible to users if they have access.
- Example: If one has access to the Berkeley Lobby, and doors for Greek Life Lobby and Computer Science Lobby, then one enters Computer Science Lobby they see people but also doors for "CS61A" "Internships" etc.

Room Hierarchies (Like Slack® Channel With Doors)

Figure 15:
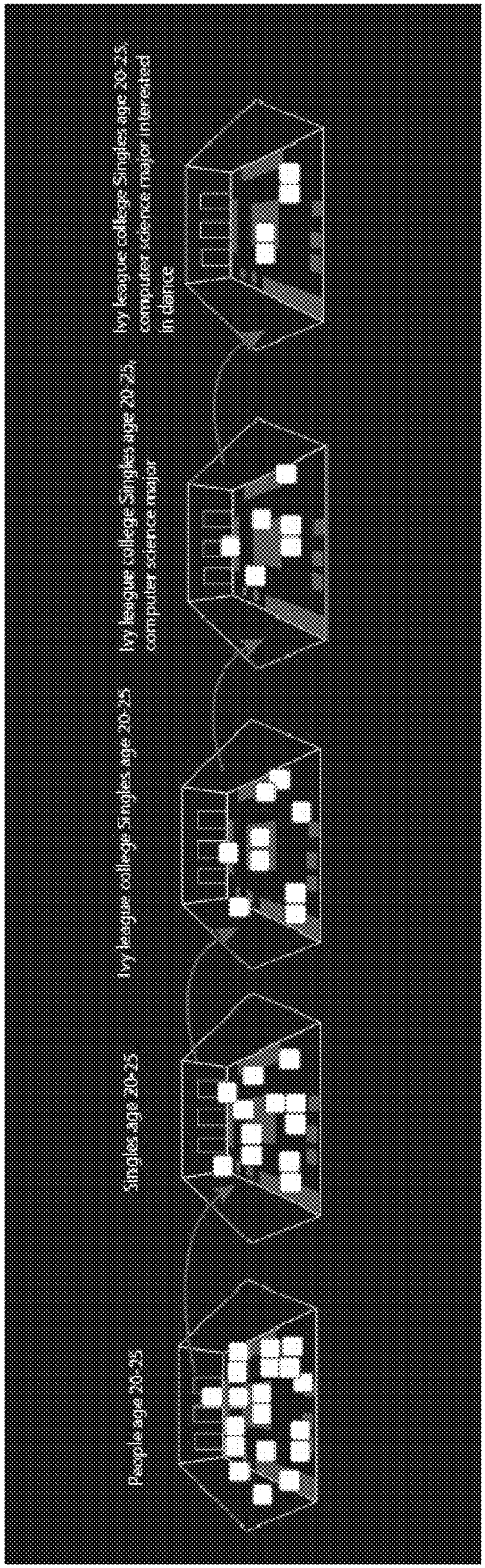

FIG. 15 illustrates the mechanics of room hierarchies (like Slack® channel with doors) in accordance with an invention embodiment.

Sharing hosting privileges:

- As host, one can click on users to give them the ability change room background.
- As host, one can click on people to give them the ability to broadcast videos, sound, or other media through 3rd party sites or streamed directly from their computer.

Sharing Hosting Privileges

Figure 16A:
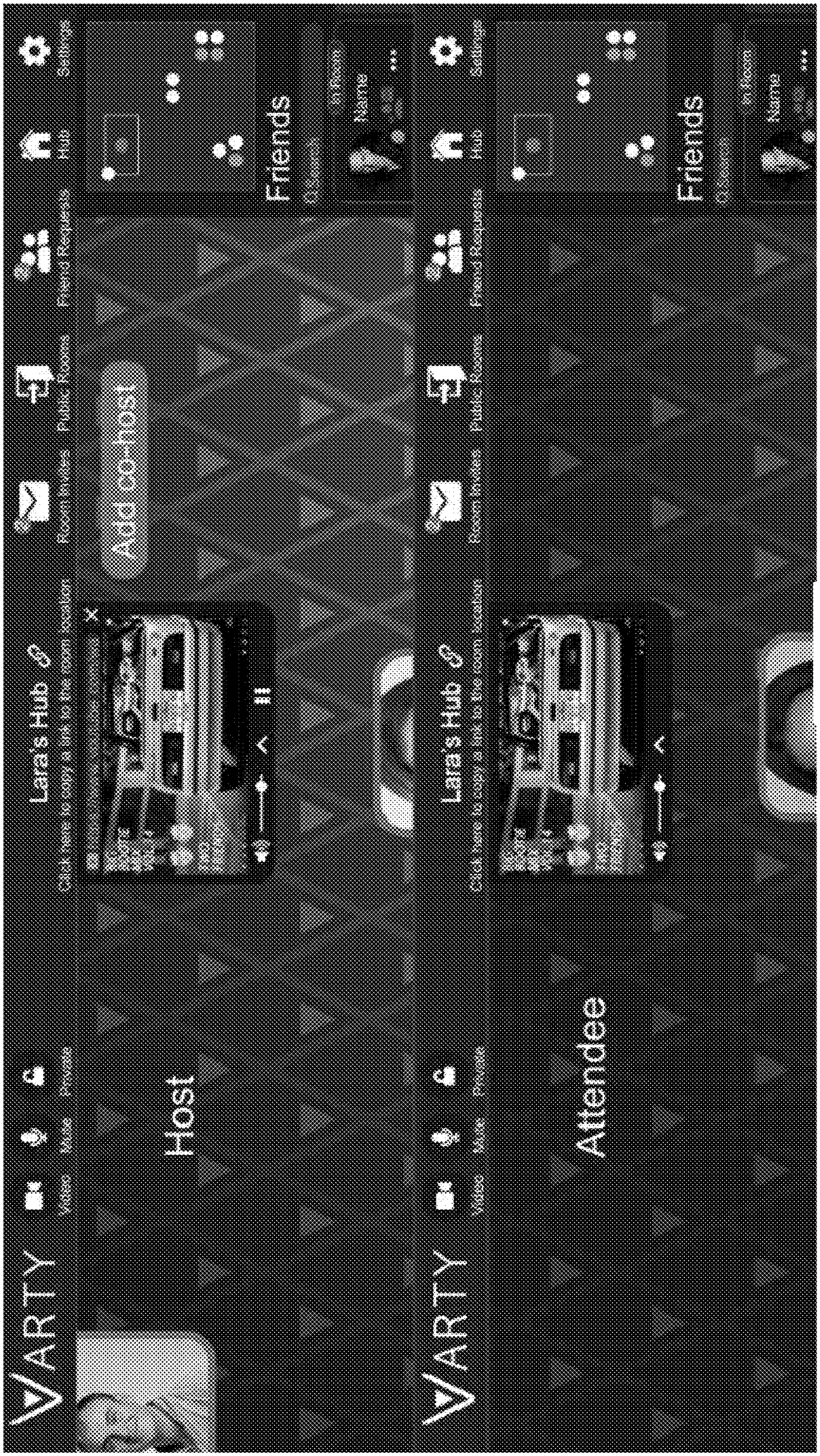

FIG. 16A—A host of a room can add a co-host who then has access to have same event control features as the host.

Figure 16B:
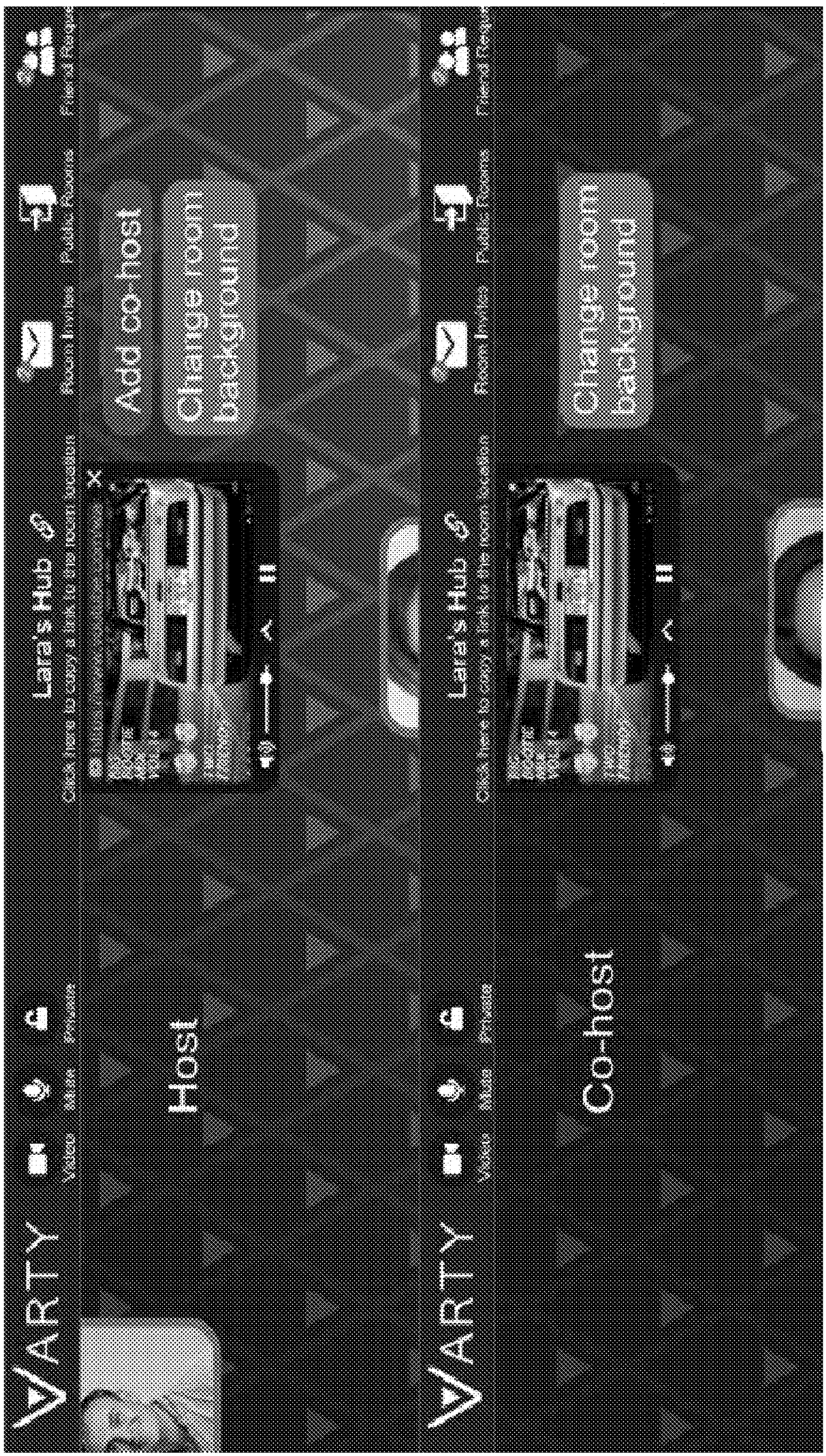

FIG. 16B—When someone is made a co-host, they will be able to change the room background, control the video, remove friends from the hub.

Figure 16C:
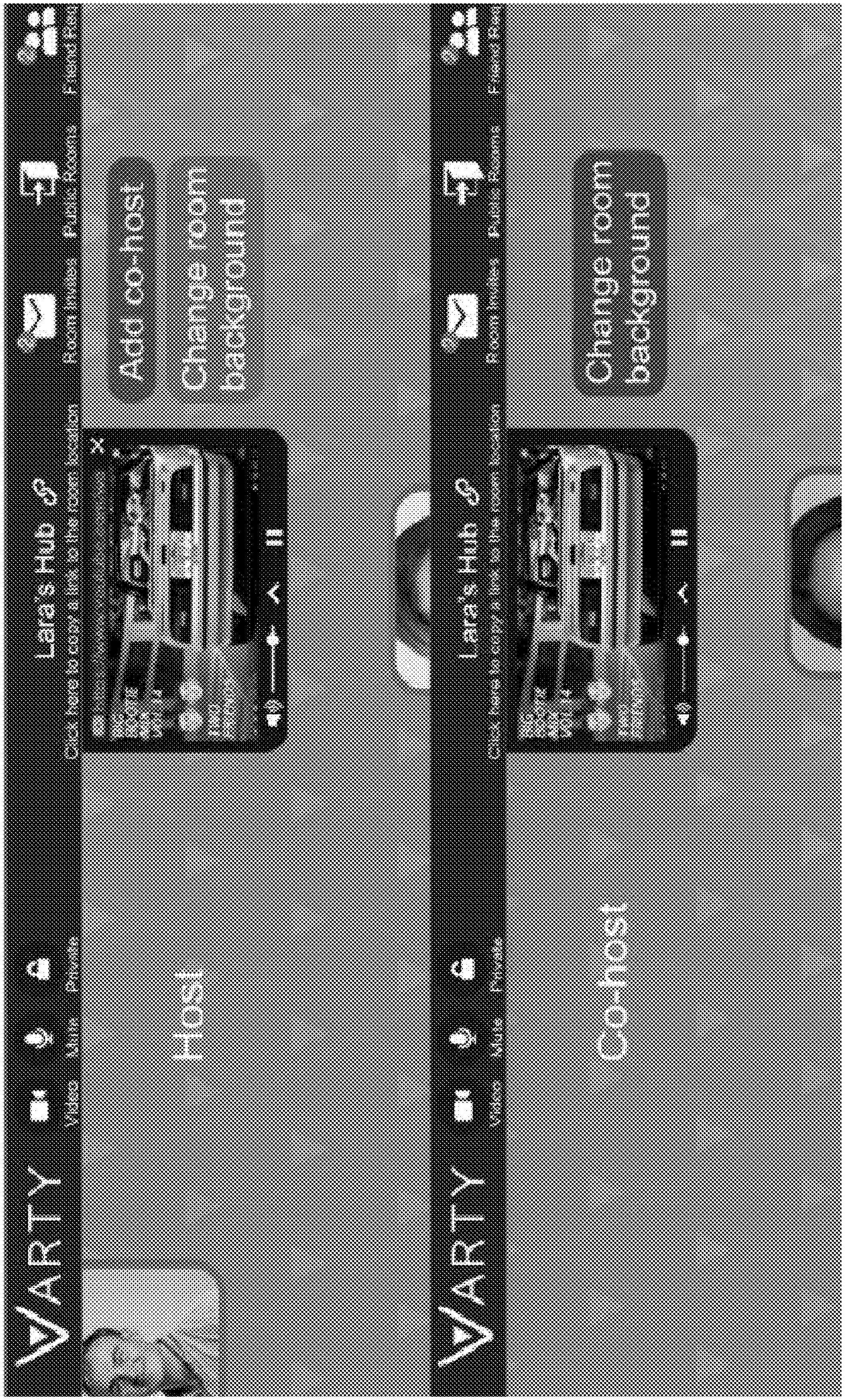

FIG. 16C—For example, the co-host can independently change the room background just like the host themselves.

Room presets: A set of rooms for people to choose from for customizability for the event or room host.

Examples include

- Concert venue:
- broadcasting in center—volume scaled
- Classroom
- Teacher clicks on users to generate calls, and can at any point force freeze all movement Can tie rooms together via doors (going in one brings to another room)

- Hosts can set constraints for who gets to go through which doors

Figure 17:
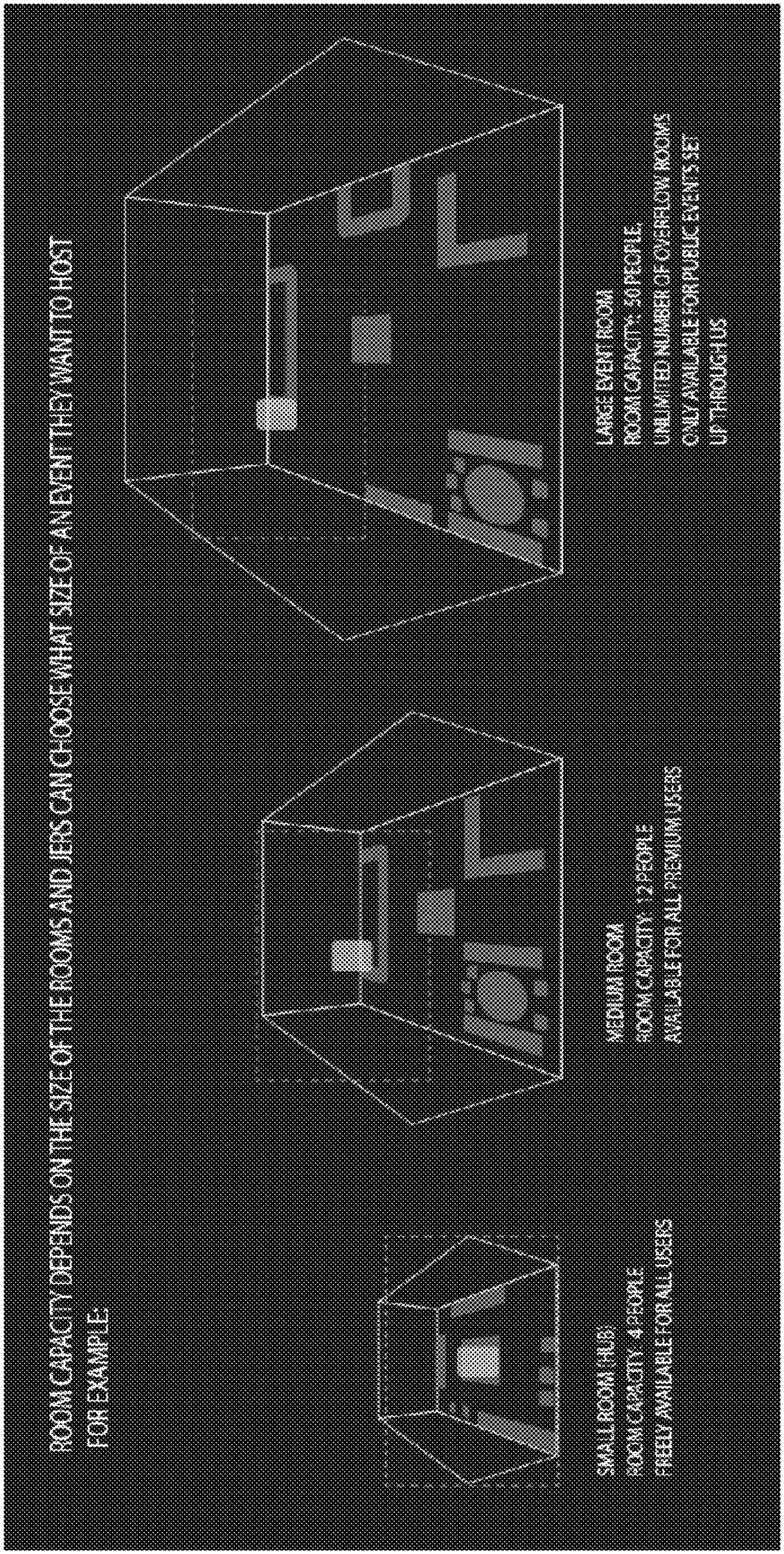

Room Presets (set of rooms a host can choose to curate an event)—Room Size Selection FIG. 17—When creating an event, the host can choose what size of a room to do. They can choose their own hub, which can only hold X number of people, they can do a medium sized room which can host Y number of people, or they can do a large special event room that can hold Z number of people, with unlimited overflow rooms.

Room Presets (set of rooms a host can choose to curate an event)—Houses

Figure 18:
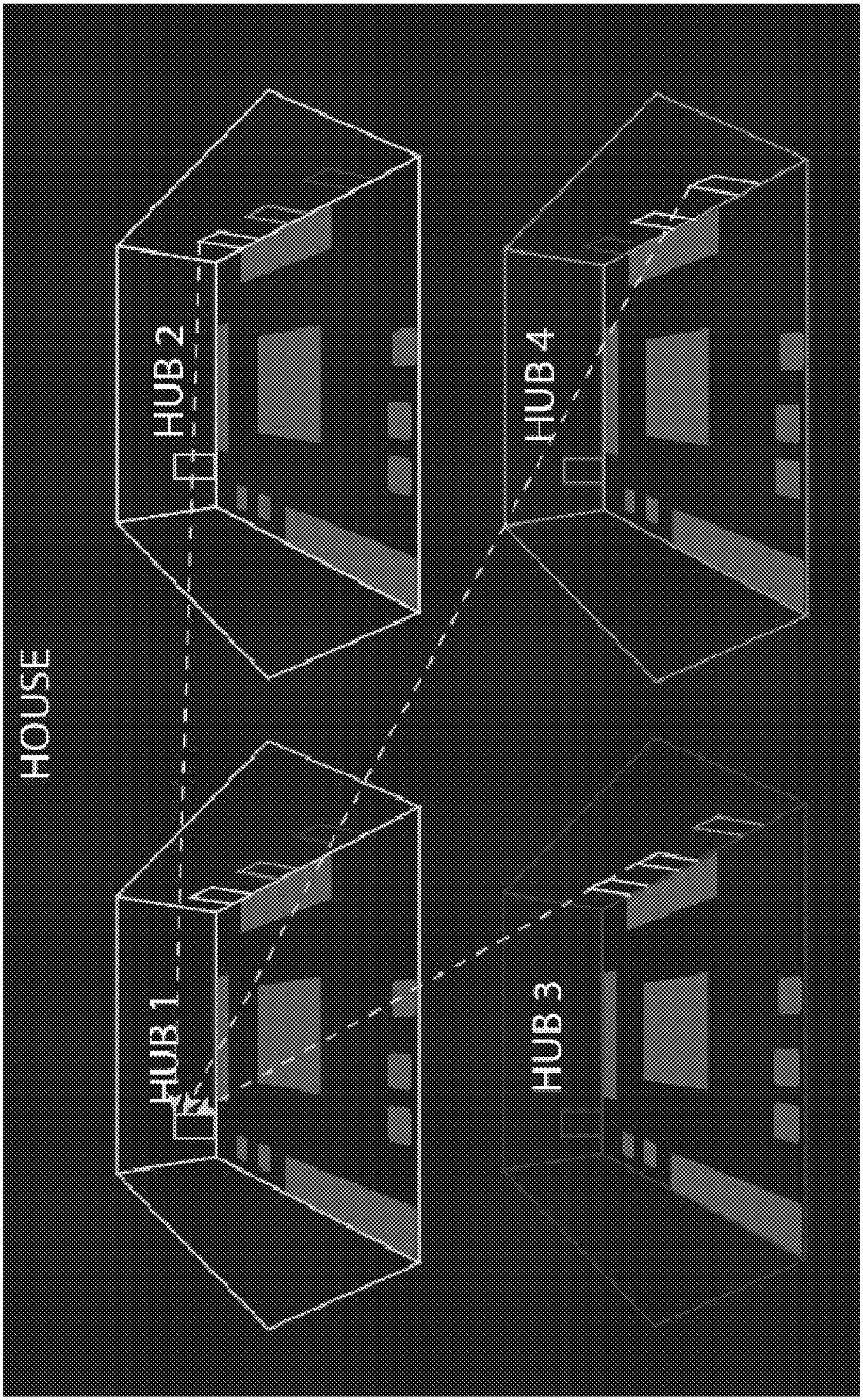

FIG. 18—Users can create "houses" by choosing to tie together all the hubs of a specified group of people. In a house, all rooms are accessible from any room. Users can choose to keep their hub door open or closed for other people in the house to enter.

Room Presets (set of rooms a host can choose to curate an event)—Event Specific

Figure 19:
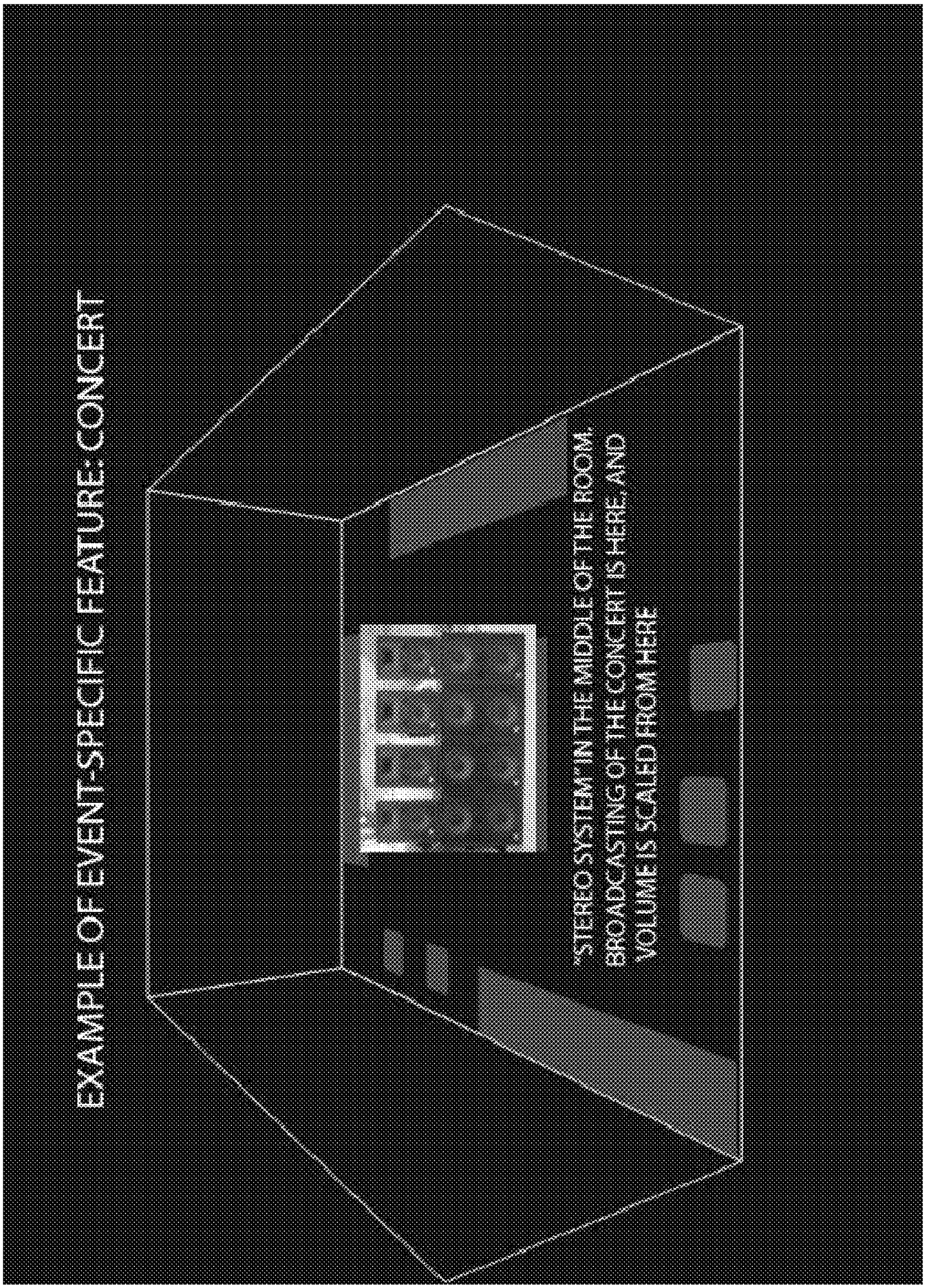

FIG. 19—Different rooms will have slightly different room presets depending on what kind of an event it is.

Global rooms:

- Overflow—upon a room reaching a maximum capacity of 50 or any preset number people, a second, identical room is created.

Room for the day

- Assignment of users to rooms based on prior activity such that when they go on, they can click this theoretical "room of the day" icon and see if it's people that meet the kinds of people, they want to meet This "kinds of people" is determined by a whole separate "preferences" input, including "prefer similar [profile input]", e.g. "prefer people my age", Also: "prefer [X theme]-based rooms", e.g. "prefer dating-based rooms", "prefer networking career-based rooms"

Overflow for Global Rooms

Figure 20:
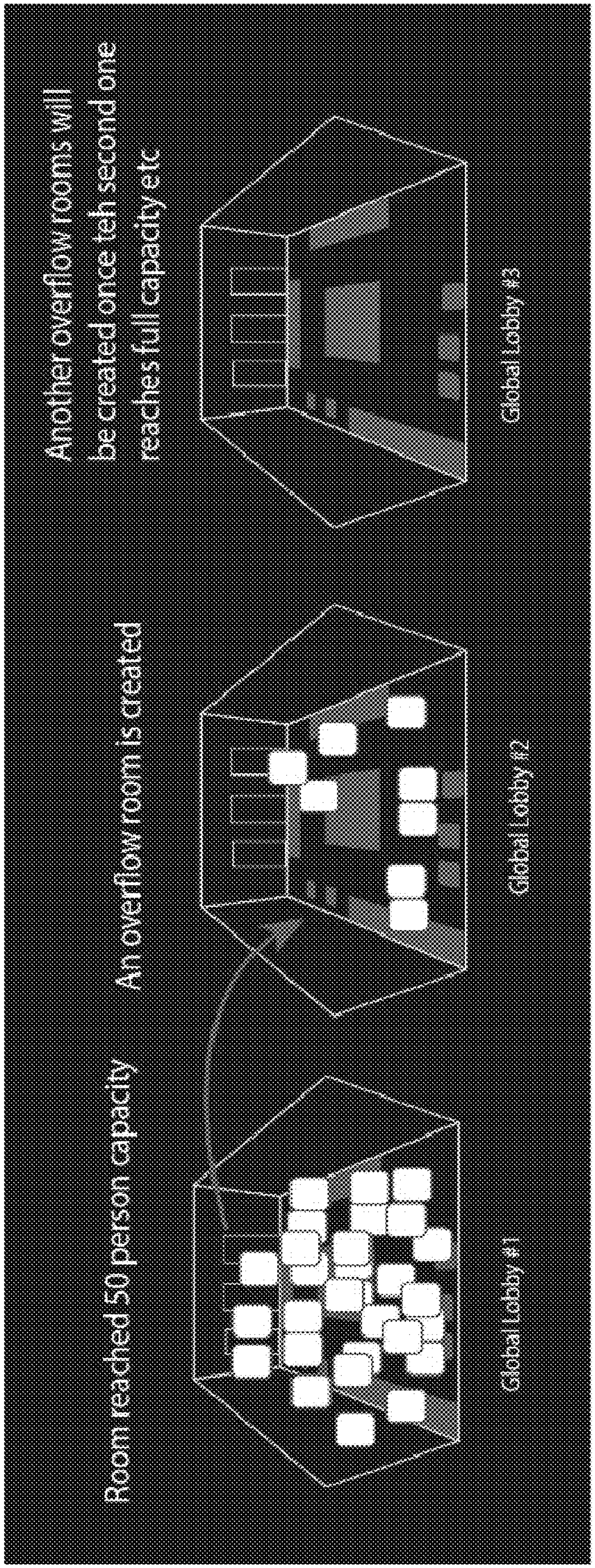

FIG. 20—When room reaches its capacity, overflow rooms are created.

Filters:

Normal zoom-like filters for avatar photos and for video.

The filter makes the background look like the room background, making it look like you are just walking around.

Video Editing Filters

Figure 21A:
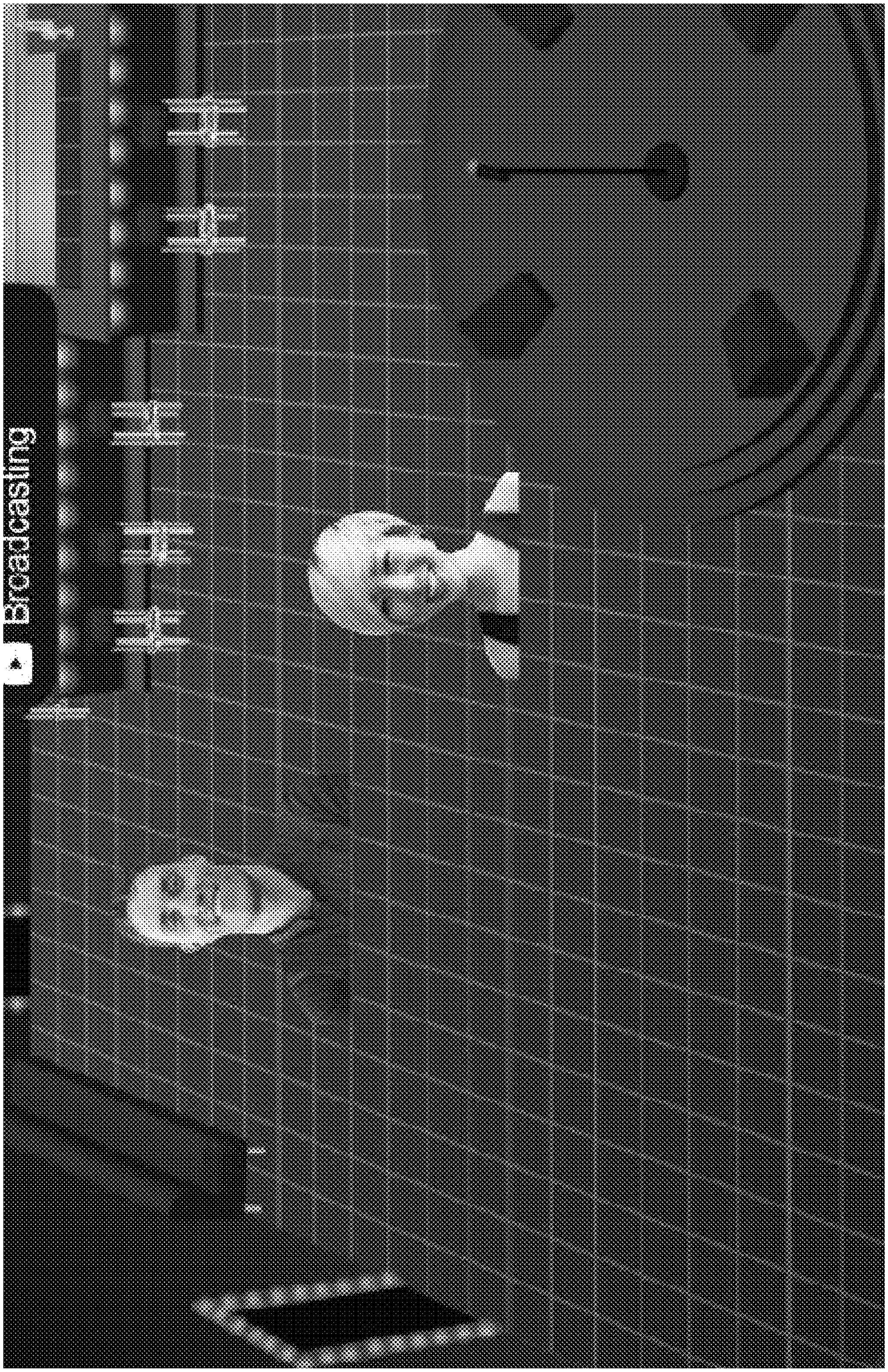

FIG. 21—Differentiate the person from the background and remove the background of the video, thus leaving the users looking like they are actually roaming around the bar.

File sharing mechanism:

Files appear on left that you have uploaded and can walk up to people in this space and give them files from this set.

High-level: walk up to other users virtually and give them documents that appear in their "inventory" and that are downloadable from their inventory.

Also includes ability to embed applications for sharing (e.g. at application development conference can embed when in call your application).

File Sharing Mechanism

Figure 22A:
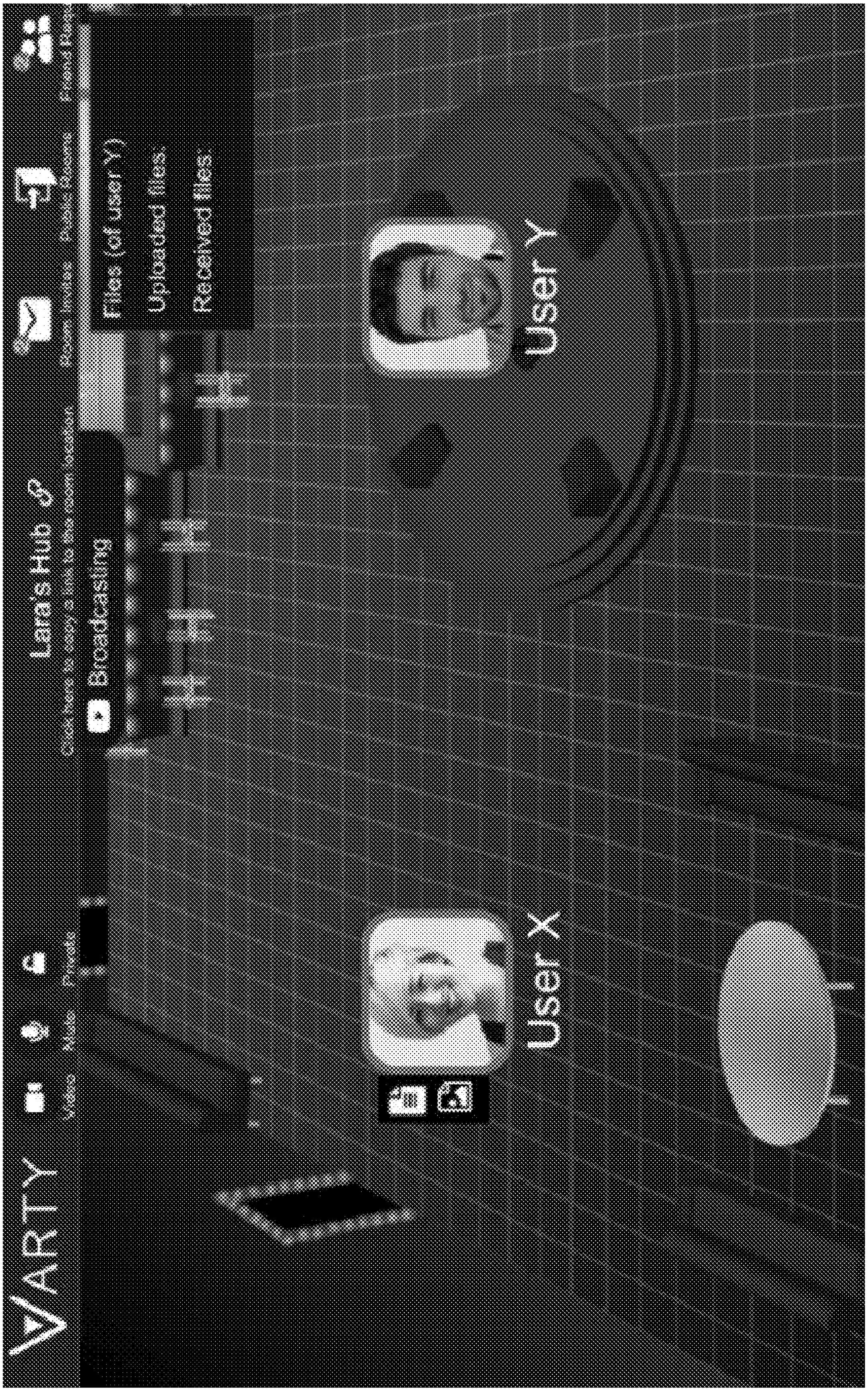

FIG. 22A—User X has files that she wants to share (could be a video, and application, a resume etc.).

Figure 22B:
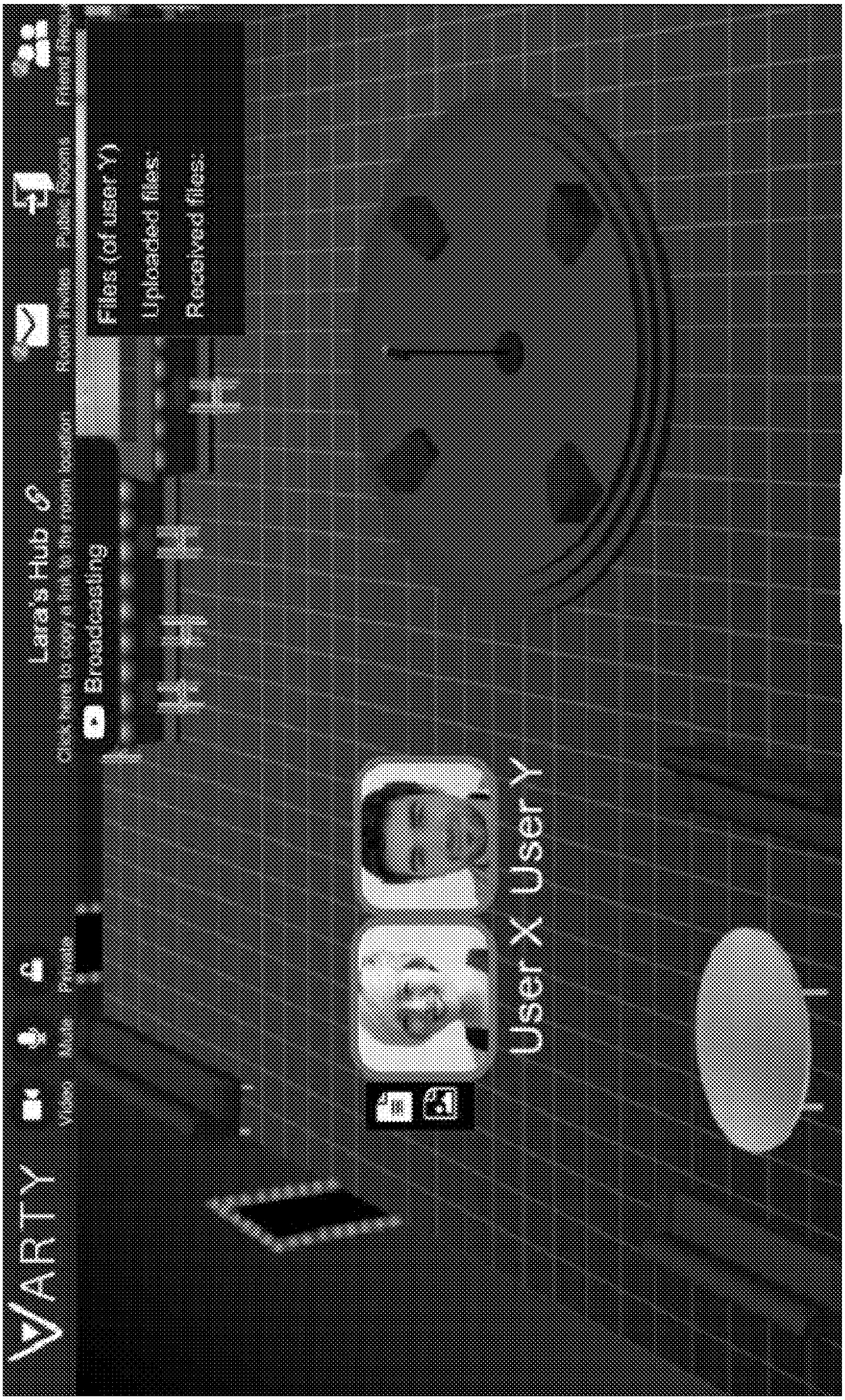

FIG. 22B—User Y can go up to user X and request to download a file from her, or user X and go up to user Y and request to give user Y files.

Figure 22C:
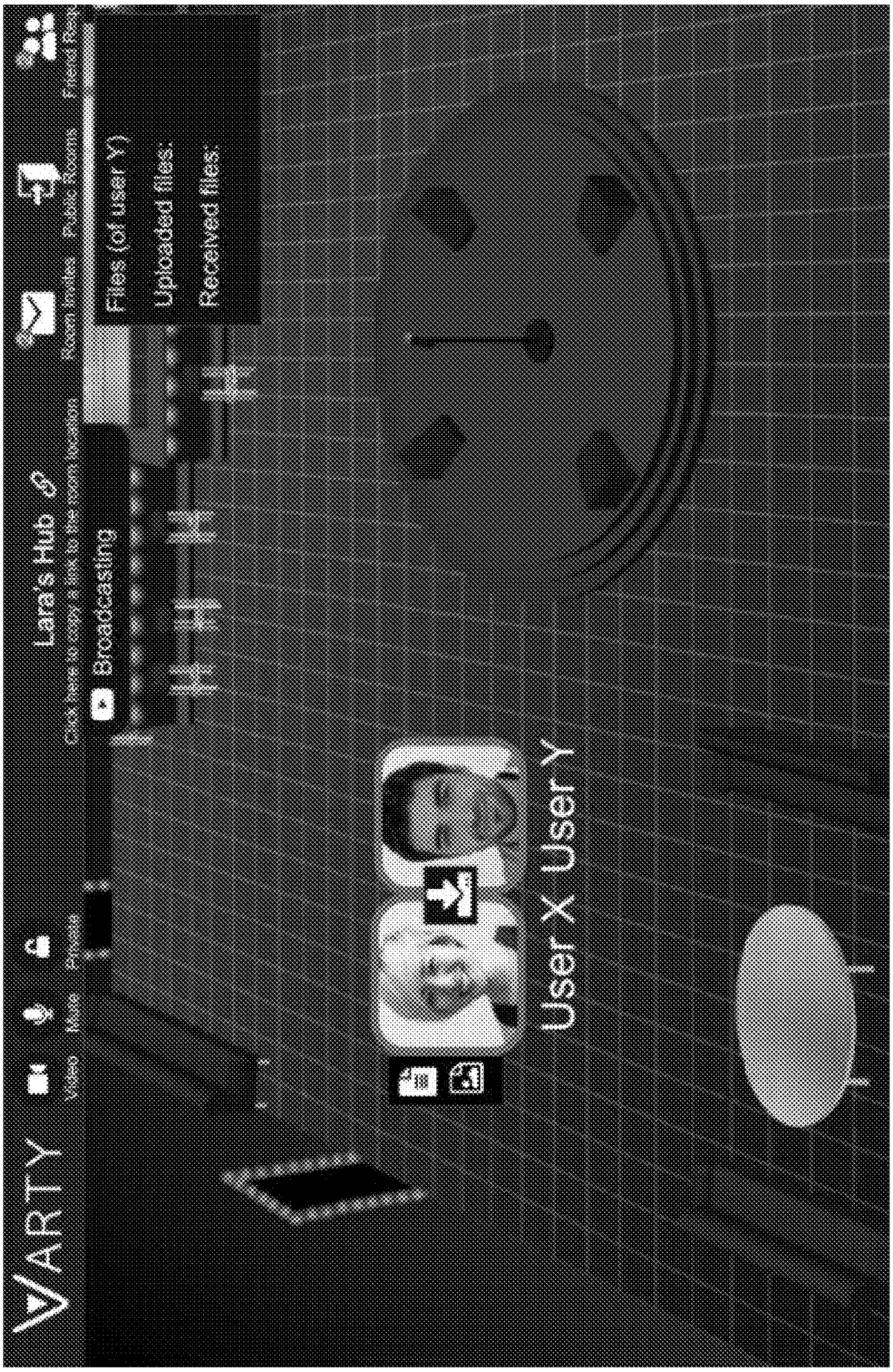

FIG. 22C—Once both have confirmed, the downloading process begins, user Y will receive the files from User X.

Figure 22D:
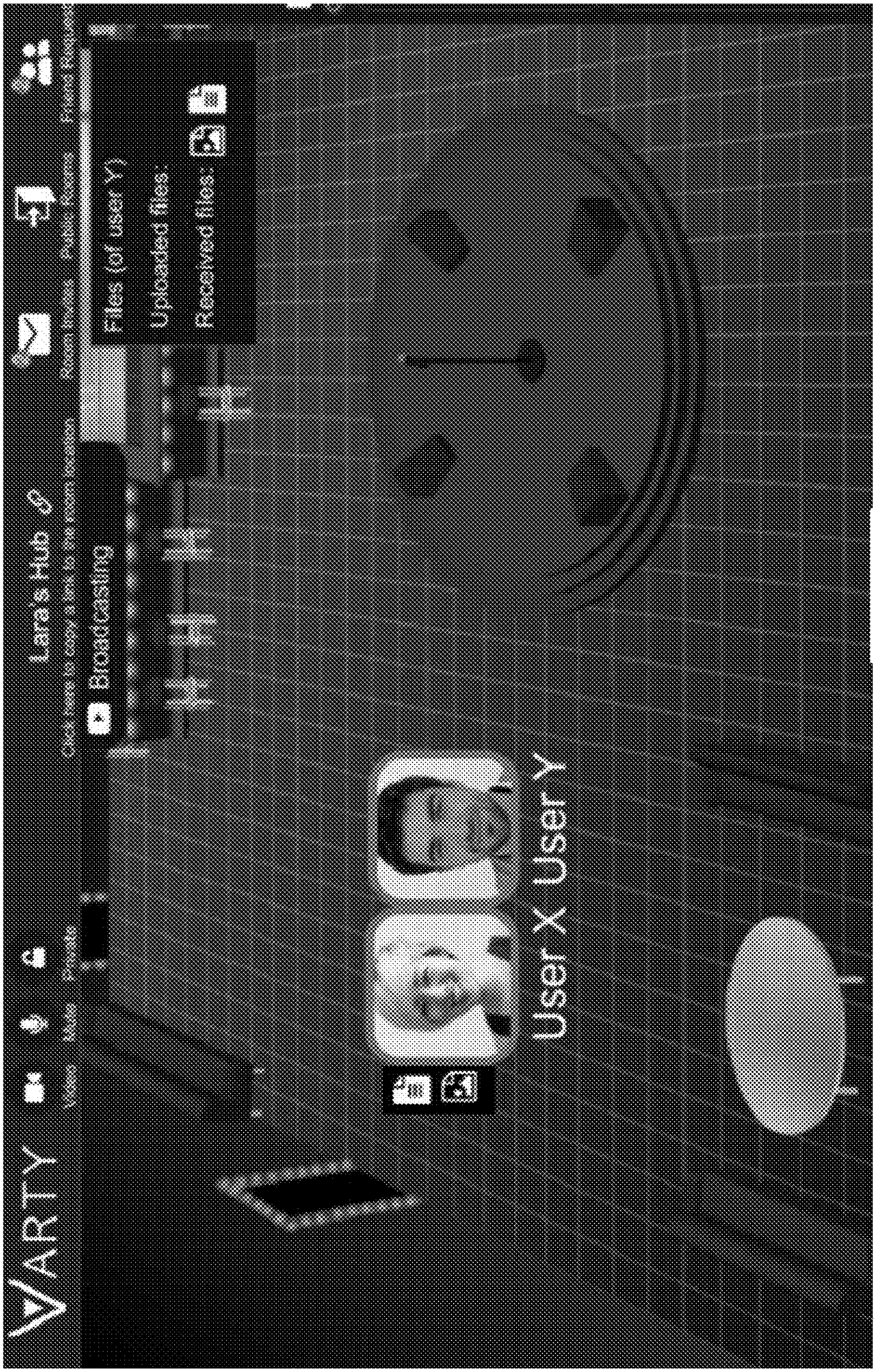

FIG. 22D—User X's files will now show up in the received files section of User Y's files folder.

Friending

FIG. 23A—Sections of the Friends bar.

FIG. 23B—Friends bar functionality.

Figure 23C:
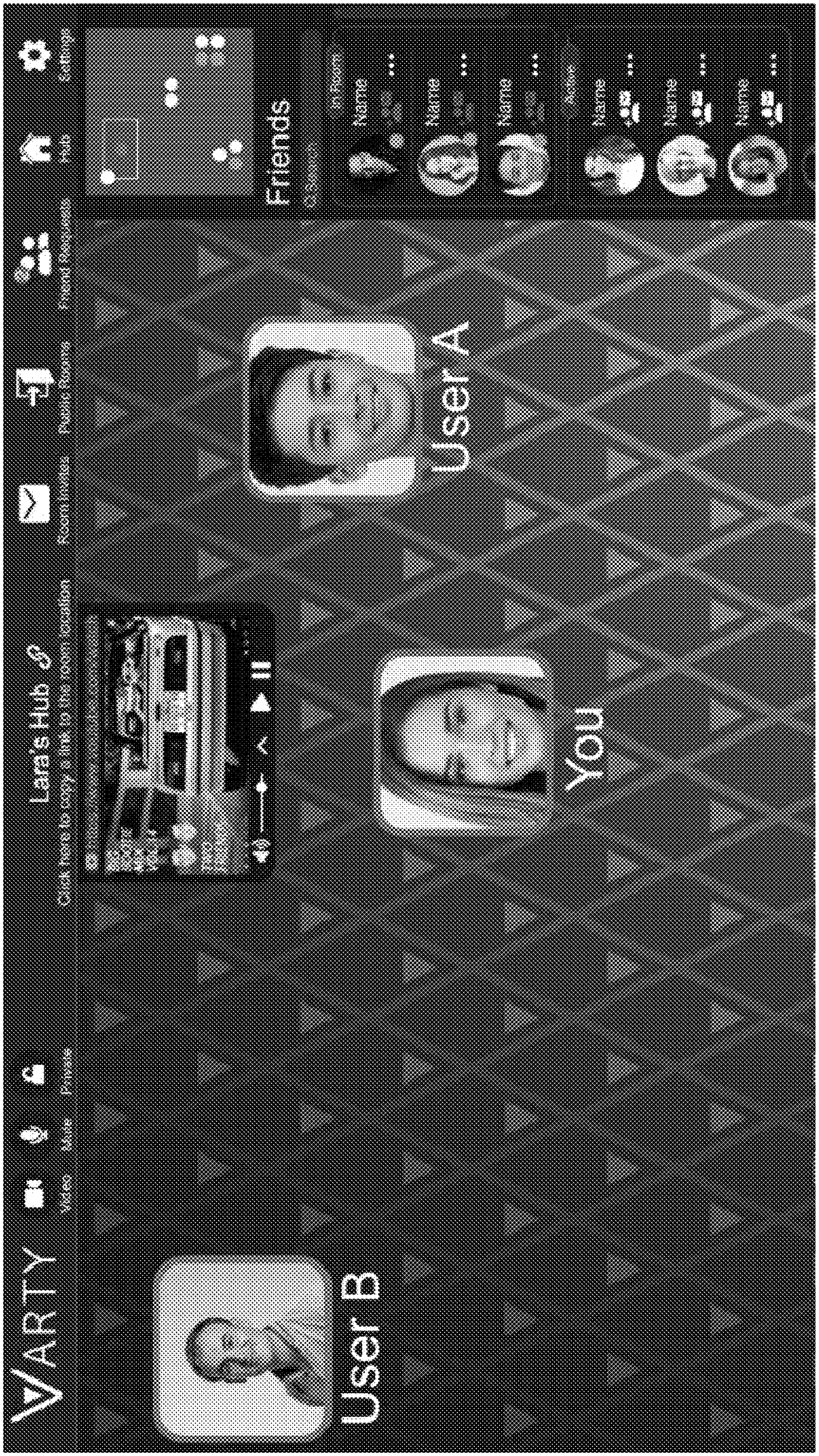

FIG. 23C—You are in a room with some people, user A is already your friend, user B is not your friend yet.

Figure 23D:
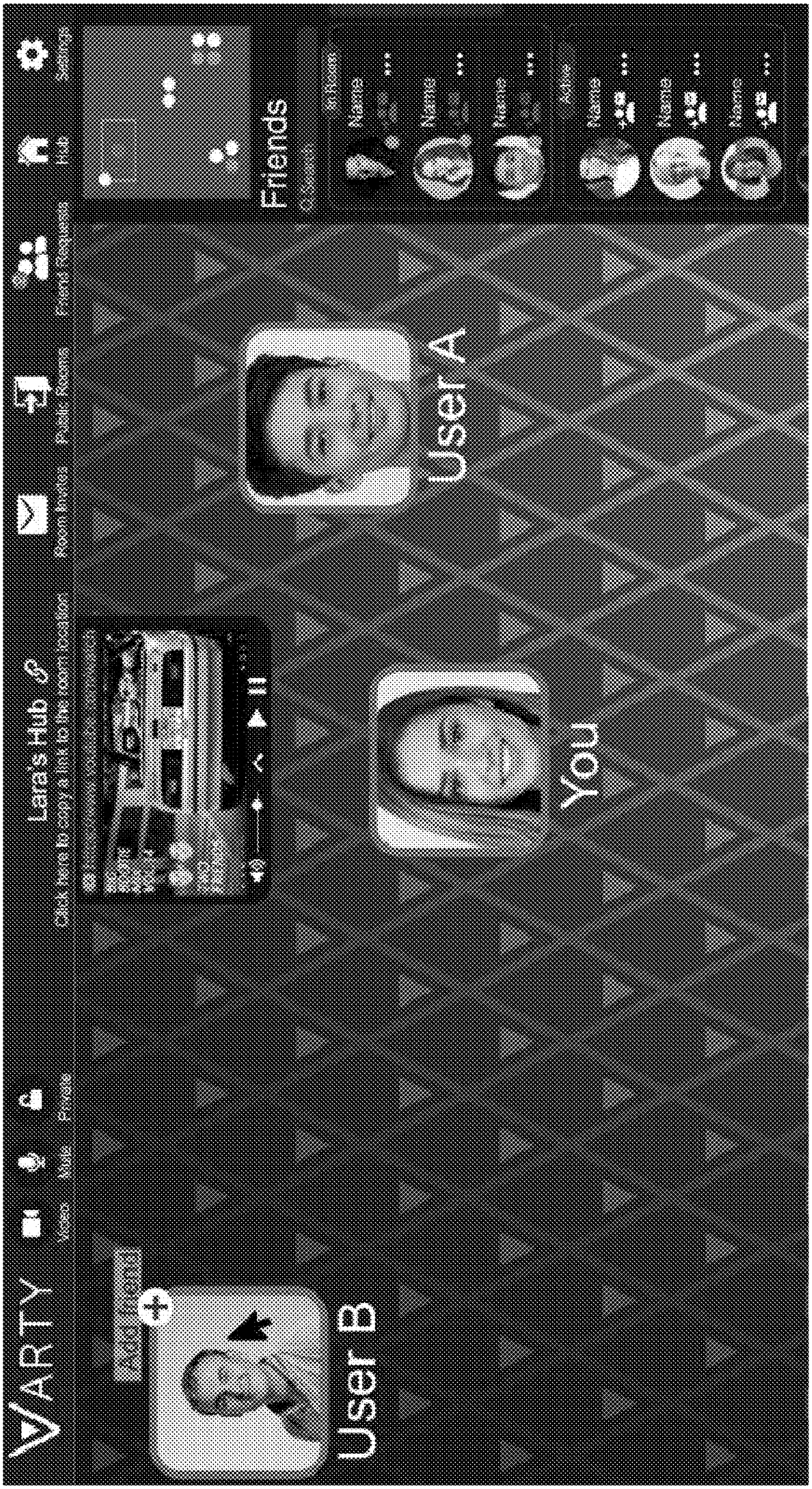

FIG. 23D—You can add user B to your friends by (1) clicking on their avatar and then clicking add friend.

Figure 23E:
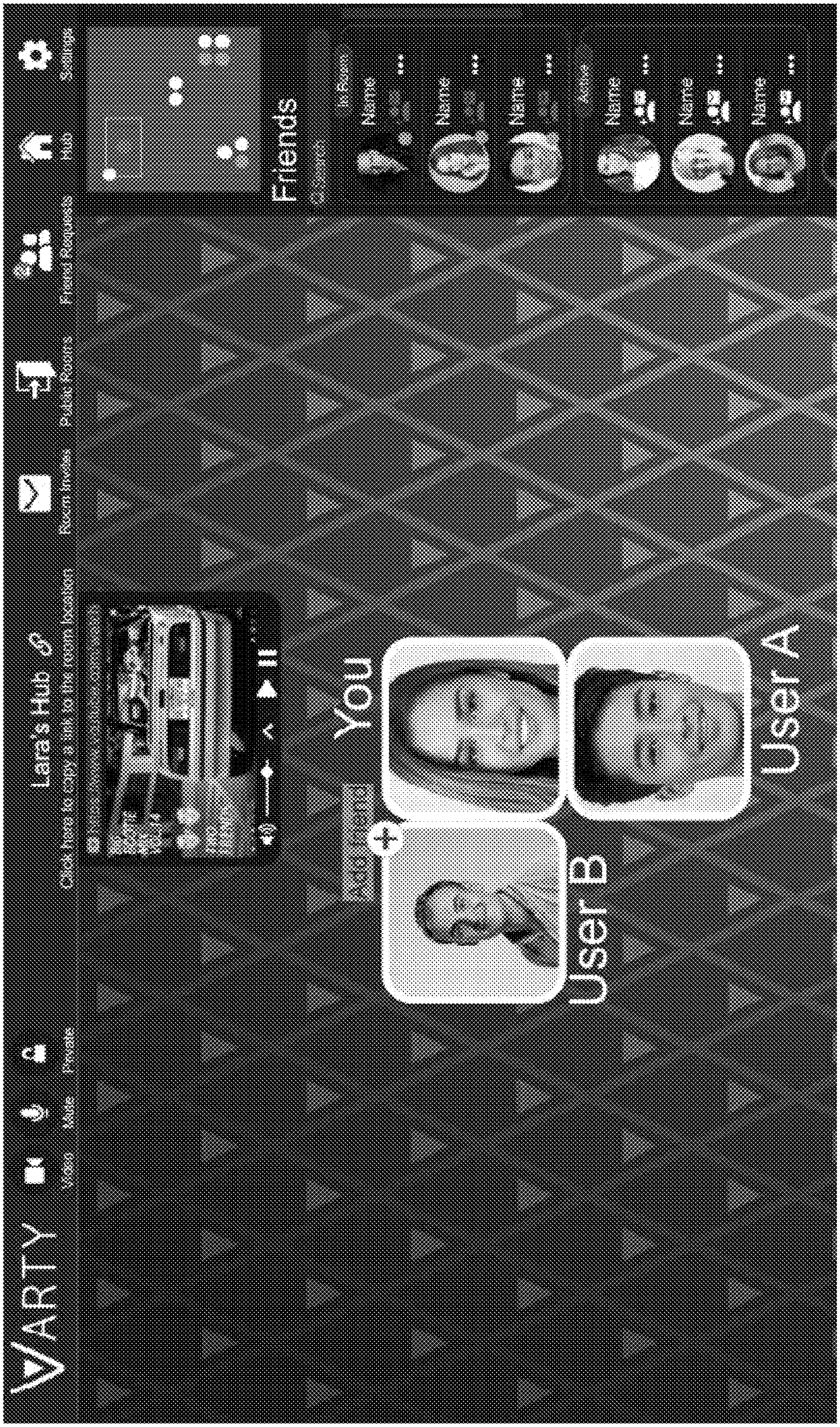
Figure 23F:
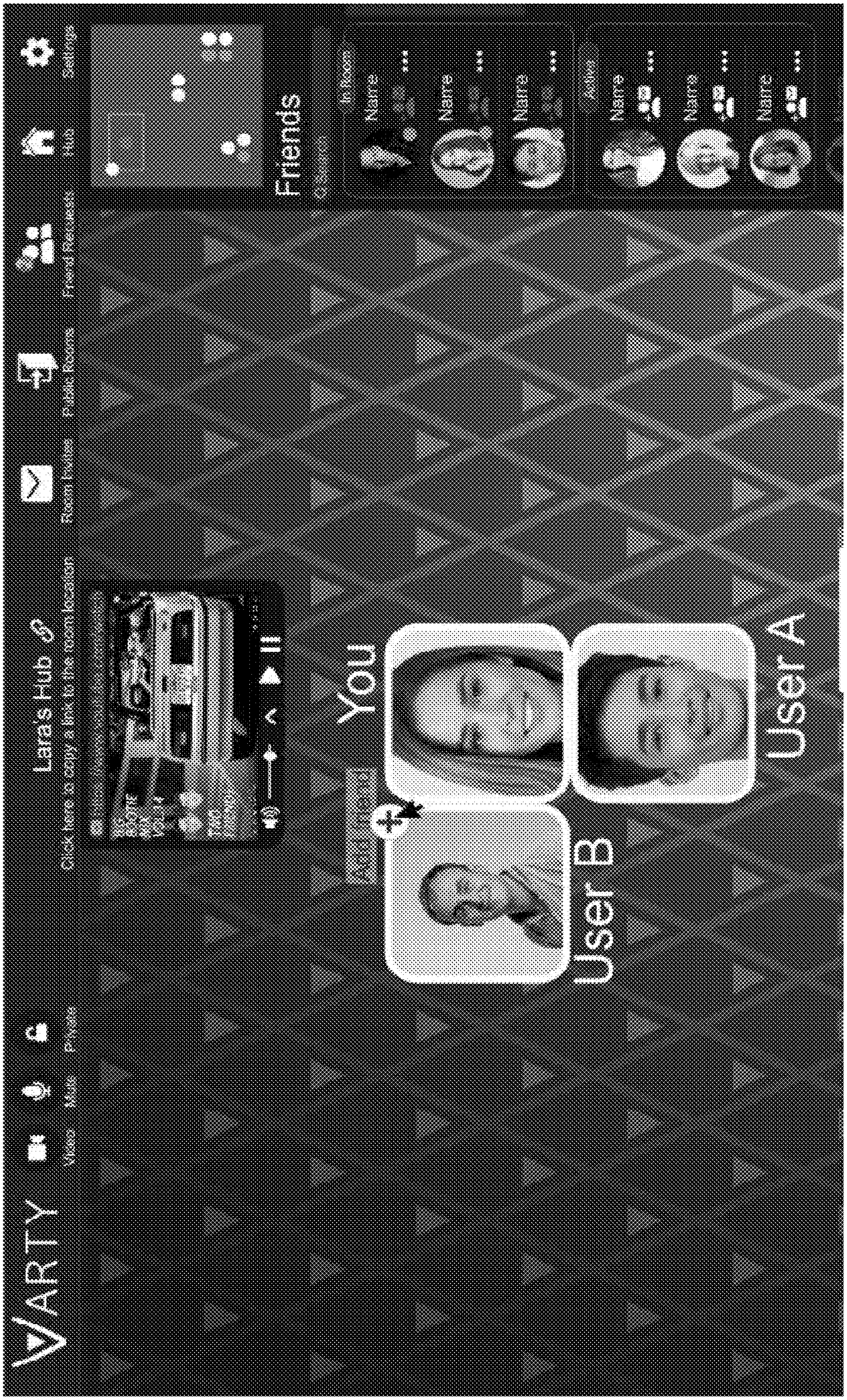

FIG. 23E—Or you can add them in another way (2) by being in a video call with them and clicking add friend. User A does not have the "add friend" button because user A is already your friend.

FIG. 23 F—You have to click on add friend button to add them.

Figure 23G:
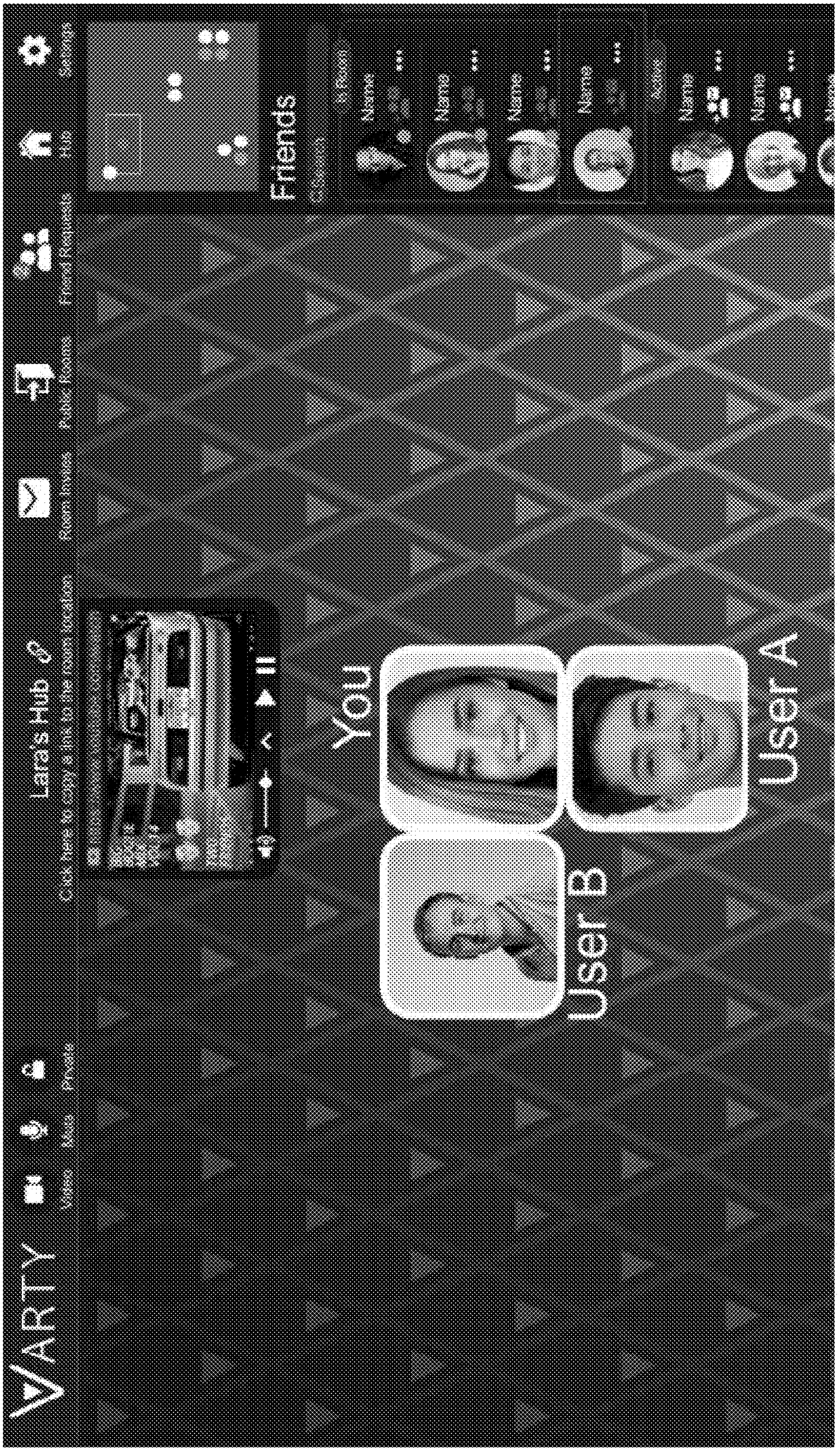

FIG. 23G—And then your new friend shows up in your "in room" friend section now.

Filtering Users at an Event

Figure 24A:
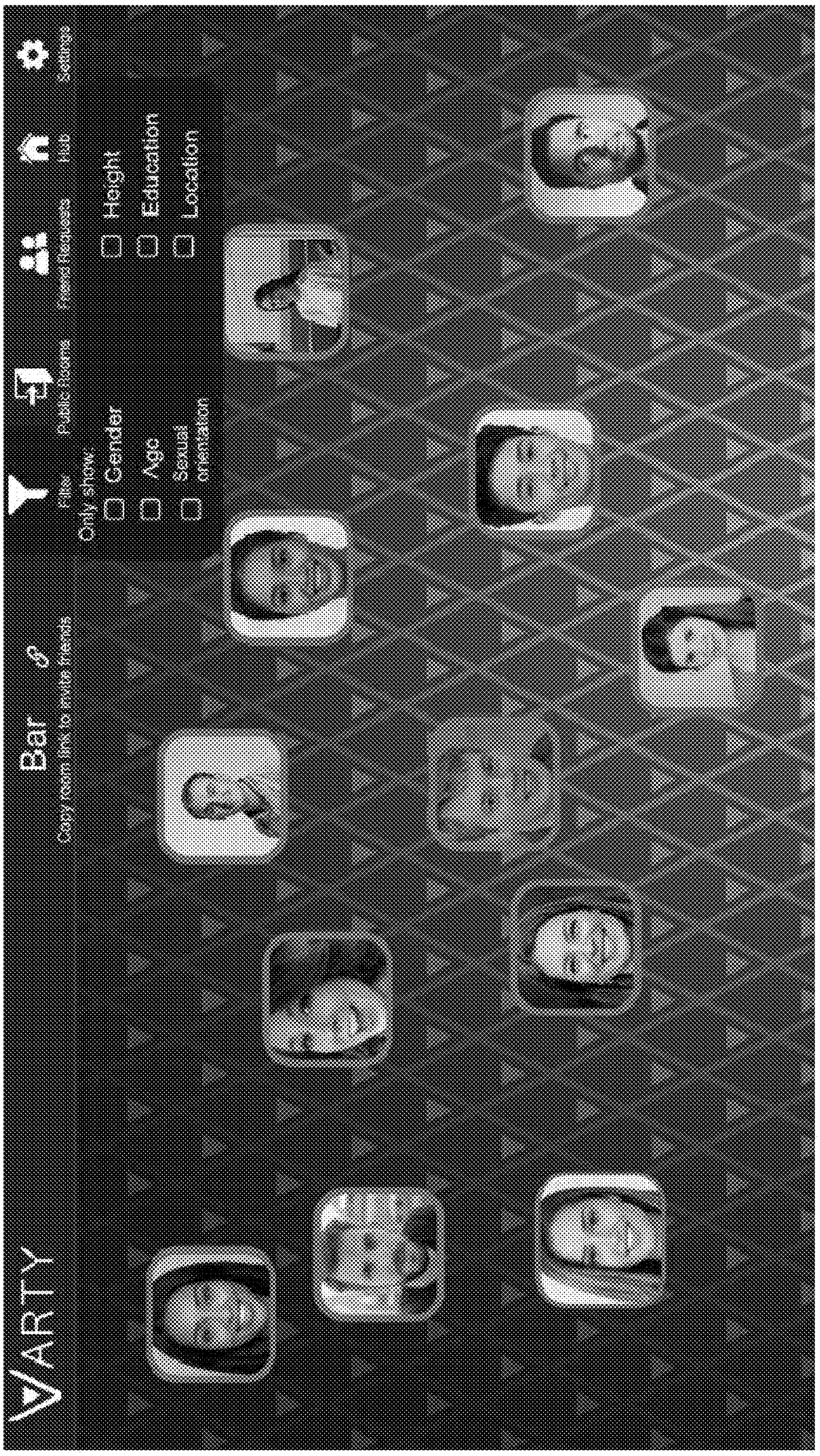

FIG. 24A—You can apply filters so that you only see certain users in the room.

Figure 24B:
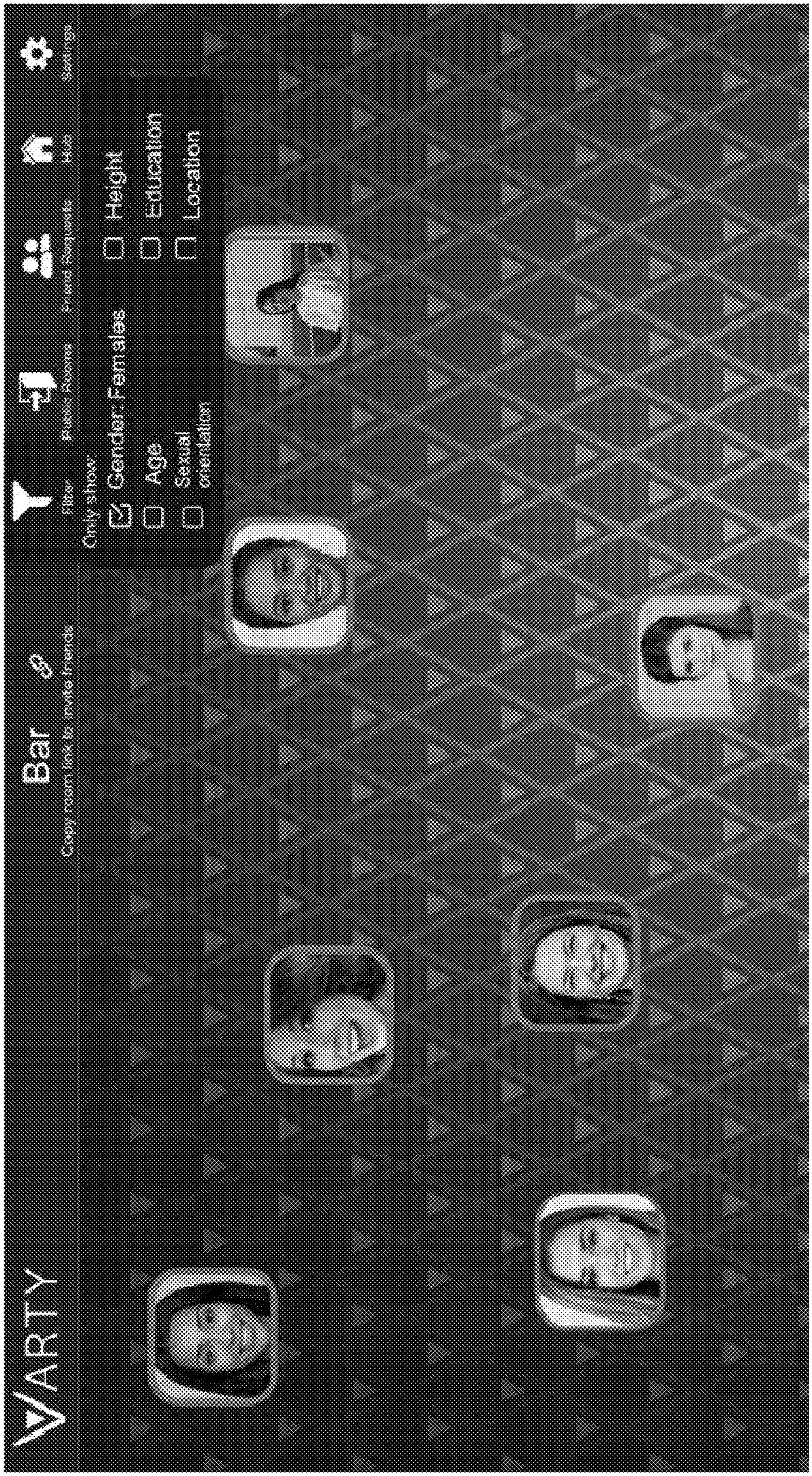

FIG. 24B—When you apply a filter based on a profile input, the excluded users will disappear from your view of the screen.

Figure 24C:
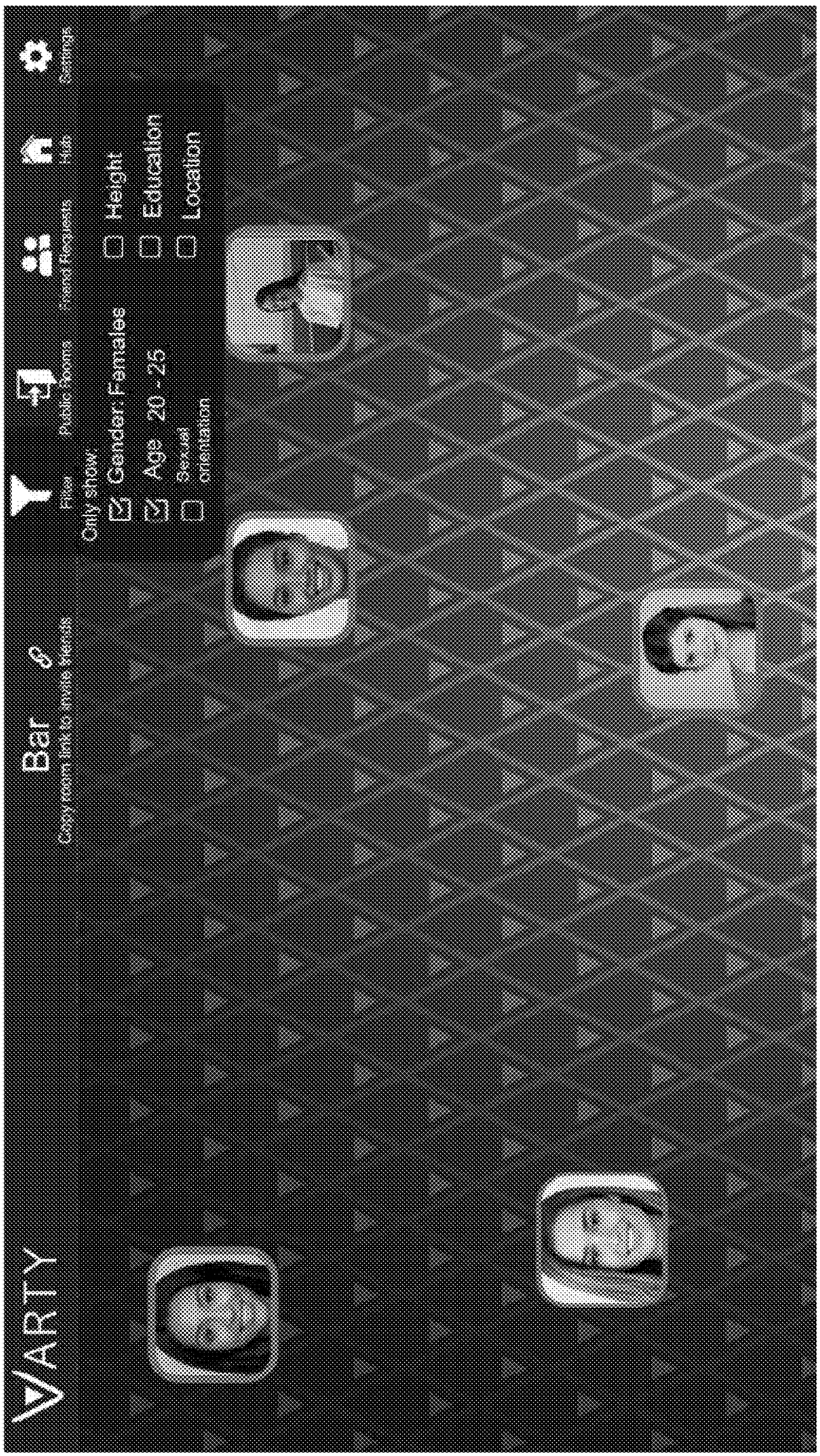

FIG. 24C—For any user who is filtered out from your screen, you will also disappear from their screen.

Figure 24D:
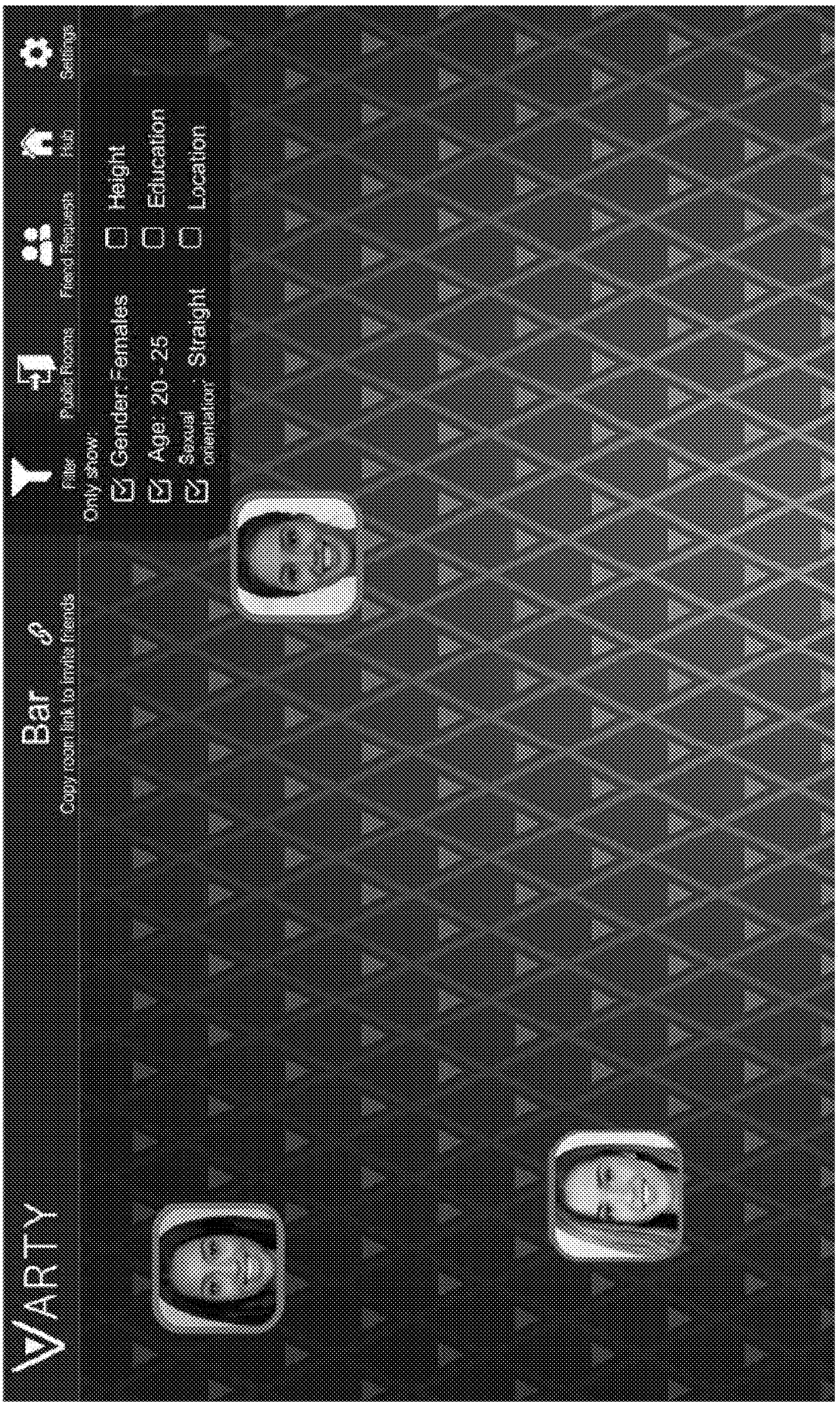

FIG. 24D—The more specific the filters, the less users you will see.

Public room posting:

Hosts can pay to post room to make it publicly available to anyone

Host decides constraints:

payment structure to enter profile inputs to enter

Figure 25A:
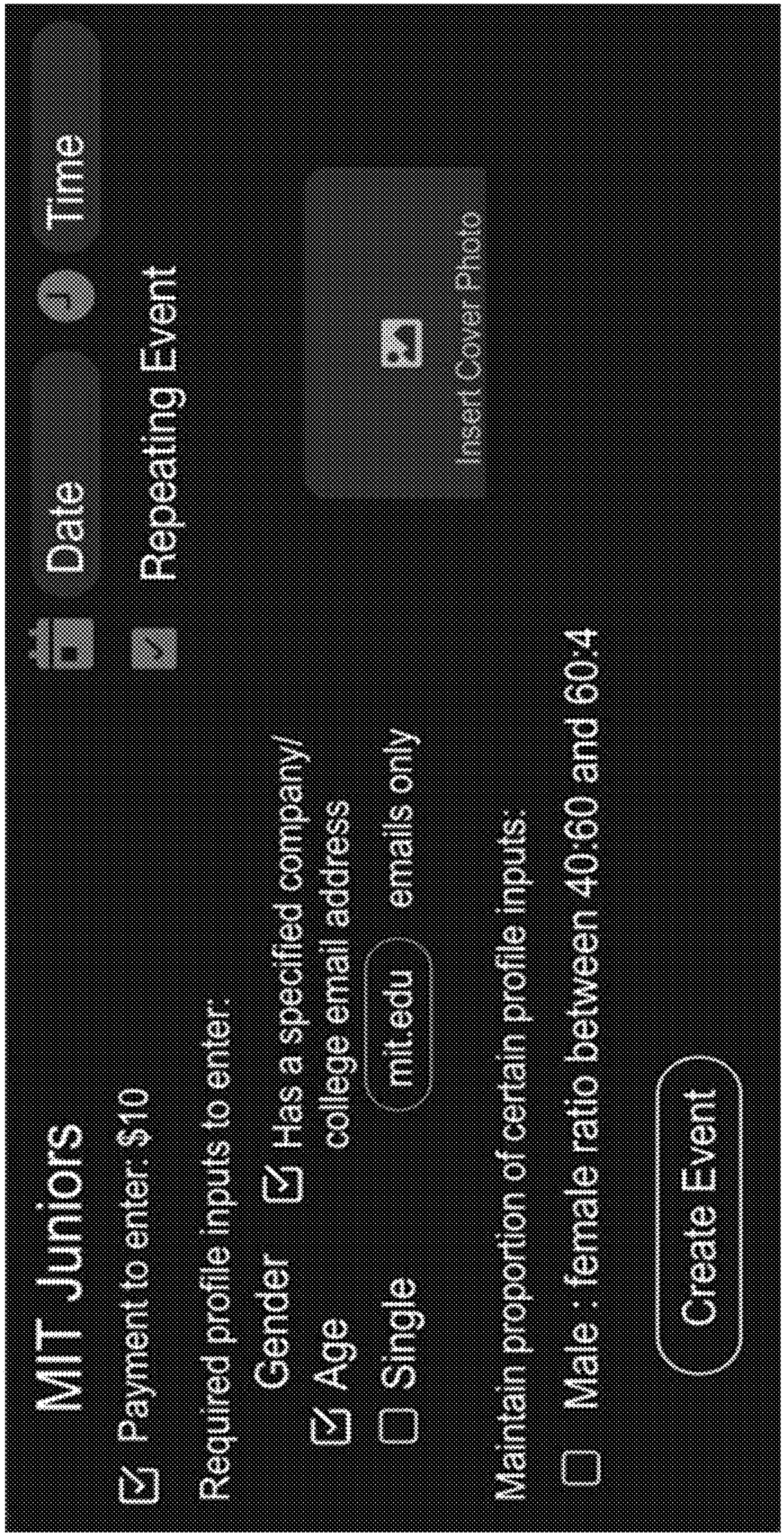
FIGS. 25A-25B illustrate the mechanics of public room posting in accordance with an invention embodiment.

Proportional requirements based on profile inputs (e.g. ratio of Males:Females), these behave differently based on the current ratio Sorted in other user's "Public rooms" feed according to weighted algorithm of "preferences", "profile inputs", and "number of friends" in room Public Room Posting FIG. 25A—Someone creates an event for the MIT Junior class. To enter this event, the user must have an MIT. EDU email address and be of certain age.

Figure 25B:
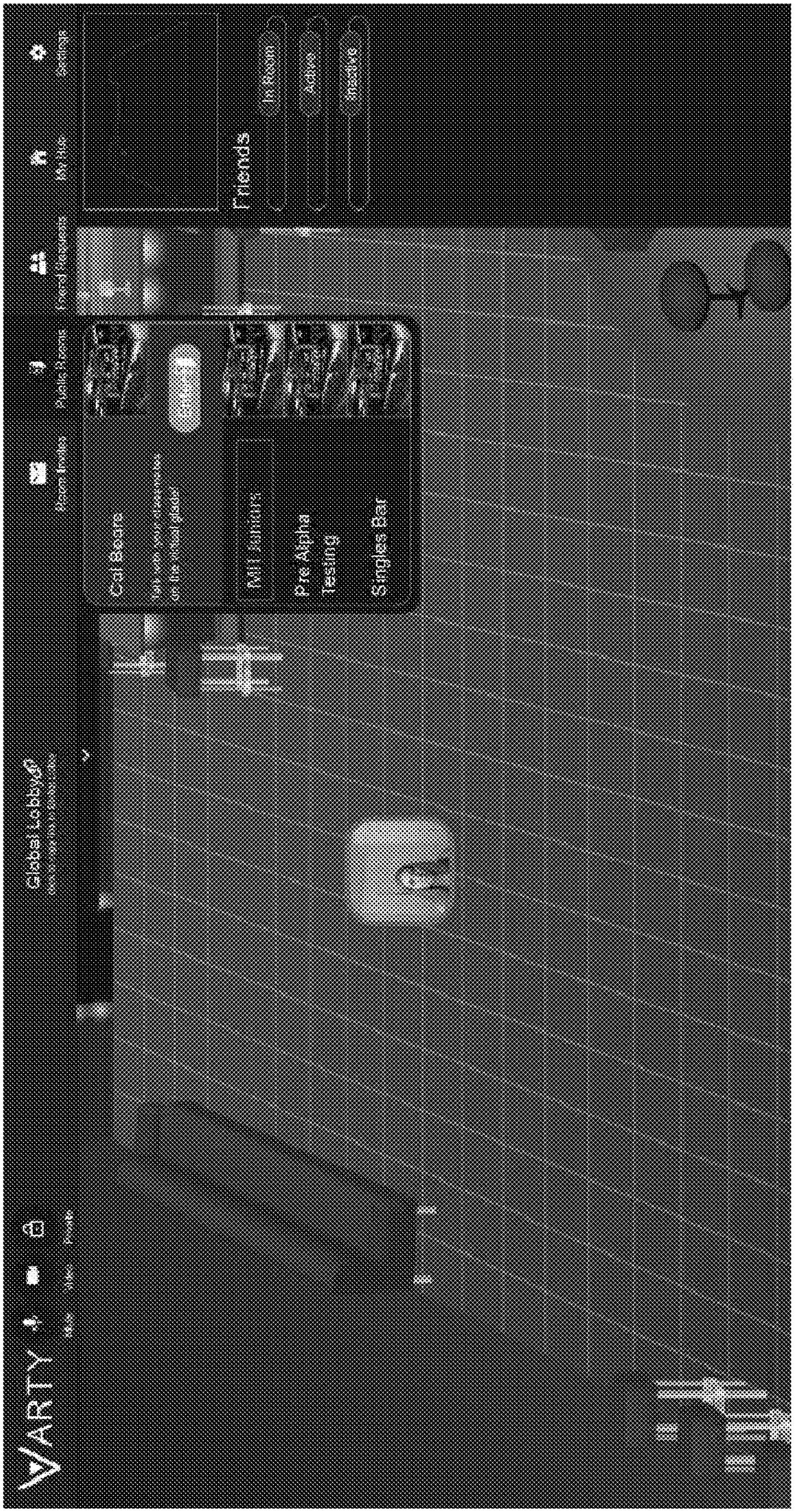

FIG. 25B—Since an MIT junior who has attended previous MIT.edu only events, and since he falls into the specified age category, the MIT Juniors event would show up high on his Public Rooms list as he is very likely to be interested in it given his profile inputs and past event attendance.

Friending in virtual settings

Can invite friends to your room and travel to rooms where friends currently are on the platform, if you meet the room constraints.

(added to room hierarchies)

Avatar filters

Within the personal profile page, the user will be able to set certain profile characteristic traits to filter for, such as age, location, height, and other interests.

The use of a webcam picture taken on the spot to serves as a distinct and recognizable avatar for a virtual environment.

The following are the advantages of the Application or environment:

A website tailored for hosting large social gatherings online—user has autonomy over who they interact with just like in real world.

Seamless social interactions in a virtual space that emulates the dynamics of real life social setting.

An interface to virtually connecting with new people, along with features for re-enforcing those connections via the ability to keep track of friends and interactions Social media in the moment—serves as a platform where users can share experiences in the moment instead of through an "online post" days later.

Encourages more meaningful and natural social interactions via virtual spaces that are curated to specific user groups based on profile details, thus fostering real connections.

Figure 26A:
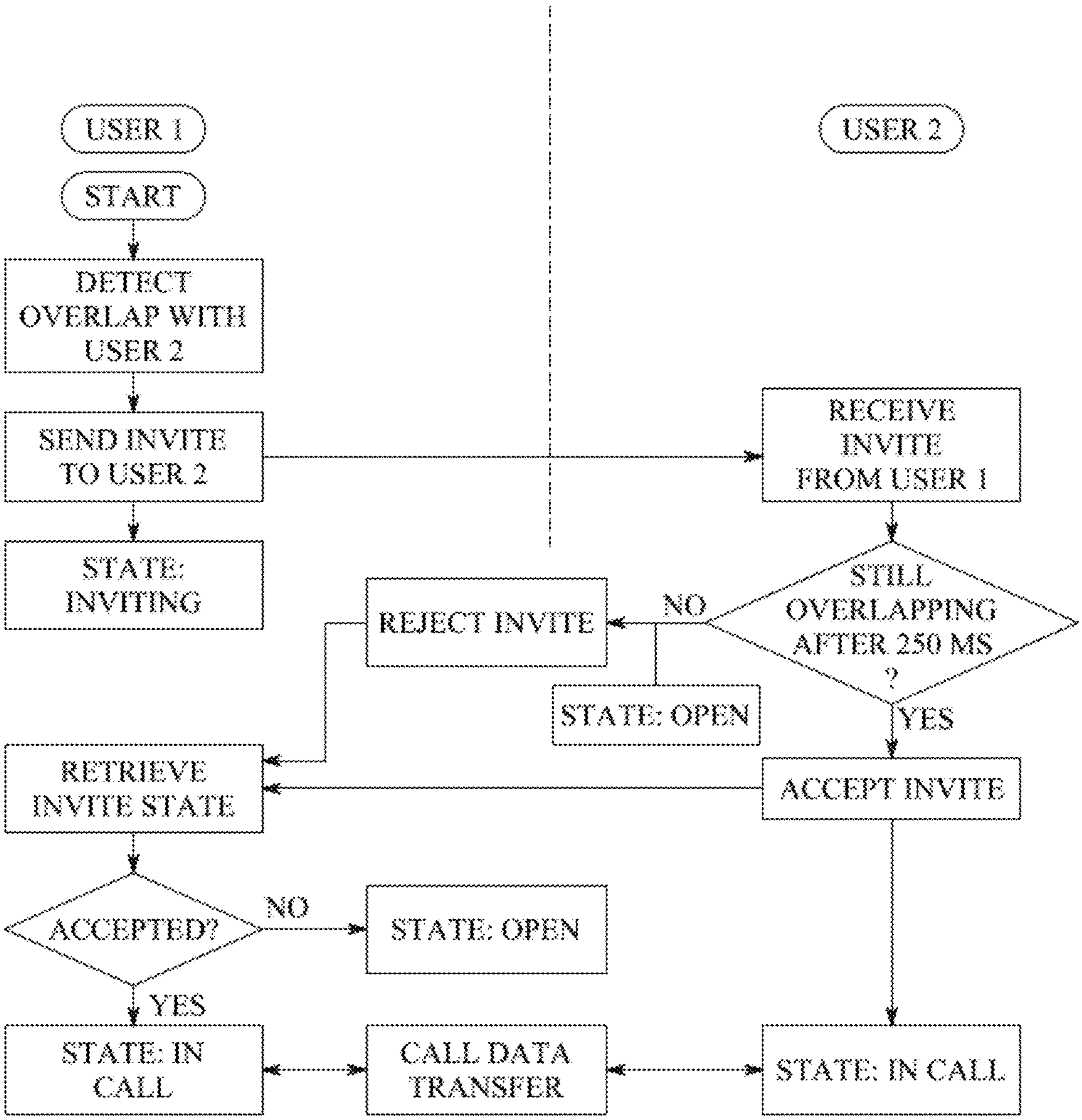
FIGS. 26A-26B illustrate the flow of actions for initiating a new call in accordance with an invention embodiment.
Figure 26B:
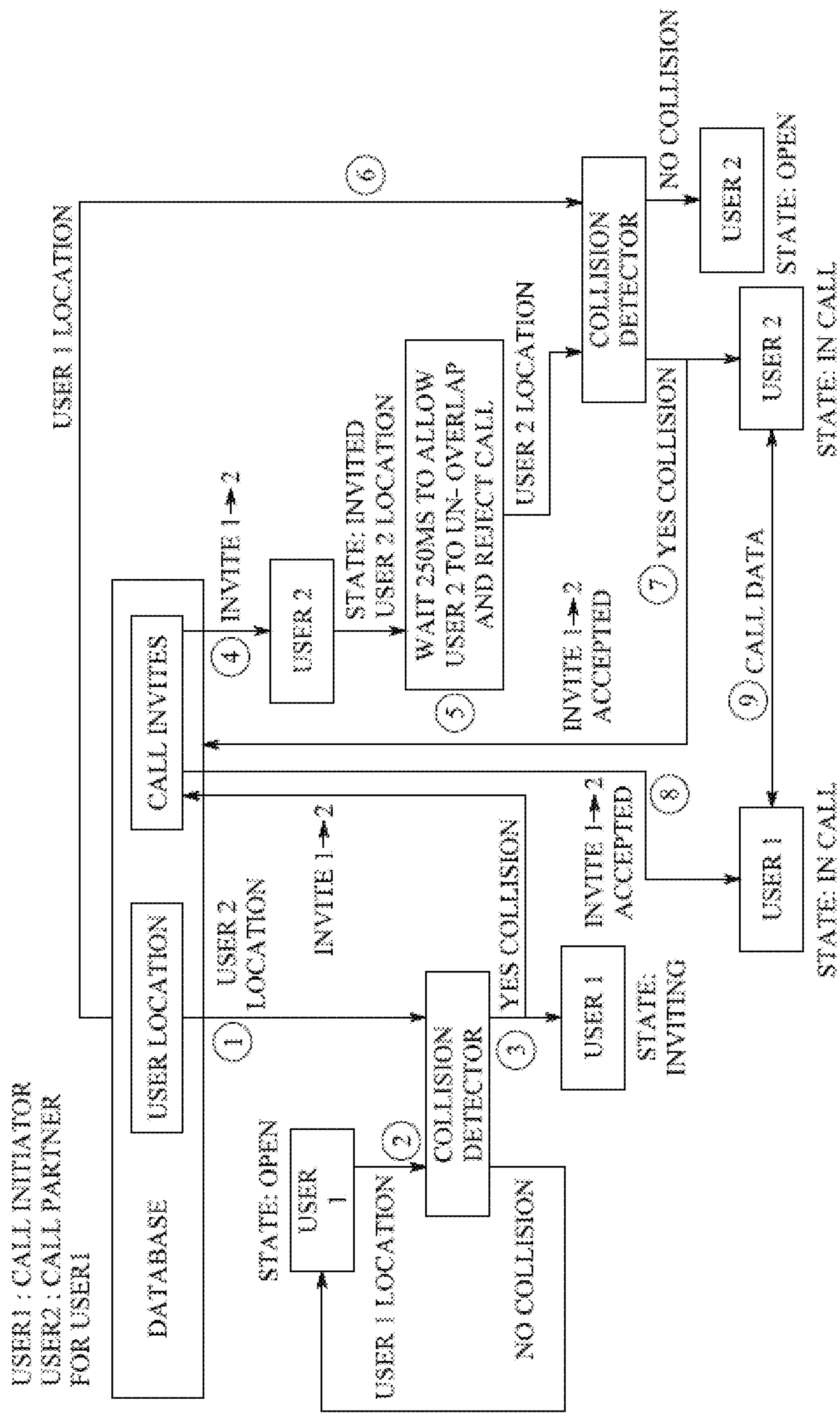

The steps in initiating a new call as shown in FIG. 26A-26B are as given below.

User1: Initiator.

User2: Receiver of User1's invite.

User States:

Open: available to call

Inviting: Sent an invite and awaiting a response

Invited: Received an invite and deciding whether to accept

In Call: In a call with one or more users

When two users overlap, if they are both stationary and in the state open, the user who was moving most recently (User1) adds an invite to the database which is addressed to User2. User1's state changes to inviting. They will remain in this state until the invite is accepted or rejected.

User2 reads this invite from the database and their state changes to invited. They will remain in this state for a period of up to 250 ms. Once they receive the invite, a 250 ms timer starts. If before that timer is up, either User1 or User2 moves away from the other and they no longer overlap, the invite will be rejected, and both users will return to the state open. However, if they remain overlapping, User2 will accept the invite and the User1 and User2 will change to state In Call. Furthermore, a Convo will be added to the database with User1 and User2 as members.

Figure 27A:
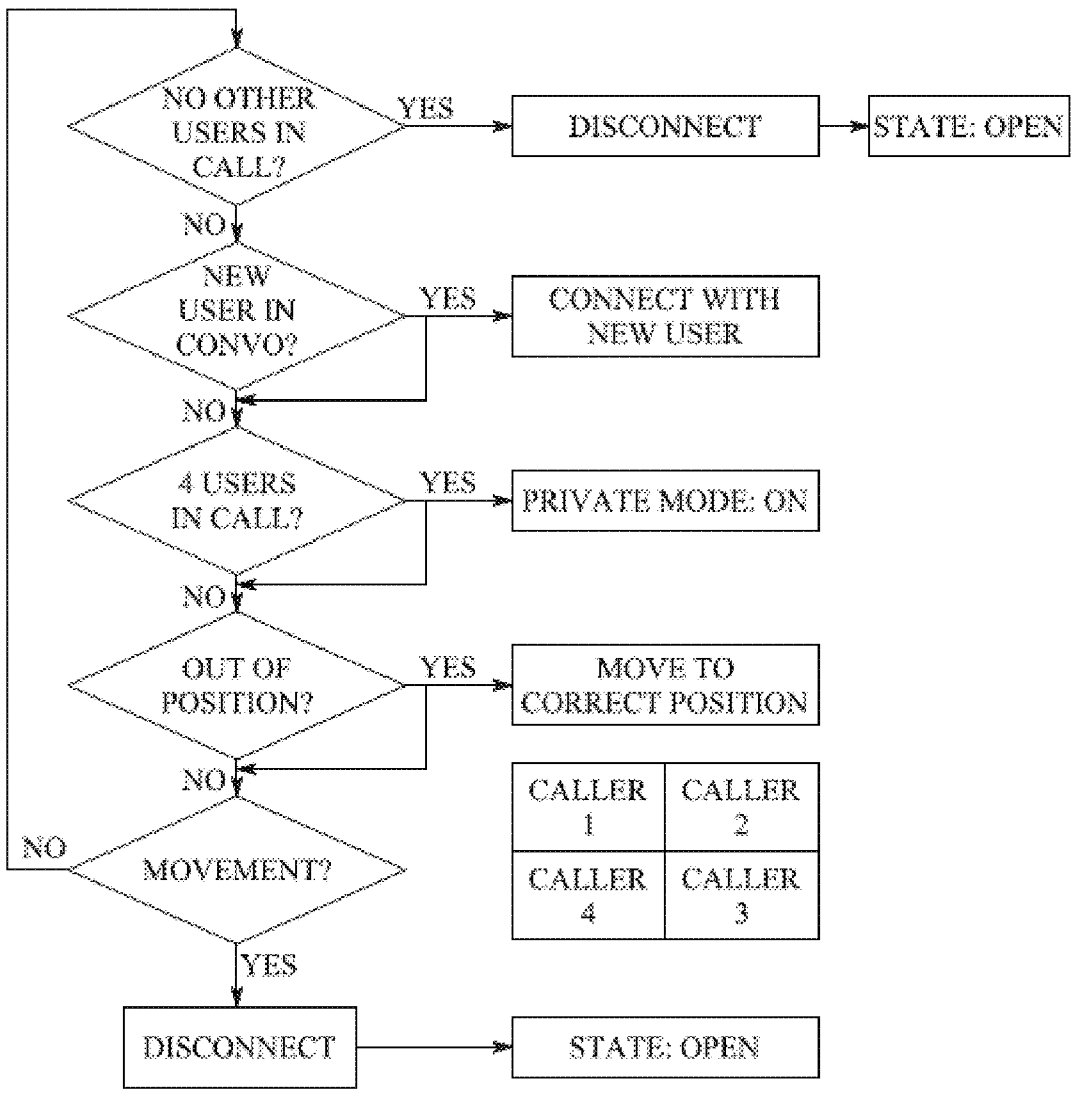
FIG. 27A illustrates the actions for maintaining call invariants and in accordance with an invention embodiment.
Figure 27B:
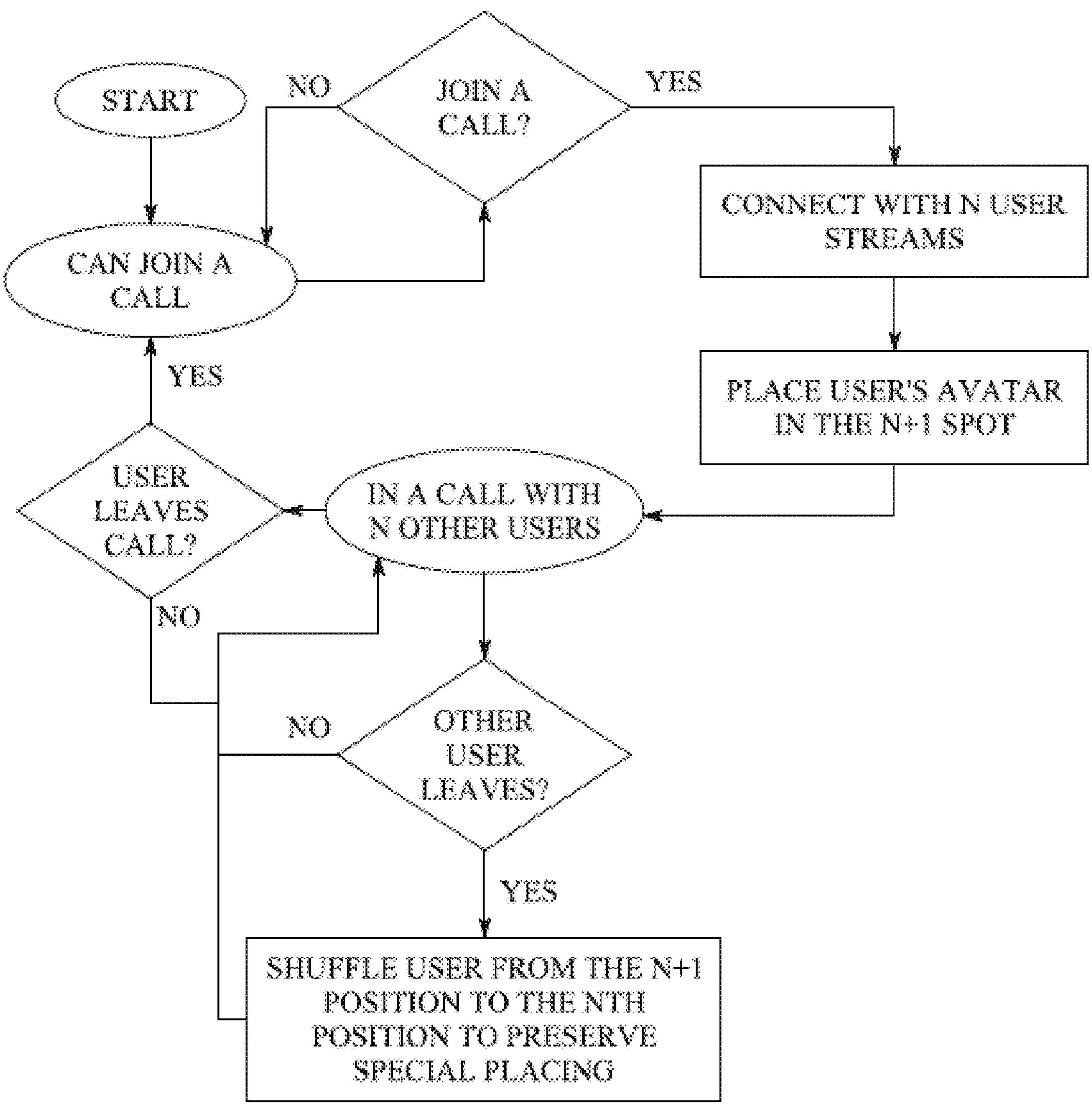
FIG. 27B illustrates keeping the spots in the same spatial position in accordance with an invention embodiment.

The steps in maintaining call invariants and keeping the spots in the same spatial position as shown in FIG. 27A-27B are as given below.

Whenever the user is free and public, they have the option to join a call.

To join a call, they walk up to anyone, overlap avatars, and automatically the streams will connect, and a conversation will begin.

As the streams connect, the user's avatar automatically moves into a set position, the n+1 position of the conversation.

The initiator of the call joins first, and with n=0 people in the call joins as the n=1 position.

The second person joins at the n=2 position, and so on.

Each position in the call has a set spatial position, such that the person in n=1 spot will always be in the n=1 spot, no matter if the original initiator has left or not.

The n=2 position will always be in the n=2 position, and so on.

People can leave and rejoin the call at will, unless the call is private or already at the n=N_max number of users.

When someone leaves, their spatial position becomes vacant, leading to all other users shuffling around to fill the vacant position.

As an example, if the n=2 user leaves, the n=3 user takes the n=2 person spot in the conversation, the avatar is automatically shuffled to the n=2 spot, thus filling the empty location.

When the n=1 user leaves, the n=2 user takes on an additional role as the admin. The admin can control where the location of the call lies, and can move the group around the bar.

Keeping the spots in the same spatial position creates consistent eye contact between all users in the call. The n=1 position will always lie in the n=1 position, and thus the users looking at that user will all look towards the same spot. This extends from the n=1 position to all the positions in the call.

Figure 28:
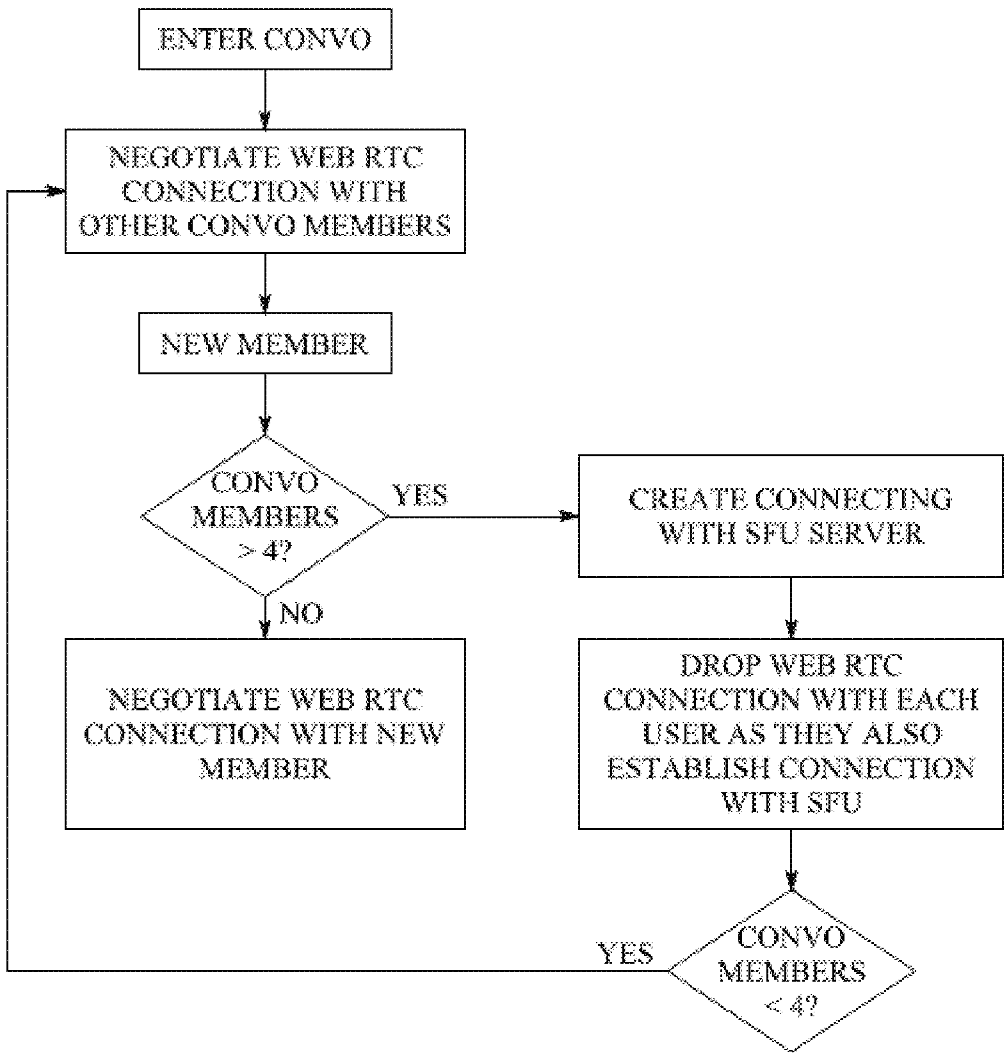
FIG. 28 illustrates the actions for handling video stream data transfer in accordance with an invention embodiment.

The steps in handling video stream data transfer as shown in FIG. 28 are as given below.

Video convos are initiated based on virtual proximity.

In a convo a WebRTC connection is negotiated between all users in the convo. As more users enter the same convo, we continue to create peer to peer connections until we reach the convo capacity of N_max.

Once we reach N_max users, we 'lock' the convo and prevent new people from joining the convo. We also renegotiate the convo by upgrading it to a SFU voice call (where we use a selective forwarding unit to duplicate the same video stream to send to each user), all users connect to the SFU server instead of sending their voice and video data separately to each user in the convo.

The renegotiation occurs in the following manner:

Client polls server on the number of users in a specific convo

If the server notices that there are enough people, alerts the client to enter SFU mode.

The client, without terminating any existing call connections, creates another connection with the SFU server to send over both video and voice.

The client alerts the server that it has successfully connected to the SFU server and the server notifies all other clients in the call.

Other clients upon being notified and connected to the SFU server, drop the peer to peer connection between two users, if and only if both clients also are connected to the SFU server. Upon dropping the peer to peer connection, both clients replace the video and audio footage with ones sent by the SFU server.

Once the size of the call becomes less than N_max, the convo downgrades by reconnecting between users individually using peer to peer connections. By doing this, we save on upload bandwidth which usually is the bottleneck for users at home.

Figure 29A:
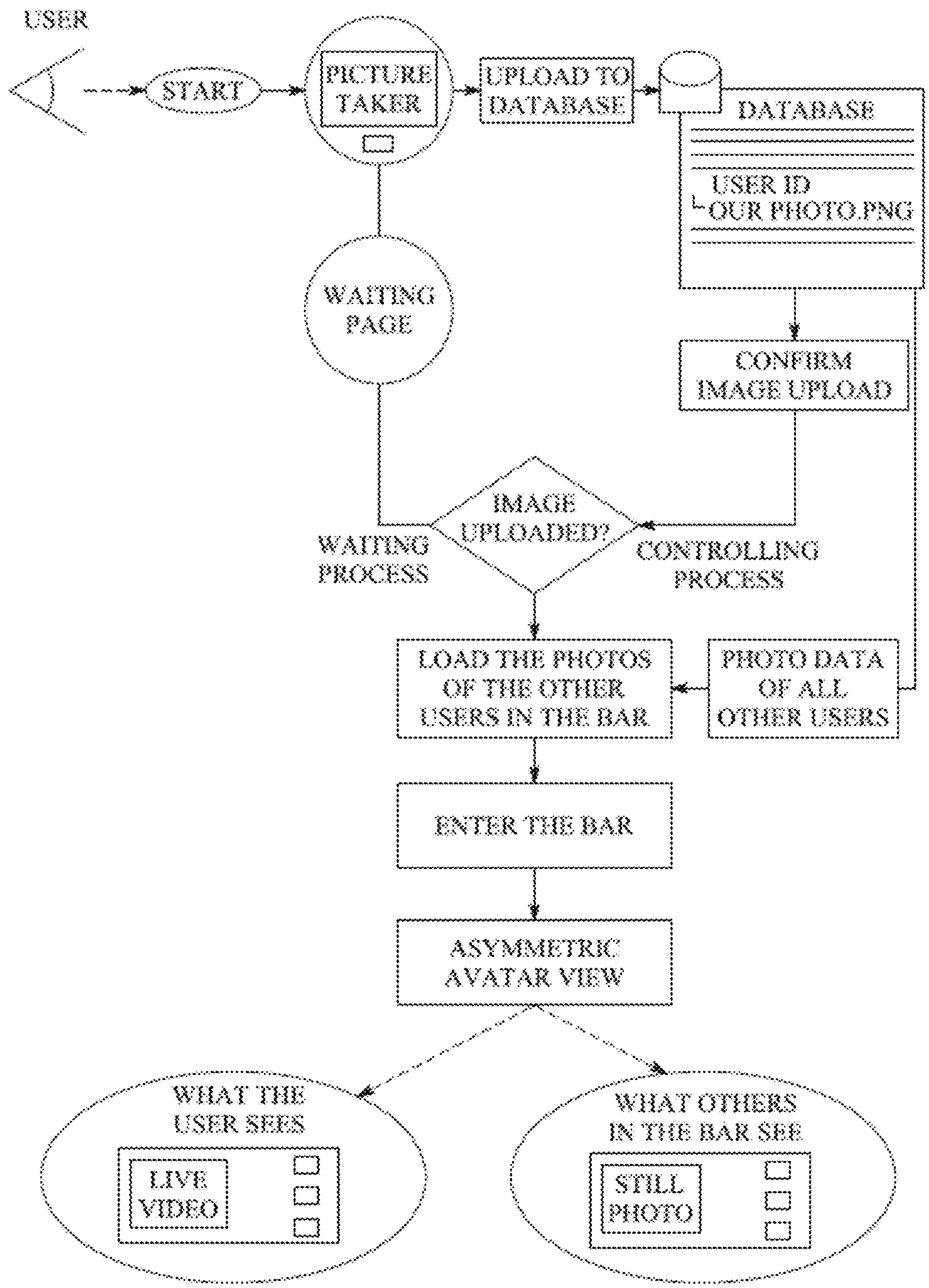
FIGS. 29A-29B illustrate the actions for managing avatar photographs in accordance with an invention embodiment.
Figure 29B:
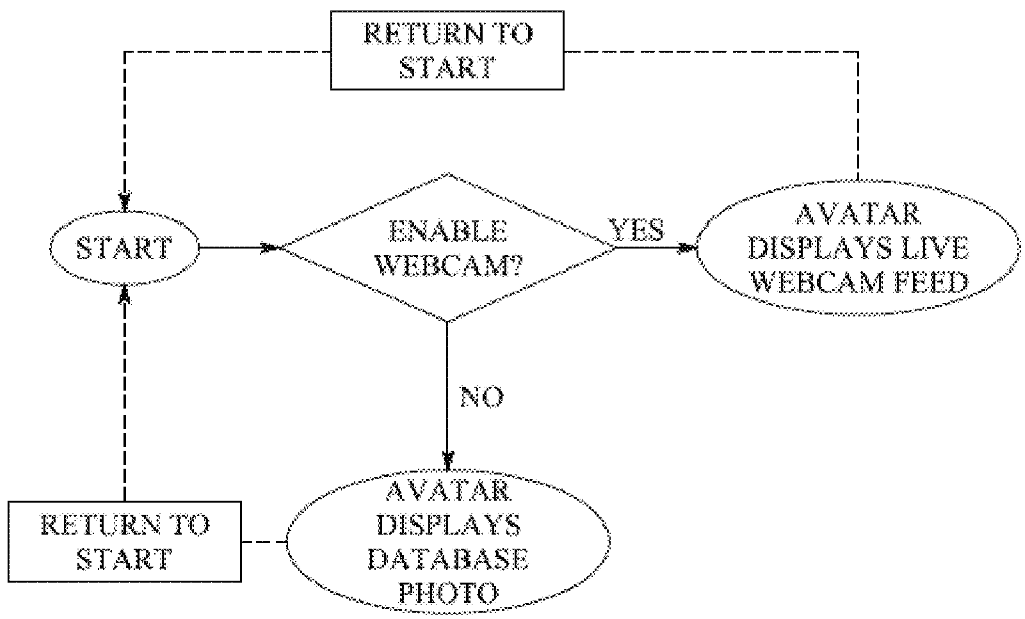

The steps in managing avatar photographs as shown in FIG. 29A-29B are as given below.

Before entering a room, the user encounters a prompt to take a photo. The prompt takes data from the user's webcam and displays a live feed to an HTMLCanvasElement. Underneath this HTMLCanvasElement lies a button to capture the live webcam feed at a certain time. Once pressed, the button performs two functions.

First, it begins the upload process to the long term and large file size database, storing the image under the user's backend identification hash.

Next, the button switches the visible frontend page from the picture taking prompt to the loading page, causing the live webcam feed to disappear, replacing it with a loading bar as the user waits for the photo to complete the database upload. Confirmation that the image is loaded is sent to the user, enabling them to enter the bar.

Before avatar creation, the user begins loading the data of the other users in the bar, including their photos from when they took their photos.

As the avatar is created an asymmetric view exists as long as the user has webcam feed enabled. The asymmetric view exists between what the user sees, and what others in the bar see. The user themself sees their live webcam feed put on to their in-game sprite; other users in the bar view the photo they took when they entered the bar. Once the user disables webcam feed to their avatar, the avatar creation photo taken before entering the bar displays, and the asymmetry between the user and the others in the bar disappears; they both view the same avatar.

This avatar creation process exists every time a user enters a bar, with no two beginning photos being exactly the same from bar room to bar room.

Figure 30:
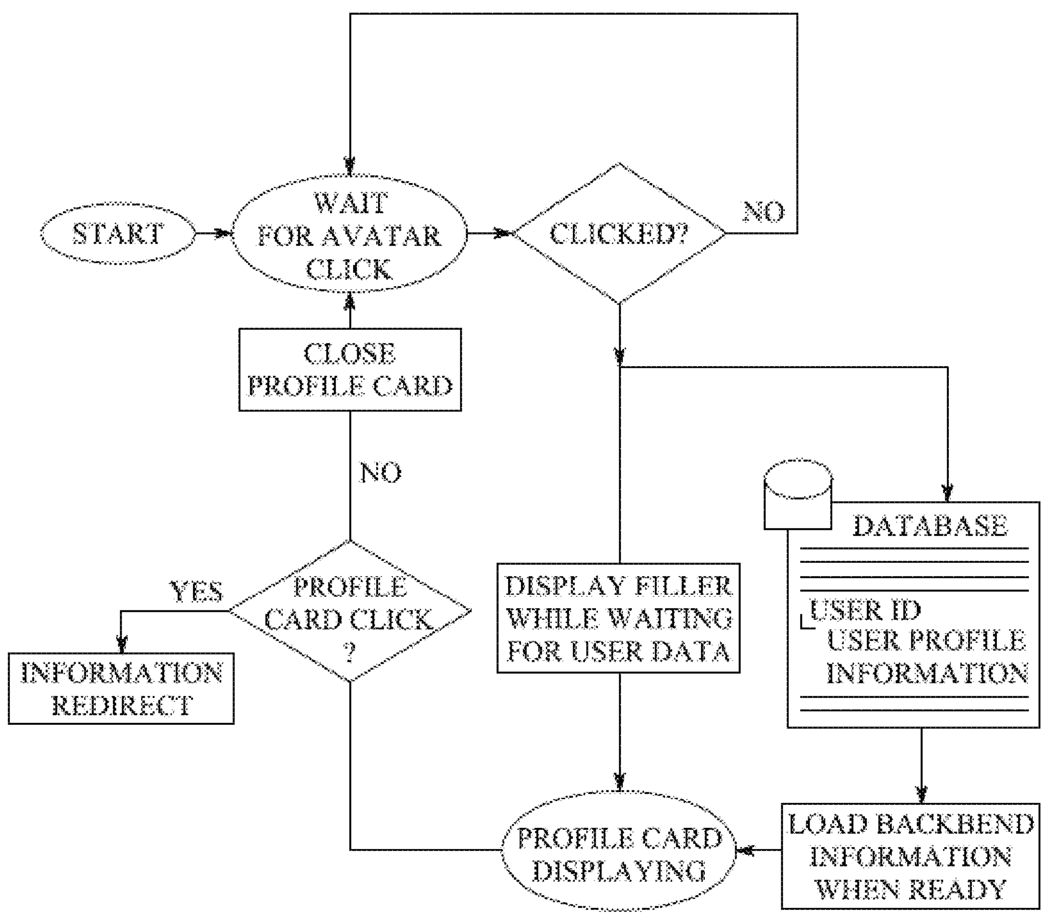
FIG. 30 illustrates the actions for managing profile cards in accordance with an invention embodiment.

The steps in managing profile card as shown in FIG. 30 are as given below.

At any point, the user can choose to click on any other user in the bar, including themselves.

Upon clicking on a user, a profile card displaying user-specific information begins loading.

A request is sent to the database storing the information. As the request is processed, loading information is displayed to the user. Once the request has made it back from the database, the loading information is replaced by the user-specific information and is displayed.

From there the profile card allows for a number of options such as blocking, friending, inviting, personal bio text, age, location, drinking, watching. Of these that are clickable, the profile card will handle the information redirect. The profile card will close from either clicking the closing icon or clicking off the location of the profile card.

Figure 31:
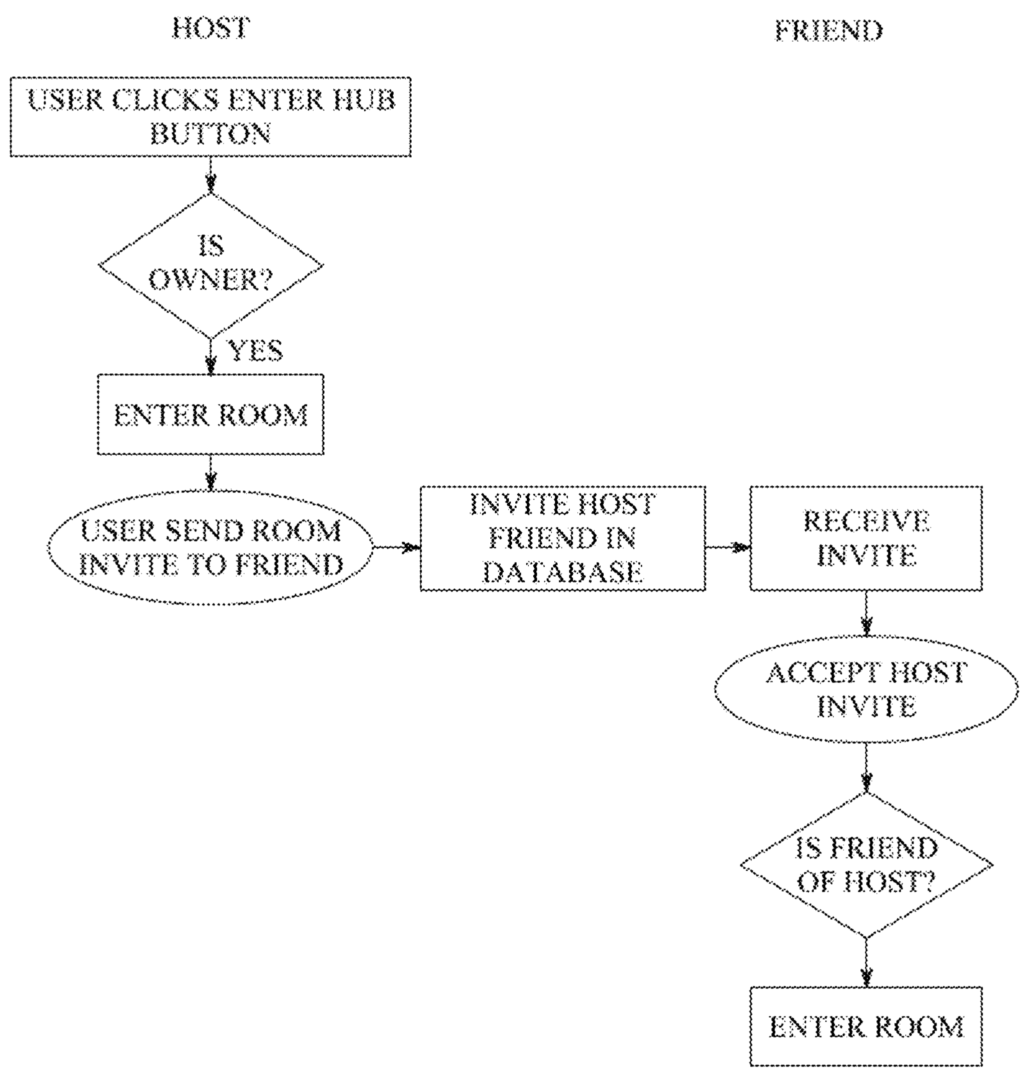
FIG. 31 illustrates the actions for managing private rooms in accordance with an invention embodiment.

The steps in managing private rooms as shown in FIG. 31 are as given below.

The host is able to enter their hub after a check with the database entry for that room that they are indeed the owner of the room.

From their private room, they are able to send invites to their friends who are online.

Upon receiving an invitation, if the Friend accepts, they will attempt to enter the room.

Before allowing them to enter, the room first verifies that they are on the hosts friends list. The program does this by reading the friends list of the host from the databases and verifying that the friend is on the list. If they are, they admitted.

Figure 32:
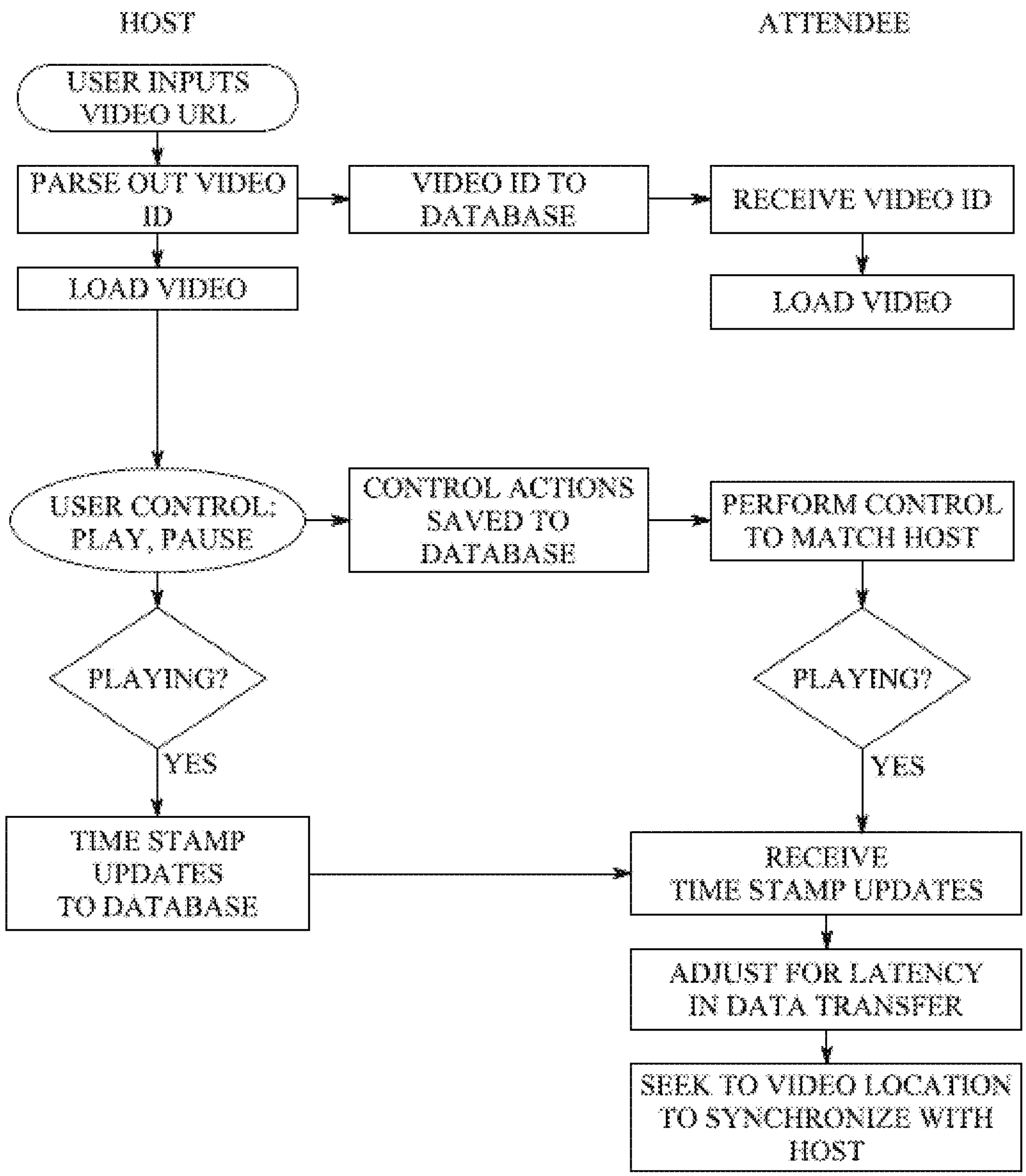
FIG. 32 illustrates the actions for managing broadcasting in accordance with an invention embodiment.

The steps in broadcasting as shown in FIG. 32 are as given below.

In broadcasting there are 2 roles: host and listener. Each room has one host and the rest of the users are listeners.

At any time, the host can paste a video URL into the broadcasting bar on the site. When they do this, they load the video into the broadcasting element. Also, the video ID is parsed out and uploaded to the database. All listeners read this video ID and load the same video into their broadcasting element. The listeners have no control over the video. The host controls both the video for both themselves and all of the listeners in the room.

The way the control works is as follows: any control applied by the host is recorded and uploaded to the database where the listeners' client can read it and apply the same control to their video.

Furthermore, while the video is playing, the following process is executed to ensure syncing between videos: The host periodically (every 200 ms) updates the database with the current timestamp of the video as well as the time of the upload. The listener reads these updates and if they are out of sync will seek to that point in the video automatically. Furthermore, to tighten up the syncing, the listener will find the time difference between the upload time and the read time and add this difference to the seek point thereby factoring out the network latency of communication between host and listener.

Furthermore, both the host and lister are able to collapse the video at any time so that they only hear the audio.

Figure 33:
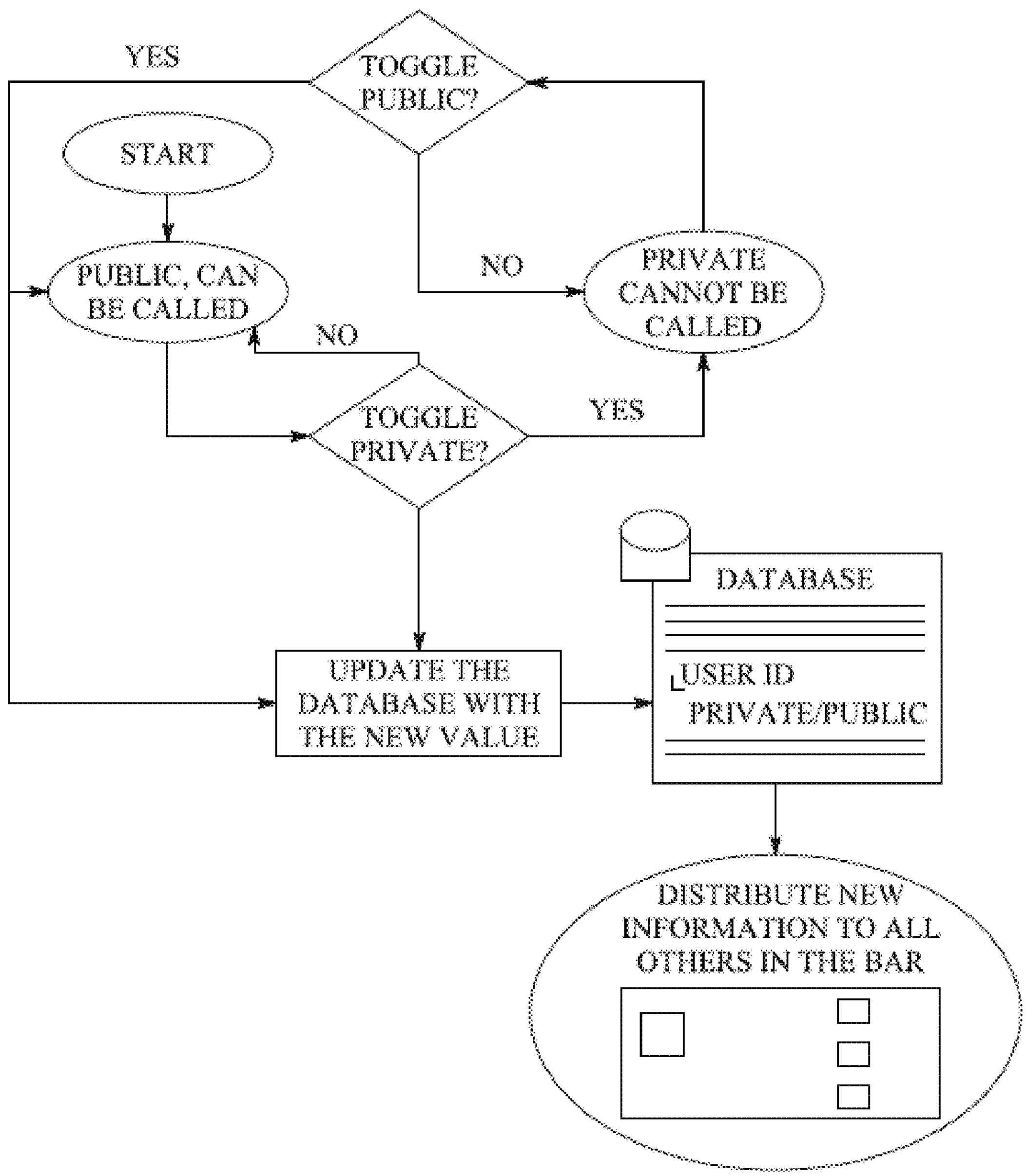
FIG. 33 illustrates the actions for managing private mode in accordance with an invention embodiment.

The steps in private mode as shown in FIG. 33 are as given below.

Upon entering a room, everyone starts off as public, and are thus open to be called by anyone. The user has an option to make themselves private. When the user toggles private on or off, the following steps occur.

The user's avatar turns slightly see-through (literally, their alpha value is reduced from 1) when they toggle private. When they are public, nothing can be seen through the avatar (literally, their alpha values become 1).

Whenever a public/private state change occurs, the user sends data to the database informing the database how others in the bar should see them. The alpha values of the avatar are changed for everyone in the room, indicating to everyone in the room if the user can be called, or if those in the bar must wait for them to exit private mode.

Figure 34A:
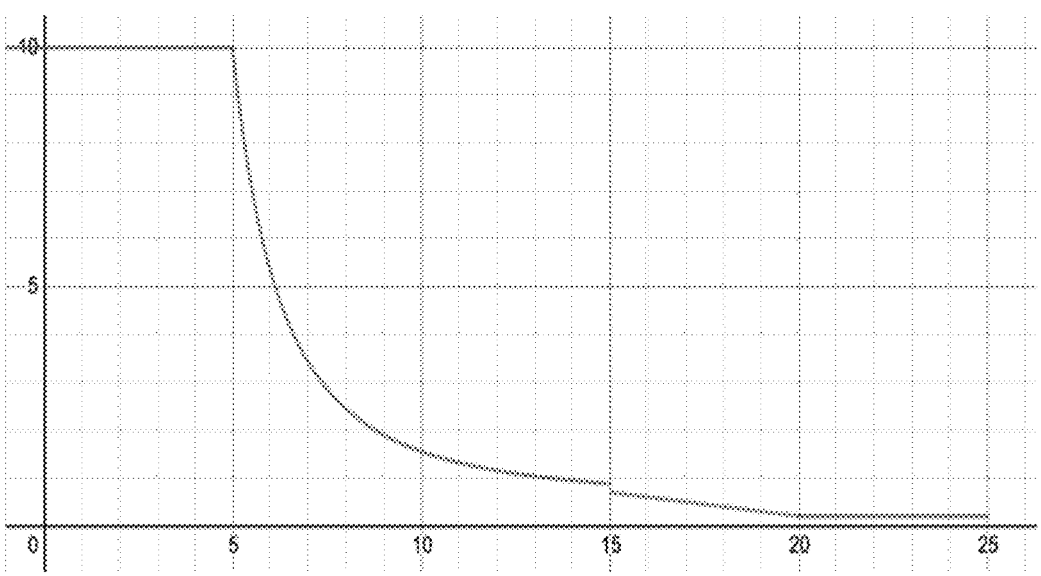
FIGS. 34A-34B illustrate the actions for managing volume scaling in accordance with an invention embodiment.
Figure 34B:
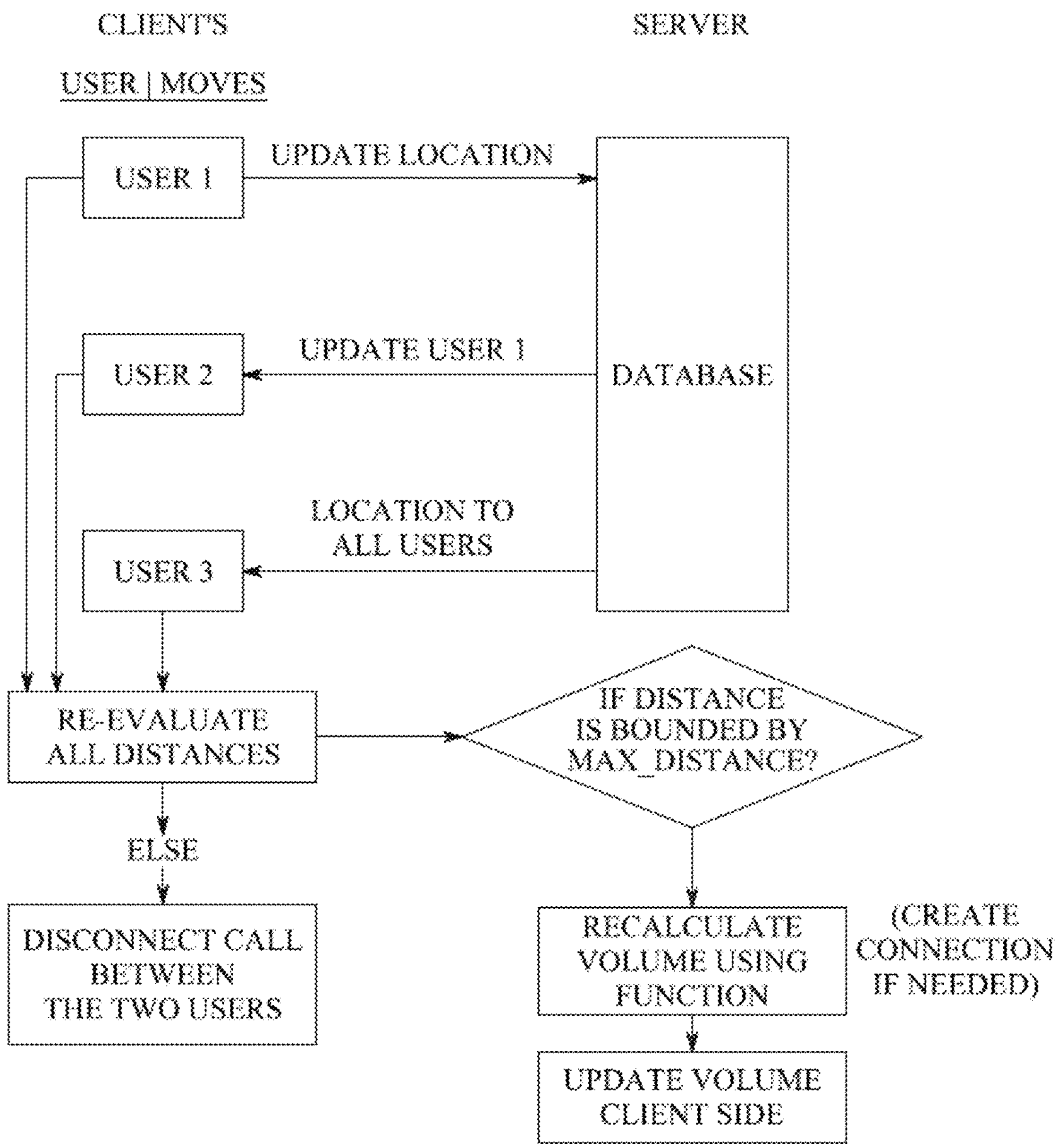

The steps in volume scaling as shown in FIG. 34A-34B are as given below.

While users might only be in one convo, they can actually be in multiple calls at once to create the ambiance of having multiple people together in a group. Only convos will share a video stream and share the full volume of the audio. For other users not in the same convo but proximally close in the virtual space, we will take the distance between the users virtually and scale it using the piecewise graph shown in FIG. 34A. The volume stays at full volume for all people for a set radius away from the user before decreasing proportional to the squared distance away before flattening out to a constant value before completely dropping off Users will have an option to choose the max number of other conversations to hear and also privatize their conversation to prevent other people from eavesdropping on their conversation if need be. The server will be responsible for gatekeeping which calls are allowed to be created and which users they can connect with. The users will always be aware when other people are connected and potentially hearing parts of their conversation.

The steps in volume scaling reflective of users' positions relative to your own avatar are given below.

If someone is virtually to your left, their volume occurs on the left speaker or earphone and vice versa.

The position value of the user's avatar relative to your own is read and the sound is proportionally scaled relative to how close to each position the other user is when they make a sound.

The steps in eye contact management are as given below.

Using image recognition technology, the eye position is mapped by using a heatmap to determine where the pupil of each user in a particular call is.

Then based on the position of the pupil and the positions on a user's screen of the avatars, the place a user is looking is determined by sensing the angle of the face and the position of the pupil relative to the rest of the eye to inform the particular angle the person is looking at the screen with, and then drawing a virtual line from the pupil angled at the face angle to the screen to predict where the eye is looking.

Then after this data is read, the eye position is adjusted, using deep-fake technology, to appear as though it is slightly adjusted based on relative position (as in the UI screenshots below) equivalent to the inverse of the virtual distance on each user's computer, such that someone can see if another user is looking at their avatar.

Figure 35:
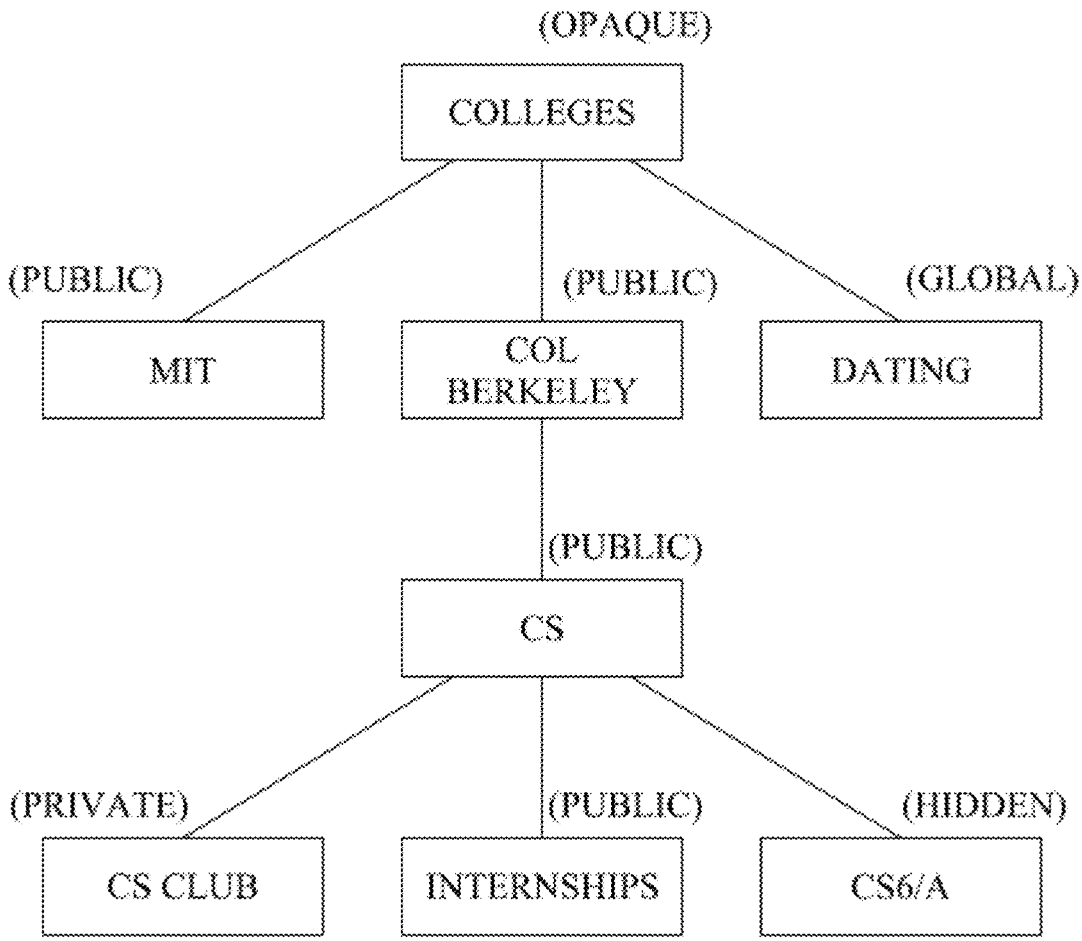
FIG. 35 illustrates the actions for managing room hierarchies in accordance with an invention embodiment.

The steps in managing room hierarchies as shown in FIG. 35 are as given below.

Each room can be designated as 'global', 'public', 'private', 'opaque' or 'hidden.' Users can be explicitly given access to specific rooms that then will populate their privileges with other rooms. Users' access to different rooms is dependent on their privacy designation. Each room can have multiple parents (although in practice one) and also multiple children which creates a room hierarchy. Each room can give 'explicit' access to certain users, which is different from just having access due to having explicit access to other adjacent rooms.

In order to calculate which rooms are available for the user to enter, a breadth-first search is used to find all possible rooms that a user has access to. If a user cannot access a specific type of room, the search is pruned, and no rooms further are evaluated from the specific room.

Global rooms are accessible by all users of the who have access to the parent room (or if it is in the root of the hierarchy, every user). This applies to even opaque rooms.

Public rooms are accessible by any users who also have access to either the parent or child of the room given the stipulations outlined by opaque, hidden and private rooms.

Opaque rooms are accessible by any user who has access to a direct child of the room and parent of the room. However, being able to access an opaque room does not allow a user to access any of its child rooms, unless they are global or if the child rooms have access through another room.

Hidden rooms are only accessible to any user who has access to a direct child of the room given the stipulations outlined by other rooms.

Private rooms are not accessible unless a user is specifically given access to the room.

In order to make it easier for people to discover and interact with new people, we'll be using a hierarchical system for organizing rooms. For example, a Berkeley CS Competitive Programming Club room will have parents of Berkeley CS and of Berkeley.

Each room will also have "doors" that allow them to move up and down the hierarchy to other rooms they have access to. A door will appear in the map for each parent and child room the user has access to. For example, if User1 has access to CS Clubs he would also have access to Internships, CS, CS Berkeley, Colleges, Dating. If User2 has access to Cal Berkeley he would also have access to Internships, CS, Internships, Colleges, Dating. If User3 has access to Colleges, he would also have access to Dating.

Users can invite friends to join them in their current room if both friends are currently both online and both users have access to that room.

Figure 36:
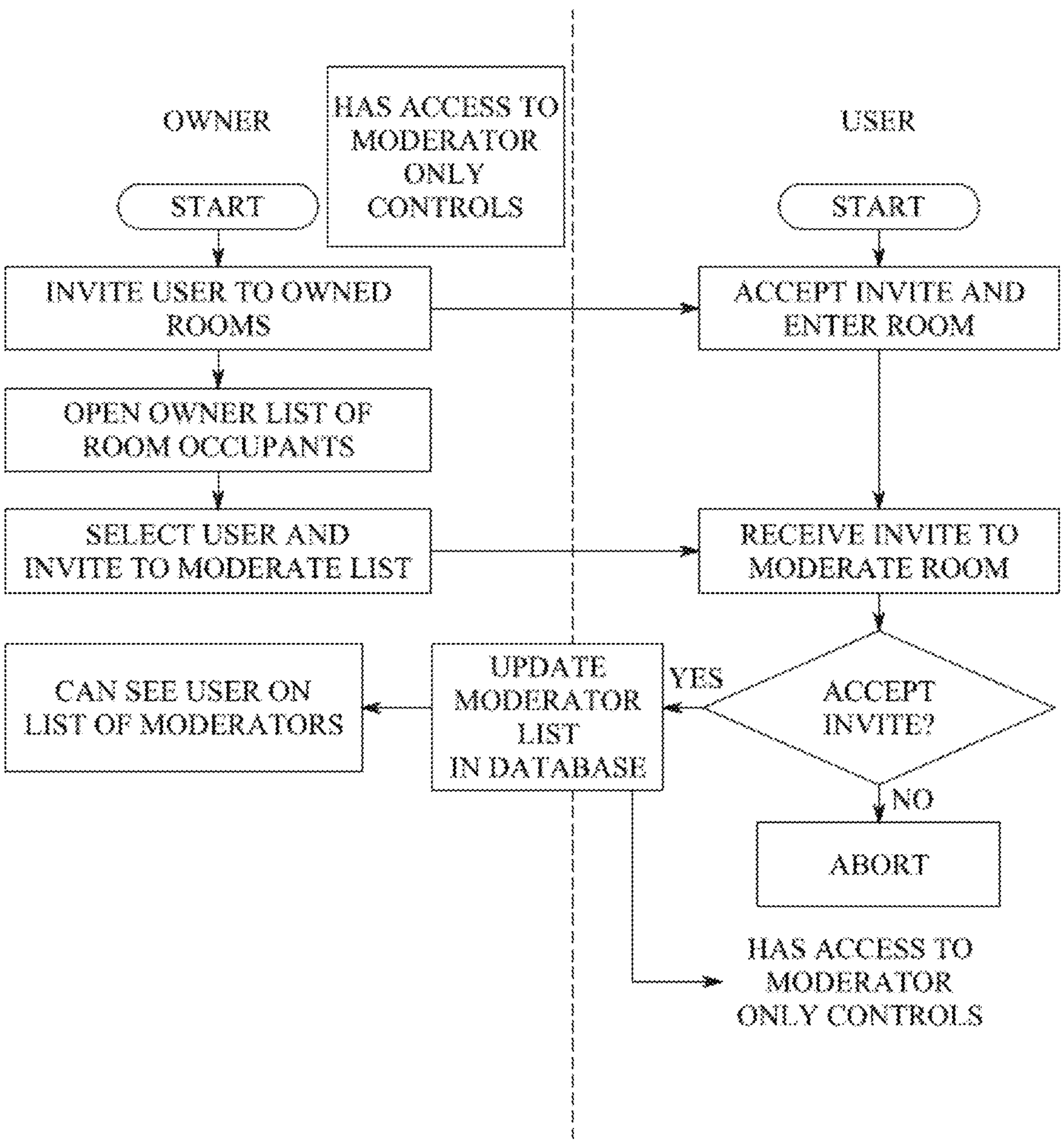
FIG. 36 illustrates the actions for sharing hosting privileges in accordance with an invention embodiment.

The steps for sharing hosting privileges as shown in FIG. 36 are as given below.

In each room, there will exist a system that facilitates the ability of one or several users to control and moderate the features and settings specific to the space in order to create a more honed and contextualized user experience.

Each room will maintain a live list of user ids with moderating permissions, and the view of these users in-room will be augmented to include a tier based set of extra controls and features.

These features and settings may include, but are not limited to the following:

Broadcasting media to the room;

Administrating games/other entertainment;

In-game rules;

Restricting access to rooms;

Background/room appearance;

Room-wide announcements;

Managing payments.

The steps in managing room presets are as given below.

Each room is customizable to fit the situation of the scenario. These settings can be adjusted by the room host(s). Examples include concert venues (where there will be broadcasting in the center) or classrooms where the host has the ability to prevent movement and also direct certain users to go to certain parts of the room.

Because of room hierarchies and doors, hosts can create a structure that allows users to go between different rooms.

Users can have the ability to remove their background and replace it with the preset background which allows for users to be in theme with the room and make it appear as if they were in the room itself. Users also have the option of choosing their own background as well.

Users will have a boolean entry in the database called "frozen" which the host can toggle. If a user's frozen value is true, they will be unable to move, thus limiting movement.

Host will have room creation console where they can create a building structure by arranging and aligning rooms and specifying locations of doors. Room connections are stored as edges in a graph and the graph is represented as an adjacency list in the database.

Each room has an entry in a storage bucket where a background image is stored. The host has permissions to write to the bucket thereby editing the background image. On each load of the room, each user will load in the background image from the storage bucket and render it as the background.

Figure 37:
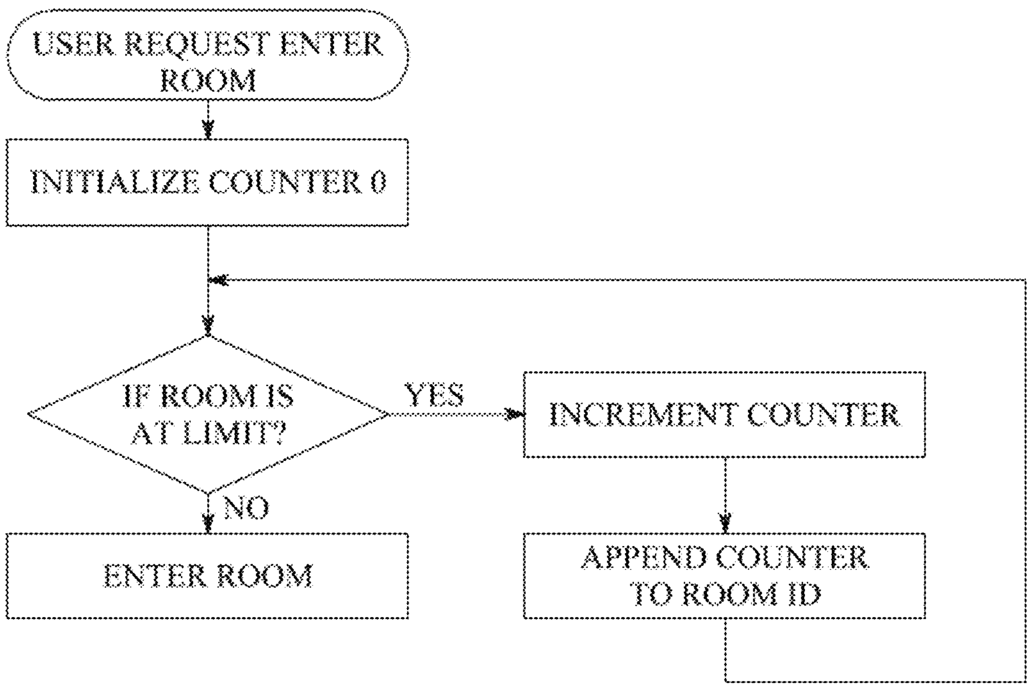
FIG. 37 illustrates the actions for managing room capacity and entrance in accordance with an invention embodiment.

The steps for managing room capacity and entrance as shown in FIG. 37 are as given below.

All rooms have a specific capacity (for example 50) that will overflow if the capacity is reached.

During that time, a new identical room will be created, and half the users will be transported to the new overflow rooms. The rooms will still have the same roomID, however, there will never be more than the capacity in one specific screen.

Users can move between rooms through doors that are situated on the left and right sides of the room.

When a user requests to enter a room, the following process is executed to ensure that no room exceeds its capacity. A counter is initialized to 0. Then the program will query the database for the number of players in the room they are trying to enter. If the number is above the limit for a room the counter will be initialized and appended to the room ID. The check for capacity is repeated with this modified room ID and the counter (appended value) is incremented until a room is found that is under the limit. Once such a room is found the user enters that room.

The steps in managing room of the day are as given below.

In a recurring fashion (i.e. each day), new global rooms will be generated that will be given to each user that is based on their preferences on the types of people they want to meet. Each user will fill out a preferences sheet that allows them to choose what preferences (i.e. pastimes and interests) they have that will then be grouped into rooms of approximated 10-30 people. Examples include dating, networking, fishing or other interests.

Room of the day preferences will be drawn from what our users are most interested in. We will keep track of and analyze what our users' preferences are, and what they want to better comb through and curate the next Room of the Day.

Suppose an earthquake strikes San Francisco. Our Room of the Day perhaps begins hosting several rooms for people to come together. One room directly for survivors to talk with loved ones and family members. Another room, perhaps, to allow for people to talk to others struck by the disaster to bring lost belongings and pets back to owners. Another Room of the Day might pop up to allow for people to donate money and to gather resources towards helping those struck by the disaster.

Our recommendation models will be a mix of deep learning on the preferences of users in their profiles to predict the next interests, a weighted analysis of the current trends that people are talking about, and an analysis of news articles to understand what is happening in the outside world to better curate the next room of the day.

Each person will have custom room of the day recommendations based possibly included criteria above, with a higher recommendation weight on their personal preferences.

The steps in managing room file sharing are as given below.

Tied to each user will be the option to share or distribute files within the bar. Each file will be able to be marked as either public, shareable to friends, shareable to the conversation, and private. These files will be stored under the user's ID in the large file, long term database.

The storage of files in our database is not the only way someone will be able to share files. While in a conversation, users will be able to drop files directly from their computer to allow others to download the file. On direct drop, the user will be given the option to store the file permanently in their user storage.

Suppose a user from Cincinnati, Ohio wants to share an amazing picture of a waterfall to all the people in their conversation. They will be able to directly transfer this file to all the others in the conversation via this method. On drop, they will be given the option to keep the file in their user data, preventing uploads and allowing for the file to then be shared to the whole bar, or to friends, etc.

Users can revoke access anytime they like and retain all control who sees their files. Any friend sharing only file, any public facing file, can have their permissions changed by the original uploader.

The steps in managing filters for avatars are as given below.

Within the personal profile page, the user will be able to set certain profile characteristic traits to filter for, such as age, location, height, and other interests. From there, a database updates the user's preferences, and begins searching for relevant bars to the user's interests. This search will utilize advanced searching AI and deep learning to match and predict what the user wants, and then suggests bars to the user, in decreasing order of how relevant our search thinks the bar or party will be to the users wants.

As an example, suppose a user wants to visit a popular bar, with people near their current town of Cincinnati, Ohio, and wants to listen to Rock Music. Putting this information in will perhaps result in a Hard Rock Cafe based in Cincinnati, Ohio that currently has 300 people.

Once in a bar, the user will be able to click on their profile and make more visible all the people they want their preferences, only showing them people of extreme interest to them.

As an example, suppose our user from Cincinnati, Ohio wants to only talk to single women who like big trucks. Within the Hard Rock Cafe, the user can click to only show people who have these exact traits, allowing them to better know who they should talk to.

EXAMPLES

The following examples pertain to further embodiments.

Individuals take a photo and enter a virtual space, for example like a virtual bar. When they approach each other in this virtual space, they engage in video chat. The mechanics of this is to click varty.io, then the user is prompted, every time they enter, to take a photo of what the user looks like in that moment. This captures the effect similar to actually seeing someone and what do they look like in that moment. Any room that the user wants to enter, they have to take a photo in that moment, and then enter the space. User's photo is then placed on a little square which can be move around the virtual space just with the use of arrow keys. When the user's photo or avatar overlap's another square, in about a second, the avatars, the square in which the photos are placed, are forced to be right next to each other. This is referred to as forced placement. The mechanics exists such that you have the optimal view for video chat. There is a zoom-in once the overlap occurs and the users have video chat, which was created in a peer to peer manner using WebRTC technology. There can be up to four people in a video chat right now and it's all peer to peer meaning that it doesn't incur server costs. It is contemplated to offload to servers with up to like eight people in a video call. To leave a call, the user has to move the arrow keys in any direction.

The virtual space looks like a well-designed bar background like the public space does, however the users have options for choosing a background that are designed and made available within the application. Some of the options for background are for example, a club, an office, a beach, etc. So high level, the host can pick the background for people or users to walk around with the broadcasting feature being available and enabled.

When the user is in a video call, a click on the lock icon makes a call private. Once the call is private, no one else can enter the call. For example, the user wants to talk one on one with a person, all the user has to do is walk up to that person in the virtual space, click the lock icon and no one else can enter. On a design level, there are indicators to let other people know that a user is in a private call by making the avatars appear faded out. Other users in the virtual space can't interact with this person and for the users in private call, the lock icon becomes locked. When a user is faded out, no one can interact with that user. and other people know and recognize that by faded icons. Further, the user can also at a whim, at any time they desire, turn off your video and/or mute themselves.

Users cannot control or change the volume in the shared or virtual space because the idea here for users is to have a shared experience. When any person enters a space in the real world, there's no volume control and at best the person can walk away from other people. This real-world shared experience is captured and enabled for the users entering into the virtual space. Additionally, before users enter a call, they can hear people within a virtual distance. Though user haven't entered a call with someone, but walking up to a person or group of people conversing in the virtual space, the user can hear them and the voice or voices get louder as the user gets closer to the person or group of people. This is referred to as volume scaling and is a function of distance.

Another feature in the virtual shared space is broadcasting. While a user is moving around to a space, there's also a video potentially that the host of the room can upload that everyone listens to at the same volume. The mechanics of the video broadcasted by the host such as volume of the video, time lapsed or timeline of the video that is played, etc., are controlled or controllable by the host of the room only and no one else has the control of it or can control it. This feature is also towards providing a shared experience. It is also a legal and free way to play music on a website. The host of the room can just drop the URL, or SoundCloud®, or any other website that links to a video. Once can get around the music licensing by using for example YouTube® which is free. The host can just choose to play the music and the sound and/or the video will be played and everyone in the room can hear and see the video. Another functionality with broadcasting feature, which appears on the top of the screen, is the ability for the user to expand it. The users cannot change the volume, but have the ability to expand it or collapse it, so as to see the video or just listen to the sound coming from the video. The host can also share the screen or can just play their own video. For example, say a host wants to make an announcement to the whole room. The host can be, for example, a bartender, a classroom teacher, the head of a conference, etc. The host can just click a microphone button icon that would allow them to speak to everyone at once and everyone can see the host with one click, this is similar to video broadcasting button. Additionally, if the host wants to share a presentation, they can just share their screen, and everyone can see it. The host can walk around and the users in the shared space (or room) can talk to each other while the host is presenting. This solves a lot of pain points that users have over Zoom or other video conferencing systems where they want to talk to one person while the presentation is going on, or to watch a movie with my friends. This is a feature of the invention of subdividing while still having one video or presentation constant by the host, i.e., the process of sharing a video or presentation while talking to the rest in the group. The videos are synchronized using socket IO technology so that there is no feedback. If for example, a person wants to talk or present, it is not the case that the music or video is unaligned. Because it's being played from everyone's computer when they're in a video call. The feature of synchronizing the video takes care that everyone's video plays at the same point in time, or at least basically exact.

Another feature is that when a user enters with avatar, they land in a space that is public to everyone. Very simply, they can click a home icon to enable own private room. This private room is their space. The user has to click on a little paperclip icon that occurs when the private room is created which gives them a hash of the URL and then they can send that to other users. All they have to do to get or invite people to the private room is to copy and paste the link, which is a hash of their username and the URL that the user is at. This functionality may be offered as a premium feature. When the user clicks on home icon, they can go to that private space, but to send this link to other users or people and for other people to join your private space, the users might have to pay a preset or predefined amount. It may in some embodiments be available for no cost to all the users.

The host is the only one with control over the broadcasting meaning the music or video that everyone sees at once. In addition to that, when the host prefers to be in his own private space, being the host, they can get other people hosting ability, just by clicking on like the set of people in the room, and then the set of people can at once become host. The host, by just clicking on a person can enable that person to have the hosting ability, but is in control of who has hosting power. At any point, the host can just click back on himself, and then they are the host again. In summary, the host can control the music and the video for the broadcasting that everyone sees, at their whim, change the background image. The host is able to share the hosting functionality by enabling a person for hosting ability. The host can also kick anyone out of their room. The user can also then go to a feature thing that says public rooms on the top of the navigation bar. The public rooms are those which might require the user to pass or satisfy some condition to enter. The public room is not just the public lobby are available to anyone within a certain shared space that pass or satisfy a certain set of condition or constraints. For example, this might be like one has to pay, a cool bar, a live DJ performing, a famous musician performing. The idea here is that these are events that people enter the space by paying or passing a certain condition. For example, a condition, for instance, the UC Berkeley room. To enter UC Berkeley room, which appears when the user clicks the public room icon in a drop down with a set of rooms, navigate to that room by scrolling down to the UC Berkeley room, then the user would have to type in their Berkeley email which then sends the link of UC Berkeley room to the Berkeley email entered. It is very simple how this technology works, it just ensures that there is berkeley.edu in the email, and then it sends the link to that email. If that email doesn't exist, then the user just won't be able to enter. So, just two levels, to ensure that only Berkeley people are in this UC Berkeley room.

Additionally, the rooms can be set with conditions to have profile traits, such that you enter rooms that are more targeted. The idea here is to create kind of a network effect that's very naturally occurring for certain events so people can post public events. And they can just post the condition, the set of conditions required to enter a room. For instance, the user lands in shared space, go to the public space or the public lobby then click the home icon which lets the user to be in his own private space. Then the user can curate it infinitely many possible types of events, which can solve infinitely many pain points, like go to Berkeley or have gone to Berkeley meaning, have to be between the ages of 20 and 30, because the user only wants to talk to people that are relatively of their age, and have to be over six feet tall, because the user only wants to talk to tall people. These are like easy to create and implement kinds of conditions. People or users just put in their age and/or height and/or their school email to actually verify the school. Then the user can talk to a unique set of people. The user may also wish to only talk to people that work at x set of companies, for example Boston Consulting Group, McKinsey, and Bain. Then the other users who wish to enter private space have to put an email here and satisfy the set criteria. At high level, one can create a set of profile inputs that dictate who can enter a private space, allowing for more engaging sets of users. Some people just don't want to interact with random people, they wish to interact with people that have some level of commonality. This would apply to engineers, lawyers, people that are trying to date and, addresses the use case of like targeted dating rooms. The possibilities are endless.

The global public room is where people land upon entering the platform or application. Once they get on the platform and click the picture, they land in global public room and they are walking around the global public room. The person that is running a music in that global public room is the creator of global public room, i.e., the application or platform developer. This a public space that no one really is a host of that global public room. A global room can hold a predefined or preset number of people, for example, like 100 people. Then at the hundred and first person, i.e., after reaching the predefined number, another identical global public room with the same broadcasting functionality meaning music, background etc. is created. Creation of global public rooms is infinitely scalable, because you can have infinitely many people just keep landing and after reaching a target, i.e., 100 people, it creates next room, then next room and so on. The concept of a global room that everyone enters, when the room reaches a certain maximum capacity, a second identical room is created, and the third and fourth and so on, just filling up like a glass of water and getting one of the next glass. The real reason people or users are coming back are interesting might be go to their targeted rooms and the public rooms section or to start their own public room or their own private room just by clicking the home icon and then go into their own private room, inviting people, potentially making the room public and visible to everyone, but may be making constraints on it, setting a capacity of the number of people. These features allow for network effects and very orchestrated by the user. For the other public events, there's someone that hosts, as an example, it could be a bar owner. The bar owner, being host, would be in control of the broadcasting and the other hosting privileges like the background and the ability to remove people and dictate. They can just invite people as well. The user may have to pay to post a public event.

There is also a functionality or feature which is friending, which none of the other prior art does. When the user walks around a public space, they can add someone as a friend. When the user has someone as a friend, they are able to invite them to your private room, or to any public room that they might have access to and this is very simple. The user scrolls down their friends list and click invite.

One feature or function of proximity is volume to the user walking around the public space. People/group of people might already be talking even before the user is in a video call with them. The user in the shared space or public space can hear people at a scaled volume which gets louder as the user gets closer and then it becomes full volume if the user decides to enter a video call, which they can by just hovering over someone. When the user is moving around and hovers over another user/a group of people in chat or room and wait about a second, the video chat is initiated inside of the squares where the image of user occurs. Proximity plays a role in when you are actually intersecting them meaning when your avatar square is overlapping the other user's avatar square. With regards to video, it is only when you use either on or off the set decided by those the user just bumped into. Then, you zoom in, and you can see the video perfectly clear and very large. They are forced avatars, they are forced to be next to each other like a kind of a checkerboard, but optimal video chat way.

The way tracking eye position and interaction in a virtual room would work is the camera would read users eye movement and it would find where your pupil is, then it would determine a color scheme-based shades of dark and light, percentage of darkness.

To received real reactions in response to a virtual action, within the actual space, this virtual space is trying to emulate, there would be a hologram projector to move in accordance with user's arrow key movements so that people in the shared space would see a hologram of the user. Then that hologram projector is moving as the user moves the arrow keys.

The concept at the high level is when the user overlaps in another square, there's a feedback mechanism via flashing lights around the perimeters of the squares. Then, the user is unable to move for like a second until the video launches and then it zooms-in to the squares are fully aligned, that third person enters it goes to the bottom right or bottom left, filling up the square of the screen with video chat, as much video taking off as possible.

The background image of the video you see, or the user's avatar picture may be used as the background image of the room. So, it almost seems like your person is just walking around the room and certainly, there's a better natural feel that the user is in this virtual space.

The feature of volume scaling, i.e., as your avatars close to a source of noise, volume becomes louder. This also applies to a potential room design like a UI of a room. When people broadcast it appears on the top of the screen. This is applicable for live concerts. The video actually appears in a constant location, as you get closer to it, it's louder, and you can just like walk away from it. If people want to have a private, like a soft conversation without any background noise, they can just walk away from it similar to that of a user being near a movie screen, or near the TV. That is the idea here as well, as near the concert it is louder, and you can see it better when you are closer.

Another feature is a concept called room hierarchies. The concept here in our product is people enter virtual spaces where they approach each other and then engage in video chat using avatars of the form of photos that were taken immediately upon entrance to a room. But within each of these rooms, there's a concept called a room hierarchy. So, for instance, a user can go to a room that they granted access to, based on a set of conditions or constraints which are decided by the host of the room. For example, the creator of the UC Berkeley, University of California Berkeley room, is the host and will try to verify that these people went to that school by having them provide their email. When they click on the room, they're forced to provide their email and then an email sent to that email and they can only enter the room upon clicking on that link. Within the UC Berkeley room, the user can have other doors. These doors are on a design level that people can walk through. But on an abstract level or concept wise, what this means is, within a room, there's access to other rooms through these doors that are filtered down. So, within the UC Berkeley room if the user is a computer science major, they can enter the computer science room by walking through the computer science door. They can also, enter the Beta Psi fraternity room being in the Beta Psi fraternity. All of these rooms are established by the host of each of these rooms. The way hosting works hierarchically is that there is one host for the parent room and in this example, that would be the UC Berkeley room. And then the host can assign privileges of hosting to people in any of their child rooms or in that room. Say the host of the UC Berkeley room can give hosting privileges to a few other people to determine like which doors would exist in which, and then in turn, which child rooms would exist. So, what this means in practice, is that, the host of the UC Berkeley room would then give hosting privileges, for the computer science room, to maybe the head of computer science or like any other some other computer science major that they are friends with, and then for a history friend they would give privileges for a history room, etc. So, room hosts can decide individually which people would have access to these rooms within the UC Berkeley room. So, as an example, building off with that hierarchy, a third-degree child, i.e., Berkeley than the child could be computer science and history and may be like a fraternity and may be within computer science, there are the various classes or there are internships and do on. That is the room hierarchy concept. In practice, it is just a room with doors that certain people can see and certain people cannot see. And when the user walks up to them, they can enter those other rooms. This is similar to a Slack® channel thread. Within each of the parent threads is an actual chat room, but your chat room equivalent here is a room where you can enter video chats with each other.

Another feature is the concept of sharing hosting privileges. As a host, one is able to click on users very easily, and give them the ability to do a bunch of different things that hosts only have access to. So, one of the things is the ability to change the room preset, i.e., they can change the background of the room. If the host clicks on a user, they give that user that hosting ability, as well as the host will always maintain that ability. In addition to the hosting ability, they able to do whatever the host can do, which is, do the broadcasting. So, in practice what it means, whoever is trying to attempt to broadcast out of a set of hosts is the person who succeeds in the broadcast. For example, say the host, assigns two other people/users to be hosts, whoever clicks the broadcast button is now putting their screen or their YouTube® link on as the broadcasted video for everyone.

Another feature is room presets. So, as a host, there are a set of rooms to choose from for customizability. The primary example, beyond just a design level of UI looking different, they also have different functionalities. An example is of a concert venue where there is broadcasting in the center that is scaled according to distance. There is also a concept of a classroom where a teacher can freeze people just by clicking on them. The idea here is that, the host app, speaking conceptually, is able to generate calls just by clicking on people and moving people around, and can ensure that people are frozen in place. The host of a room, for example, a teacher, want students to be organized according to like how good they are at math. So, the teacher can click on the top five or so students in the room, then click on a button that says generate room and then it forces those students to move to the location of that first person that the teacher clicked on. It is by clicking this organization of students happen as in practice what would be happening, i.e., the host clicks on a set of people and then they are highlighted, and then the host has to click to start a call. This doesn't make the host enter the call but it makes a set of people enter the call. If the host wanted to enter the call, he would just walk up to the set of people. In this sense, it is different from the user entering into a call. In this concept, the teacher or the host has ultimate freedom over all of the privileges that a normal user has, such as where they are moving and who are they in a call with. The host is forcing their calls by forcing their movements. It's essentially dragging and dropping people around and then in turn when their positions close to each other they are in the call.

The doors concept is able to tie multiple room presets together, so hosts can get room customizability. But within a room, a host/user can have the ability to access other rooms via doors. A host will pick a room preset and they will decide the functionality. Another feature is deciding where doors are, and what within each door there is a set of constraints for who gets to go through these doors. The host can decide these constraints based on a couple things, they can just decide them like, here's the split. Another way is by the list of people that have access to the room by username is to go through the door by having to input an email, and then the link gets sent to that email, and then the host can create constraints on the email. This is to filter the people that are pretending to go to a university or trying to work a job, by having email. The other way is by a profile input, as an example let us think, that the host only want women or like men in a room, it only works if the profile input is male.

Another concept within the global rooms is initially going to start with you know, randomly allocated rooms and overflowing and getting to the next room. These rooms are configurable to be more tailored and enjoyable. These global rooms are a concept called room of the day, the idea of speaking abstractly, an assignment of users to rooms based on a set of features that Application optimize over. The idea is to allocate users to the room per day that the Application thinks would be optimal for them based on a set of features and criteria. So, the Application basically decides person x/user x would go to a room based on for example their profile traits and therefore commonalities with other individuals. It is also analyzed, how enjoyable that the user's experience was, based on how much time they spent in that allocated or entered room. For example, put people of political party together in a room, and person x/user x in the room did not have a good experience, then the Application tries optimizing over, may be less on the political party feature and more so on a profile input of age for instance. In addition, the Application takes in as an input to this equation, a concept called preferences. For example, a user/people gets to input, what kinds of things they're looking for or prefer on this website, they might prefer a certain theme based room, they might prefer a room to be oriented around dating. Therefore, the Application decides a set of traits that fall into the dating buckets, such as age heights, even like University, but it doesn't input certain things as like technical skills into this equation, that would fall under something like career-based rooms. If someone/user is on here, mostly to meet people and network for careers, they would select or prefer career-based rooms. So, speaking abstractly, there's a preference of style of room and then within that falls certain buckets of profile inputs and the weighting takes in as inputs based on the host's preference. The weighting algorithm just keeps weighting according to the set of inputs that fall under dating or fall under career based on whichever preference the individual is looking.

The word filter is used in two types of contexts. The first contest, the filter is in terms of zoom-in background. In this filter concept, a user can filter like zoom background, and then had it be the case that the background is transparent, that the user only sees the floor. Second context, a totally different concept, but just use the same word filter, wherein users can filter for certain users within a room based on profile inputs, i.e., based on profile. This is called avatar filters. When a user enters like a big shared room/shared space, for instance with like 300 people assuming it is a bar, assuming that the user is a straight male and wishes to only want to talk to females can filter based on a profile input to only see the females. The user can filter based on profile inputs, or based on a list of people in the room and just by checking the box next to them, let us say that the user wants to just hang out with their friends and then approach.

Another feature is a file sharing mechanism. For example, if a user wishes to share a file in a particular room, it appears on the left that you've uploaded. The user has can just click and upload a file. The user then has the immediate ability to walk up to someone when they are in a video call and just send them over the file uploaded. The concept here is, you walk up to users and give them documents that appear in a "inventory". If, on top of just like normal PDF files and Word documents, if the user is a developer and is in a computer science (CS) themed room for networking, the user can embed a piece of software and then both, the user and the person with which the file is being shared, can participate in the software while in the video call. So, using application embedding, a user can share another application within the environment. The concept here is that a user can call and then can embed their application which is already been embedded into a website and then share it with everyone to participate. This could be like a little game that everyone can participate in while you are in a video call. In addition to sharing music, videos, etc., the user can also share applications and their output and only the people in a video call, when you're in a video call, can participate in that shared application. Broadcasting is for the entire room, and the user can only really do that with video, music, and/or the screen. Sharing is a concept, is the ability to embed applications to share amongst like three up to three other people when the user is in a four-person call.

For example, consider a game application that is embedded by the user shares it with two other people in the call, then all three of them can play that game together and now the shared game application is visible and not the video call, but audio continues to be heard.

In the features of public room posting, any user can make their room, a private hub to public and can decide constraints when this action is done. This feature of public room falls under the umbrella of the room selection but the but also touches upon how the host has control. So, a few constraints here are one there is a payment structure, so, a user/host can automatically generate like a payment structure to enter, is it a paid or an unpaid entry and how much to pay to enter? Then, second, is constraints based on profile inputs, like deciding who can enter on. Third is proportional requirements based on profile inputs. So, let's say mostly a dating centered room. So, the host would establish a ratio of males to females, assuming it's a straight themed room. If it's like a different sexuality room, the ratios would be different. But the idea here is that the host is trying to allow users to have as much control over the set of people in that room as possible. It then appears in people's public rooms icon, meaning when they click on the icon, there's a list of rooms and it's weighted according to the preferences and profile inputs, the number of friends in a room. So, that means that hosts select whether this falls under the dating preferences or what kind of theme is it? i.e., which theme they are looking for. So, another element of the sorting, by the way is the number of friends the host probably want to enter rooms where they know the people.

A user can walk in rooms and friend people. When a user friends another person, they appear on a little sidebar to the right, whether they're active, inactive, or in the room. The use can travel the rooms or friends currently are on the platform too can travel if they meet those room constraints, just from the click of a button. This allows like a really good network effect of, hey, this guy's in this room. A person or user want to see what he is up to him and why he is here. And the friend of the user is ready to go to that room too.

While various aspects and embodiments have been disclosed herein, other aspects and embodiments will be apparent to those skilled in the art. The various aspects and embodiments disclosed herein are for purposes of illustration and are not intended to be limiting.

The invention claimed is:

1. A system, comprising:

a communication network configured to provide data transmission from a source to a destination;

a client computer, coupled to the communication network, configured to be utilized by a first user for a virtual social networking; and a server coupled to the client computer via the communication network and configured to manage the virtual social networking, the server comprising:

a first module, wherein the first module is configured for a login of the first user to a virtual space, by capturing a photo of the first user in real-time, wherein an avatar of the first user is created comprising the photo of the first user, wherein the virtual space is a global public room;

a second module, wherein the second module is configured to control a navigation of the first user in the virtual space;

a third module, wherein the third module is configured for curating and managing a subspace by the first user within the virtual space; and a fourth module, wherein the fourth module is configured to connect, automatically, the first user based on a proximity with a second user in the virtual space, wherein upon connecting the first user and the second user are engaged in a live video call;

wherein the system is configured to enable a host of the virtual space to perform at least one of a broadcasting of a video, broadcasting of an audio, and making an announcement;

wherein the system is configured for virtual events-based social networking in the virtual space;

wherein the system is configured to emulate dynamics of a real-life social settings; and wherein the system is configured to create the virtual space in a computer-simulated environment comprising a plurality of users that simultaneously and independently explore the virtual space to participate in an activity and communicate.

2. The system of claim 1, wherein the login further comprises creating a profile of the first user; and wherein the system enables the first user to navigate around the virtual space by control of the avatar of the first user by the first user; and wherein the system enables the second user to access the profile of the first user from the avatar of the first user.

3. The system of claim 2, wherein the avatar further comprises one of a textual, a 2D graphical representation, a 3D graphical representation, a live video with auditory and touch sensations.

4. The system of claim 1, wherein the global public room comprises a background with a theme, and wherein the global public room is infinitely scalable such that a new global public room is created in the virtual space upon reaching a predefined limit in the global public room.

5. The system of claim 1, wherein the system is configured to enable the first user to navigate around the virtual space using a plurality of keys of a device.

6. The system of claim 1, wherein the system is configured to enable the first user to add the second user in the virtual space as a friend.

7. The system of claim 1, wherein the virtual space comprises the subspace, wherein the subspace is configured to be at least one of a public space, a global space, a private space, an opaque space, a hidden space, and an access restricted space.

8. The system of claim 7, wherein the access restricted space will have entrance requirements that are verified based on inputs provided in a profile of the first user during the login.

9. The system of claim 1, wherein the subspace comprises a room, wherein the room is one of an event specific room, a tailored room, a private room, a public room, a geographically based room.

10. The system of claim 1, wherein the system is configured to enable the first user to provide access of the subspace to the second user, wherein privileges to other subspaces in a hierarchy of the subspace are populated automatically, by the system, for the second user.

11. The system of claim 1, wherein the system is configured to enable a selection on size of the subspace and presets of the subspace, wherein the presets are configured for customizability of the subspace according to an event planned in the subspace.

12. The system of claim 1, wherein the system is configured to enable the first user to curate the subspace comprising a private hub, wherein the system is configured to enable the first user to schedule a future event to take place in the private hub, to send an invite to the second user to join the private hub, to broadcast a video in the private hub, to make a room wide announcement in the private hub, to administer games in the private hub, to add or remove other users to the private hub, to change a background of the private hub, and to share a co-hosting right of the private hub.

13. The system of claim 1, wherein the system is configured to enable the first user to enter the subspace virtually and further create a new subspace in real-time.

14. The system of claim 1, wherein the system is configured to disconnect the live video call when a first avatar of the first user moves away from a second avatar of the second user in the virtual space or the second avatar of the second user moves away from the first avatar of the first user in the virtual space.

15. The system of claim 1, wherein the system is configured to enable the first user to share a file by uploaded the file to an inventory by the first user and further enables the first user to walk up to the second user in the virtual space and share the file.

16. A method, comprising:

creating a virtual space, in a virtual environment, wherein the virtual space is a global public room;

enabling a first user to enter the virtual space in the virtual environment using a login by capturing a photo of the first user in real-time, wherein an avatar of the first user is created comprising the photo of the first user;

enabling the first user to navigate around the virtual space by controlling a first avatar of the first user by the first user;

checking for an overlap of the first avatar of the first user with a second avatar of a second user; and enabling, automatically, a live video call between the first user and the second user when the first avatar of the first user and the second avatar of the second user are engaged in the overlap for a predetermined duration; and wherein a host of the virtual space is enabled for at least one of broadcasting a video, broadcasting an audio, and to make an announcement; and wherein the method is configured for the live video call based on a virtual proximity in the virtual environment; and wherein the method is configured for a computer-simulated environment comprising a plurality of users that simultaneously and independently explore the virtual space to participate in an activity and communicate.

17. The method of claim 16, wherein the method is further configured to allow a subdivision and a grouping of video calls based on the virtual proximity of the first user and the second user in the virtual space.

18. The method of claim 16, wherein the method is further configured to enable at least one of a private conversation and a non-private conversation in the virtual space; and wherein an entry of the second user is blocked to the virtual space in case of the private conversation.

19. The method of claim 16, wherein the method is configured to adjust a pupil position of each of the plurality of users in the live video call using an image processing method based on a relative position of other users in the plurality of users in the live video call and a view location of each of the plurality of users with respect to the relative position of other users to maintain an eye contact.

20. A non-transitory computer-readable medium having stored thereon instructions executable by a computer system to perform a method comprising:

creating a virtual space, in a virtual environment, wherein the virtual space is a global public room;

enabling a first user to enter the virtual space in the virtual environment using a login by capturing a photo of the first user in real-time, wherein an avatar of the first user is created comprising the photo of the first user;

enabling the first user to navigate around the virtual space by controlling a first avatar of the first user by the first user;

checking for an overlap of the first avatar of the first user with a second avatar of a second user; and enabling, automatically, a live video call between the first user and the second user when the first avatar of the first user and the second avatar of the second user are engaged in the overlap for a predetermined duration; and wherein a host of the virtual space is enabled for at least one of broadcasting a video, broadcasting an audio, and to make an announcement; and wherein the method is configured for the live video call based on a virtual proximity in the virtual environment; and wherein the method is configured for a computer-simulated environment comprising a plurality of users that simultaneously and independently explore the virtual space to participate in an activity and communicate.

* * * * *